United States Patent
Moore et al.

(10) Patent No.: US 8,106,853 B2
(45) Date of Patent: Jan. 31, 2012

(54) WIRE-BASED FLAT PANEL DISPLAYS

(75) Inventors: Chad B. Moore, Corning, NY (US); Giacomo James Piazza, Elmira, NY (US)

(73) Assignee: Nupix, LLC, Corning, NY (US)

( * ) Notice: Subject to any disclaimer, the term of this patent is extended or adjusted under 35 U.S.C. 154(b) by 1245 days.

(21) Appl. No.: 11/609,220

(22) Filed: Dec. 11, 2006

(65) Prior Publication Data

US 2007/0289768 A1 Dec. 20, 2007

Related U.S. Application Data

(60) Provisional application No. 60/749,446, filed on Dec. 12, 2005, provisional application No. 60/759,704, filed on Jan. 18, 2006, provisional application No. 60/827,146, filed on Sep. 27, 2006, provisional application No. 60/827,152, filed on Sep. 27, 2006, provisional application No. 60/827,170, filed on Sep. 27, 2006.

(51) Int. Cl.
G09G 5/00 (2006.01)
(52) U.S. Cl. ............................. 345/5; 345/107
(58) Field of Classification Search .............. 345/60–63, 345/66–68, 87–103, 204, 107, 5; 315/169.4; 313/581–586; 359/296; 349/89–90
See application file for complete search history.

(56) References Cited

U.S. PATENT DOCUMENTS

| | | |
|---|---|---|
| 3,602,754 A | 8/1971 | Pfaender |
| 3,654,680 A | 4/1972 | Bode et al. |
| 3,927,342 A | 12/1975 | Bode et al. |
| 3,964,050 A | 6/1976 | Mayer |
| 4,027,188 A | 5/1977 | Bergman |
| 4,038,577 A | 7/1977 | Bode et al. |
| 4,554,537 A | 11/1985 | Dick |
| 4,728,864 A | 3/1988 | Dick |
| 4,833,463 A | 5/1989 | Dick et al. |
| 4,896,149 A | 1/1990 | Buzak et al. |
| 5,086,297 A | 2/1992 | Miyake et al. |
| 5,162,901 A | 11/1992 | Shimada et al. |
| 5,436,634 A | 7/1995 | Kanazawa |
| 5,446,344 A | 8/1995 | Kanazawa |
| 5,661,500 A | 8/1997 | Shinoda et al. |

(Continued)

FOREIGN PATENT DOCUMENTS

JP 62111234 A 5/1987

(Continued)

OTHER PUBLICATIONS

Supplementary European Search Report for European Application No. EP 06846554, Issued on Feb. 12, 2009.

(Continued)

Primary Examiner — Ricardo L Osorio
(74) Attorney, Agent, or Firm — Brown & Michaels, PC

(57) ABSTRACT

An effective method to create very large electronic displays forms the structure using fiber or tube arrays or electroded sheets containing wire electrodes. The electroded sheets are formed by embedding wire electrodes into the surface of a polymer substrate and electrically connecting a patterned transparent conductive electrode lines to the wires. The wire electrodes are used to carry the bulk of the current and the transparent conductive electrode is used to spread the charge or voltage from the wire electrode across the line of pixels. In most display applications, the electroded surface of the electroded sheet has to be flattened. The electroded sheets may be used to form many different types of displays.

20 Claims, 64 Drawing Sheets

U.S. PATENT DOCUMENTS

| | | | |
|---|---|---|---|
| 5,674,553 A | 10/1997 | Shinoda et al. | |
| 5,745,086 A | 4/1998 | Weber | |
| 5,838,105 A | 11/1998 | Mitomo | |
| 5,892,558 A | 4/1999 | Ge et al. | |
| 5,984,747 A | 11/1999 | Bhagavatula et al. | |
| 5,985,700 A | 11/1999 | Moore | |
| 6,072,276 A | 6/2000 | Okajima | |
| 6,111,191 A | 8/2000 | Hall et al. | |
| 6,171,762 B1 | 1/2001 | Borrelli et al. | |
| 6,197,429 B1 | 3/2001 | Lapp et al. | |
| 6,247,987 B1 * | 6/2001 | Moore | 445/24 |
| 6,354,899 B1 | 3/2002 | Moore | |
| 6,414,433 B1 * | 7/2002 | Moore | 313/582 |
| 6,431,935 B1 | 8/2002 | Moore | |
| 6,452,332 B1 * | 9/2002 | Moore | 313/582 |
| 6,459,200 B1 * | 10/2002 | Moore | 313/582 |
| 6,472,594 B1 | 10/2002 | Ichinose et al. | |
| 6,480,253 B1 | 11/2002 | Shigeta et al. | |
| 6,507,146 B2 | 1/2003 | Moore | |
| 6,515,218 B1 | 2/2003 | Shimizu et al. | |
| 6,524,773 B1 | 2/2003 | Borrelli et al. | |
| 6,570,339 B1 * | 5/2003 | Moore | 315/169.3 |
| 6,573,880 B1 * | 6/2003 | Simoni et al. | 345/87 |
| 6,577,060 B2 | 6/2003 | Tokai et al. | |
| 6,611,100 B1 * | 8/2003 | Moore | 313/582 |
| 6,677,704 B2 | 1/2004 | Ishimoto et al. | |
| 6,750,605 B2 * | 6/2004 | Moore | 313/495 |
| 6,771,234 B2 | 8/2004 | Moore | |
| 6,785,036 B1 | 8/2004 | Berneth et al. | |
| 6,794,812 B2 | 9/2004 | Yamada et al. | |
| 6,836,063 B2 | 12/2004 | Ishimoto et al. | |
| 6,841,929 B2 | 1/2005 | Ishimoto et al. | |
| 6,917,156 B2 | 7/2005 | Moore | |
| 6,930,442 B2 | 8/2005 | Awamoto et al. | |
| 6,932,664 B2 | 8/2005 | Yamada et al. | |
| 6,936,761 B2 | 8/2005 | Pichler | |
| 6,946,803 B2 | 9/2005 | Moore | |
| 6,950,173 B1 | 9/2005 | Sutherland | |
| 6,969,292 B2 | 11/2005 | Tokai et al. | |
| 7,022,910 B2 | 4/2006 | Gaudiana et al. | |
| 7,034,446 B2 | 4/2006 | Moore | |
| 7,049,748 B2 | 5/2006 | Tokai et al. | |
| 7,082,236 B1 | 7/2006 | Moore | |
| 7,122,961 B1 | 10/2006 | Wedding | |
| 7,456,571 B1 | 11/2008 | Wedding | |
| 2001/0009352 A1 | 7/2001 | Moore | |
| 2001/0033483 A1 | 10/2001 | Moore | |
| 2002/0140133 A1 | 10/2002 | Moore | |
| 2002/0149717 A1 | 10/2002 | Borrelli et al. | |
| 2003/0042839 A1 | 3/2003 | Ishimoto et al. | |
| 2003/0095094 A1 | 5/2003 | Goden | |
| 2003/0122485 A1 | 7/2003 | Tokai et al. | |
| 2003/0134506 A1 | 7/2003 | Kim et al. | |
| 2003/0214223 A1 | 11/2003 | Ishimoto et al. | |
| 2003/0214224 A1 | 11/2003 | Awamoto et al. | |
| 2004/0242110 A1 | 12/2004 | Matsuda et al. | |
| 2005/0003640 A1 | 1/2005 | Ushiyama et al. | |
| 2005/0104509 A1 | 5/2005 | Yamashita | |
| 2005/0122306 A1 | 6/2005 | Wilcox et al. | |
| 2005/0126628 A1 | 6/2005 | Scher et al. | |
| 2005/0127455 A1 | 6/2005 | Nishiki et al. | |
| 2005/0140893 A1 | 6/2005 | Hong | |
| 2005/0150541 A1 | 7/2005 | Scher et al. | |
| 2005/0214967 A1 | 9/2005 | Scher et al. | |
| 2006/0181763 A1 * | 8/2006 | De Zwart et al. | 359/296 |
| 2006/0193031 A1 | 8/2006 | Moore | |
| 2006/0214880 A1 | 9/2006 | Moore | |
| 2007/0054730 A1 * | 3/2007 | Mattice et al. | 463/16 |
| 2007/0058178 A1 * | 3/2007 | Kurihara et al. | 358/1.2 |

FOREIGN PATENT DOCUMENTS

| | | |
|---|---|---|
| JP | 2000085068 A | 3/2000 |
| WO | 9900695 A1 | 1/1999 |

OTHER PUBLICATIONS

Awanoto et al., "Development of Plasma Tube Array Technology for Extra-Large-Area Displays", SID 2005, pp. 206-209.

C. Bergman, R.W. Johnson, R.A. Strom and T.N. Thompson, "Large Screen Plasma Display", AD728623, Final Report on Contract No. F30602-70-C-0154, Rome Air Development Center, Jul. 1971.

C. Bergman, "Plasma Display Color Techniques Using Tubular Construction", AD766933 Final Report on Contract No. F30602-72-C-0167, Rome Air Development Center, Jul. 1973.

G.W. Dick, "Three-Electrode per PEL AC Plasma Display Panel", 1985 International Display Research Conf., pp. 45-50.

H. Hirakawa et al., "Dynamic Driving Characteristics of Plasma Tubes Array", SID 2004, pp. 810-813.

M. Ishimoto et al. "Discharge Observation of Plasma Tubes", SID 2003 pp. 36-39.

W. Mayer and V. Bonin, "Tubular AC Plasma Panels," 1972 IEEE Conf. Display Devices, Conf. Rec., New York, pp. 15-18.

C. Moore and R. Schaeffler, "Fiber Plasma Display", SID '97 Digest, pp. 1055-1058.

R. Strom, "32-Inch Graphic Plasma Display Module," 1974 SID Int. Symposium, San Diego, pp. 122-123.

R. A. Strom and C. Bergman, "Large Area Plasma Display module", AD782383, Final Report on Contract F30602-72-C-0211, Rome Air Development Center, Apr. 1974.

T. Shinoda et al. "New Approach for Wall Display with Fine Tube Array Technology" SID 2002, pp. 1072-1075.

The International Search Report and The Written Opinion of the International Searching Authority for PCT application No. PCT/US06/61872 mailed Mar. 10, 2008.

* cited by examiner

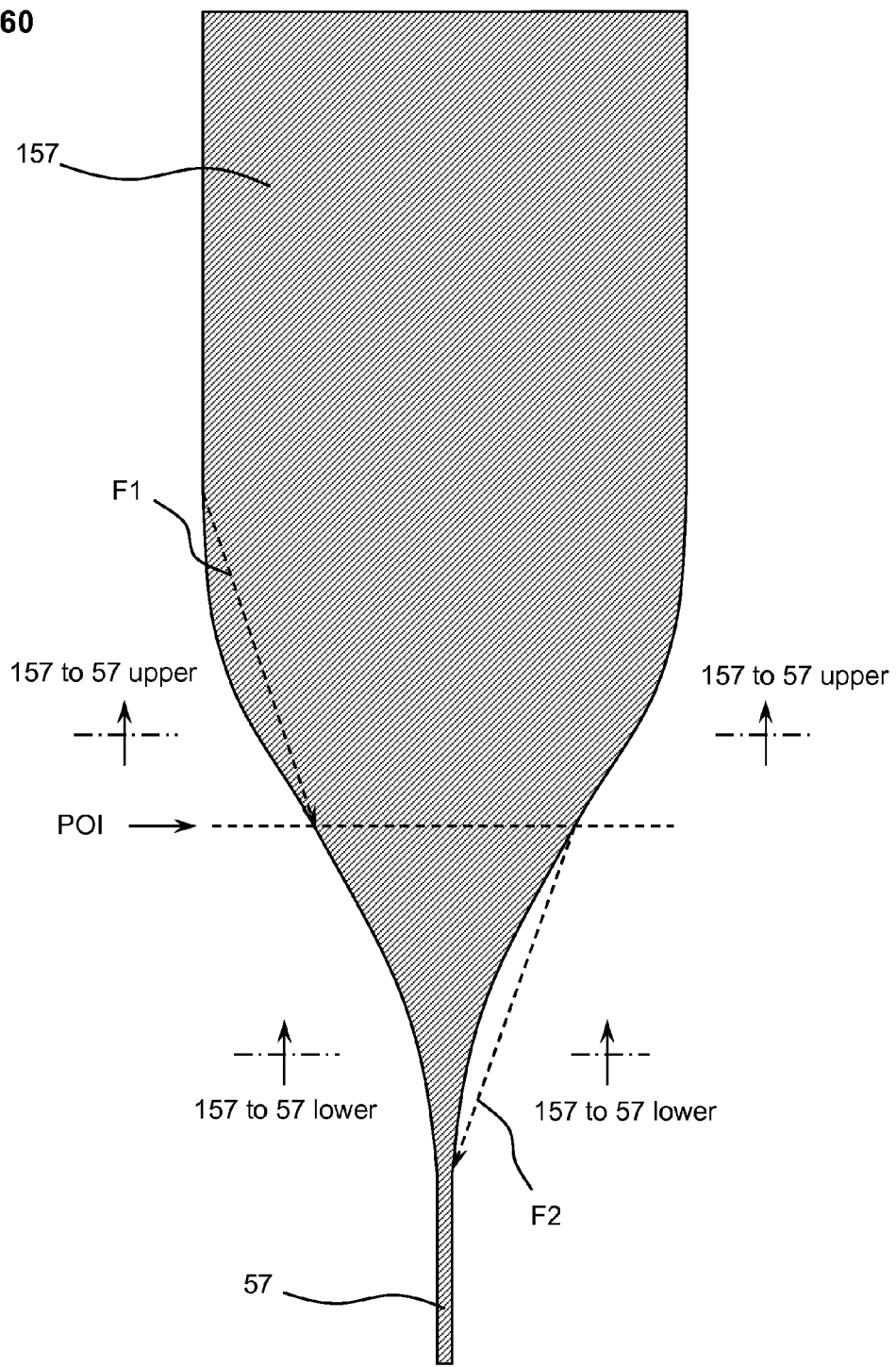

157 to 57 upper 157 to 57 lower

WIRE-BASED FLAT PANEL DISPLAYS

REFERENCE TO RELATED APPLICATIONS

This application claims an invention that was disclosed in one or more of the following provisional applications:

1) Provisional Application Number Provisional Application No. 60/749,446, filed Dec. 12, 2005, entitled "ELECTRODE ADDRESSING PLANE IN AN ELECTRONIC DISPLAY";
2) Provisional Application No. 60/759,704, filed Jan. 18, 2006, entitled "ELECTRODE ADDRESSING PLANE IN AN ELECTRONIC DISPLAY AND PROCESS";
3) Provisional Application No. 60/827,146, filed Sep. 27, 2006, entitled "TUBULAR PLASMA DISPLAY";
4) Provisional Application No. 60/827,152, filed Sep. 27, 2006, entitled "ELECTRODED SHEET"; and
5) Provisional Application No. 60/827,170, filed Sep. 27, 2006, entitled "WIRE-BASED FLAT PANEL DISPLAYS".

The benefit under 35 USC §119(e) of the United States provisional applications is hereby claimed, and the aforementioned applications are hereby incorporated herein by reference.

BACKGROUND OF THE INVENTION

1. Field of the Invention

The invention pertains to the field of electronic displays. More particularly, the invention pertains to using wire electrodes in fibers, tubes and electroded sheets, to build the structure in a flat panel display.

2. Description of Related Art

Within the electronic display space there is a group of displays that create an image by modulating an electro-optic material. An electro-optic material is defined as a material that changes state in an electric field. Some of these materials can be passively addressed or simply addressed by sandwiching the electro-optic material between two orthogonal arrays of electrodes. However, this passive addressing scheme requires that the electro-optic material has a threshold or its optical properties have an abrupt change over a small change in applied voltage. Most liquid crystal (LC) materials have a steep enough threshold that allows them to be passively addressed. If the electro-optic material does not have a voltage threshold or its threshold is not steep enough (the voltage to totally modulate the material has to be less than twice the voltage of where the materials electro-optic properties start to change), then the electro-optic material has to be actively addressed. Active addressing means that a switch, like a transistor, that has a voltage threshold is used to place the voltage across the electro-optic material. Other active addressing switches that have been used are diodes, plasmas, and micro-electro-mechanical systems (MEMS). Active addressing is also used in cases that require video rate images because passive addressing requires that a line at a time addressing scheme is used and therefore the speed to update the image is limited to the number of lines in the display times the minimum response time of the electro-optic media.

There are several different types of electro-optic materials. The most well known and widely used electro-optic materials are liquid crystal molecules. In the liquid crystal family, a vast range of molecules could potentially be used to create the electro-optic modulated material. Some of these liquid crystal molecules include, but are not limited to, twisted nematic, cholesteric-nematic, dichroic dye (or guest-host), dynamic scattering mode, smectic, and polymer dispersed. Most of these liquid crystal molecules require other films, such as alignment layers, polarizers, and reflective films.

Another type of electro-optic material is electrophoretic. Electrophoretic material is a suspension of small charged particles in a liquid solution. If the particles have a similar density as the liquid solution, they are not affected by gravity. Therefore the only way to move the particles is using an electric field. By applying a voltage potential across the electrophoretic solution, the charged particles are forced to move in the suspension to one of the contacts. The opposite charge moves the particles in the other direction. The electrophoretic suspension is designed such that the particles are a different color than the liquid solution or there are two different colored particles with opposite charge states.

Another type of electro-optic material is a twisting ball or Gyricon material. It was initially called twisting ball material because it is composed of small bichromal spheres, one side coated black, the other white with opposite charges on the two halves. Therefore, when the twisting ball material is placed in an electric field, the bichromal spheres all rotate to display one optical property of the material and when the opposite voltage is applied, the material displays the other colored state. This Gyricon material can also be made in a cylindrical form.

Research Frontiers Incorporated has developed another electro-optic material that they call a suspended particle device (SPD) which consists of microscopic particles in a liquid suspension. These microscopic particles are elongated in one direction and, when randomly orientated, block light. When a voltage is applied across the electro-optic material, the particles align and transmit light.

Most of these electro-optic materials do not have a voltage threshold and must be actively addressed. Some of the liquid crystal materials use an active transistor back plane to address the displays, but these types of displays are presently limited in size due to the complicated manufacturing process. Transmissive displays using liquid crystal materials and a plasma-addressed back plane have been demonstrated in U.S. Pat. No. 4,896,149, herein incorporated by reference, however, these plasma-addressed back planes are also limited in size due to availability of the thin microsheet to create the plasma cells.

One potential solution for producing large size displays is to use fibers/tubes to create the plasma cells. Using tubes to create a plasma-addressable plasma cell was first disclosed in U.S. Pat. No. 3,964,050, herein incorporated by reference. One potential issue in producing large plasma-addressed tubular displays is creating the top column electrode plate. This plate has to be composed of an array of lines to address that set the charge in the plasma tubes. When addressing a thin electro-optic material like a LC or electrophoretic material, these electrode lines have to be wide enough to spread the charge across the width of the entire pixel. The lines also have to be conductive enough to set the charge in the plasma tube so the display can be addressed at video rates. A traditional patterned indium tin oxide (ITO) transparent conductor works fine for smaller panels where processing the panel is easy and the lines are short, however to address very large panels, the ITO lines are not conductive enough and patterning of the lines becomes very expensive.

One method to solve this problem has been proposed in U.S. patent application Ser. No. 11/236,904 "Electrode Enhancements for Fiber-Based Displays", filed Sep. 28, 2005, and herein incorporated by reference. In that application, fiber containing an electrode is used to form the column electrode plane. The electrode is composed of a wire electrode, which carries the bulk of the current and a transparent conductive electrode, which is connected to the wire electrode and is used to spread the voltage across the surface of the fiber.

Connecting a higher conductive metal film electrode to a transparent conductive film to spread the voltage of the electrode is also traditionally used in the top electrode plate of a plasma display (PDP). The top PDP plates use a 50 μm wide by about 1 μm thick Cr/Cu/Cr stack to carry current and a thin ITO coating to spread the effect of the voltage, hence spreading the firing of the plasma. These electrode coatings are evaporated or sputtered and then photolithograph is used to pattern them and they are then etched into lines using a wet etch or a reactive ion etch (RIE).

Photovoltaic cells also use conductive metal lines connected to transparent conductive coatings to collect the current from the photovoltaic device. The use of wire connected to a transparent conductive coating has been disclosed by Nanosolar in U.S. Pat. Nos. 6,936,761 and 7,022,910, herein incorporated by reference, for solar cell applications.

Plasma display panels (PDP) have been around for 40 years, however, color PDPs did not receive much attention until the invention of the three electrode surface discharge structure (G. W. Dick, "Three-Electrode per PEL AC Plasma Display Panel", 1985 International Display Research Conf., pp. 45-50; U.S. Pat. Nos. 4,554,537, 4,728,864, 4,833,463, 5,086,297, 5,661,500, and 5,674,553). The three electrode surface discharge structure, shown in FIG. 1, advances many technical attributes of the display, but its complex manufacturing process and detailed structure makes manufacturing complicated and costly.

Currently, plasma display structures are built up layer by layer on specialty glass substrates using many complex processing steps. FIG. 1 illustrates the basic structure of a surface discharge AC plasma display made using standard technology. The PDP can be broken down into two parts: top plate 10 and bottom plate 20. The top plate 10 has rows of paired electrodes referred to as the sustain electrodes 11a, 11b. The sustain electrodes are composed of wide transparent indium tin oxide (ITO) electrodes 12 and narrow Cr/Cu/Cr bus electrodes 13. These electrodes are formed using sputtering and multi-layer photolithography. The sustain electrodes 11 are covered with a thick (25 μm) dielectric layer 14 so that they are not exposed to the plasma. Silk-screening a high dielectric paste over the surface of the top plate and consolidating it in a high temperature process step forms this dielectric layer 14. A magnesium oxide layer (MgO) 15 is deposited by electron-beam evaporation or sputtering over the dielectric layer to enhance secondary emission of electrons and improve display efficiency. The bottom plate 20 has columns of address electrodes 21 formed by silk-screening silver paste and firing the paste in a high temperature process step. Barrier ribs 22 are then formed between the address electrodes 21. These ribs 22, typically 50 μm wide and 120 μm high, are formed using either a greater than ten layer multiple silk-screening process, embossing a frit paste, or a sandblasting process. In the sandblasting method, barrier rib paste is blade coated on the glass substrate. A photoresist film laminated on the paste is patterned by photolithography. The rib structure is formed by sandblasting the rib paste between the exposed pattern, followed by removal of the photoresist layer and a high temperature consolidation of the barrier rib 22. Alternating red 23R, green 23G, and blue 23B phosphors are silk-screened into the channels between the barrier ribs to provide color for the display. After silk-screening the phosphors 23, the bottom plate is sandblasted to remove excess phosphor in the channels. The top and bottom plates are frit sealed together and the panel is evacuated and backfilled with a gas mixture containing xenon.

The basic operation of the display requires a plasma discharge where the ionized xenon generates ultraviolet (UV) radiation. This UV light is absorbed by the phosphor and emitted as visible light. To address a pixel in the display, an AC voltage is applied across the sustain electrodes 11, which is large enough to sustain a plasma, but not large enough to ignite one. (A plasma is a lot like a transistor, as the voltage is increased nothing happens until a specific voltage is reached where it turns on.) Then an additional short voltage pulse is applied to the address electrode 21, which adds to the sustain voltage and ignites the plasma by adding to the total local electric field, thereby breaking down the gas into a plasma. Once the plasma is formed, electrons are pulled out of the plasma and deposited on the MgO layer 15. These electrons are used to help ignite the plasma in the next phase of the AC sustain electrodes. To turn the pixel off, an opposite voltage must be applied to the address electrode 21 to drain the electrons from the MgO layer 15, thereby leaving no priming charge to ignite the plasma in the next AC voltage cycle on the sustain electrodes. Using these priming electrons, each pixel can be systematically turned on or off. To achieve gray levels in a plasma display, each video frame is divided into 8 bits (256 levels) and, depending on the specific gray level, the pixels are turned on during these times.

An entirely new method of manufacturing plasma displays using complex-shaped fibers containing wire electrodes to build the panel structure in a display solved many of the cost and size issues involved with manufacturing PDPs (C. Moore and R. Schaeffler, "Fiber Plasma Display", SID '97 Digest, pp. 1055-1058; U.S. Pat. No. 5,984,747 GLASS STRUCTURES FOR INFORMATION DISPLAYS, herein incorporated by reference). The fiber-based method of manufacturing creates plasma displays that look and operate identical to the traditional panel structure, FIG. 1, but the structure in the panel is totally fabricated using complex-shaped glass fibers containing wire electrodes, as shown in FIG. 2.

The entire functionality of the standard plasma display (FIG. 1) is created by replacing the top 16 and bottom 24 plates with respective sheets of top 17 and bottom 27 fibers (FIG. 2) sandwiched between plates (16 and 24) of soda lime glass. Each row of the bottom plate is composed of a single fiber 27 that includes the address electrode 21, barrier ribs 22, plasma channel 25 and the phosphor layers 23. Each column of the top plate is composed of a single fiber 17 that includes two sustain electrodes 11 and a thin built-in dielectric layer 14 over the electrodes 11a and 11b which is covered with a MgO layer 15.

All of the glass fibers are preferably formed using a fiber draw process similar to that used to produce optical fiber in the telecommunications industry. The glass fibers are drawn from a large glass preform, which is formed using hot glass extrusion. Metal wire electrodes are fed through a hole in the glass preform and are co-drawn with the glass fiber. The phosphor layers 23 are subsequently sprayed into the channels 25 of the bottom fiber 27 and a thin MgO coating 15 is applied to the top fiber 17. Sheets of top 17 and bottom fibers 27 are placed between two glass plates (16 and 24). The glass plates are frit sealed together with the wire electrodes extending through the frit seal. The panel is evacuated and backfilled with a xenon-containing gas and the wire electrodes are directly connected to the drive circuitry.

There are several advantages to creating plasma displays using arrays of fibers. The largest advantage is a reduction of over a factor of 2 in the manufacturing costs of the panel with a 10 times less capital cost requirement. These economical advantages result from a manufacturing process with no multi-level alignment process steps, no need for large area vacuum deposition equipment, about ½ the process steps (potentially leading to higher yields), simpler process steps (hot glass extrusion, fiber draw, and phosphor spraying compared to photolithography, precision silk screening, and vacuum deposition processes) and the ability to create many different size displays using the same manufacturing equipment. Although using fibers to create the structure in a display has drastically simplified the manufacturing of the panel leading to a large reduction in manufacturing cost, the initial fiber-based work had no advancements to the performance of the display.

Much advancement in fabricating fiber-based plasma displays have been achieved since the initial invention. Some process improvements in fabricating fiber-based displays are listed in U.S. Pat. Nos. 6,247,987 and 6,354,899, which include fiber, array and panel forming processes. These patents are hereby incorporated herein by reference. Since plasma displays still suffer from low luminous efficiencies and poor bright room contrast there has been a focus on using fibers to help solve some of these issues. U.S. Pat. No. 6,414,433, herein incorporated by reference, is the first indication of controlling the intra-pixel shape to increase the plasma efficiency and U.S. Pat. No. 6,771,234, also incorporated herein by reference, shows methods of increasing the length of the plasma glow to increase the displays efficiency. Adding a color filter to a display increases the bright room contrast because it subtracts out ⅔ of the reflected light (i.e. the red pixel absorbs green and blue). In traditional plasma display panels (PDPs), the concept of adding a color filter was first patented by Pioneer Electronic Corporation in U.S. Pat. No. 5,838,105, herein incorporated by reference. NEC Corporation has been fabricating plasma displays using a color filter contained within the top plate and aligning the color filter with the corresponding phosphor colors in the bottom plate, as described in U.S. Pat. No. 6,072,276, herein incorporated by reference.

One of the best methods of adding a color filter to a fiber-based plasma display is to flip the entire fiber panel upside down, as covered in U.S. Pat. No. 6,570,339, herein incorporated by reference, and shown in FIGS. 3 and 4. In these examples the fibers 47 are composed of a colored glass and are on the side of the display facing the view. The light generated from the color phosphors 23 has to be transmitted through the colored glass fibers 47B, 47G, and 47R, which increases the color purity of the display. Any incident light on the panel will be partially absorbed by the colored fibers 47, hence increasing the bright room contrast. Curved displays up to 360 degrees can be fabricated as covered under U.S. Pat. No. 6,750,605, herein incorporated by reference, because the fibers can be bent and curved glass plates can be used as the vacuum vessel. Adding lenses to the surface of the fibers also allows for the fabrication of multiple view and 3-dimensional display as covered in U.S. Pat. No. 7,082,236, incorporated herein by reference.

Small hollow tubes were first disclosed in 1974 in U.S. Pat. No. 3,602,754 CAPILLARY TUBE GAS DISCHARGE DISPLAY PANELS AND DEVICES assigned to Owens-Illinois and incorporated herein by reference. This patent was followed by U.S. Pat. Nos. 3,654,680, 3,927,342 and 4,038,577, all herein incorporated by reference, which explain methods of creating a plasma display using small glass tubes, as shown in FIG. 5. These patents cover using small glass tubes (T) with conductors (C) applied to the outside surface of the tubes. Although Owens-Illinois had the initial tubular plasma display patents all the initial work on tubular plasma displays was done by Control Data. Control Data focused on using an array of gas filled hollow tubes to produce the rib structure in a plasma display panel (PDP). The electrodes to ignite the plasma inside the tubes were placed on a glass or plastic substrate and the electroded substrates were sandwiched around the gas filled hollow tubes, as shown in FIG. 6. The Control Data work was published by W. Mayer and V. Bonin, "Tubular AC Plasma Panels," 1972 IEEE Conf. Display Devices, Conf. Rec., New York, pp. 15-18, and R. Storm, "32-Inch Graphic Plasma Display Module," 1974 SID Int. Symposium, San Diego, pp. 122-123 and included in U.S. Pat. Nos. 3,964,050 and 4,027,188, all herein incorporated by reference. Control Data Corporation also received three US Air Force contracts to develop the tubular plasma display: AD-728623, "Large Screen Plasma Display", 1971; AD-782383, "Large Area Plasma Display Module", 1974; and AD-766933, "Plasma Display Color Techniques Using Tubular Construction", 1973, incorporated herein by reference. In the last U.S. Air Force contract, Control Data focused on adding color phosphors inside the plasma tubes to create a multicolor tubular plasma display. Control Data also discloses depositing a work-function lowering substance inside the discharge tubes.

The only other known group working or having worked on tubular plasma displays is Shinoda's group at Fujitsu in Japan. The first tubular publications or patents from the Fujitsu group were in 2000. Shinoda's group has patented a method of coating a separate setter with a phosphor layer and inserting it into a plasma tube, as discussed U.S. Pat. Nos. 6,577,060, 6,677,704, 6,794,812, 6,836,063, 6,841,929, 6,930,442, 6,932,664, 6,969,292, and 7,049,748, all herein incorporated by reference. Shinoda's group at Fujitsu has also published several papers on tubular plasma display: T. Shinoda et al. "New Approach for Wall Display with Fine Tube Array Technology" SID 2002, pp. 1072-1075; M. Ishimoto et al. "Discharge Observation of Plasma Tubes", SID 2003 pp. 36-39; H. Hirakawa et al., "Dynamic Driving Characteristics of Plasma Tubes Array", SID 2004, pp. 810-813; Awanoto et al., "Development of Plasma Tube Array Technology for Extra-Large-Area Displays", SID 2005, pp. 206-209.

There is a need in the art for a durable, easy to manufacture, low cost method of forming large electronic displays.

SUMMARY OF THE INVENTION

In one embodiment of the present invention, a sheet in an electronic display is composed of a substrate containing an array of wire electrodes electrically connected to patterned transparent conductive electrode lines, as well as methods of making the sheet. The wire electrodes, which are defined as a highly conductive thread-like or fiber-like material, are used to carry the bulk of the current. The wires are formed using a standard wire forming process; they are free standing entities and are not evaporated or deposited on the substrate. The wire electrodes are capable of being extended away from the substrate and connected directly to a printed circuit board. The transparent conductive electrode (TCE) is used to spread the charge or voltage from the wire electrode across the pixel. It is a patterned film and, in most display applications, must be at least 50% transparent, and is preferably over 90% transparent. The TCE is preferably composed of a transparent conductive polymer, nanotubes, or a PVD material like ITO. The TCE must form a good electrical connection with the wire electrode (low interface resistance) and must be electrically connected to the wire electrode along most of the length of the electrode. The TCE material does not have to have a high conductivity because it only needs to be conductive enough to spread the charge or voltage across the pixel width. The substrate that houses the wires/TCE strips is preferably polymer or glass. Use of a thin polymer substrate yields a light, flexible, rugged sheet that can be curved, bent or rolled.

In order for the electroded sheet (eSheet) to be used in most display applications, the electroded surface is preferably flattened. The electroded sheet may be used as an addressing plane in a passive or actively addressed display. Alternatively, it may be used as a sustainer layer or addressing layer in a tubular plasma display. The electroded sheet may be used to capacitively address an electro-optic material or capacitively set-up the charge in a panel. The electroded layer may also be used as current carrying strips to address materials such as electrochromic materials or organic light emitting materials.

Another embodiment of the present invention discloses a new tubular plasma display that can be very economically manufactured in very large sizes, that is very light weight, incorporates a color filter to solve the bright room contrast issue and can be rolled or bent.

The tubular plasma display (TPD) is composed of an electroded sheet and an orthogonal array of plasma tubes both containing wire electrodes that are connected directly to drive electronics. The electroded sheet is composed of a thin (preferably <0.005" thick) flexible polymer substrate with embedded wire electrodes. More than one wire electrode may be used per electrode line and a transparent conductive coating may be attached to the wire(s) to spread the extent of the electric field. In order to create a durable flexible electroded sheet, the transparent conductive electrode is preferably composed of a polymer-based material, like Baytron, or carbon nanotubes.

Each tube in the plasma tube array preferably contains at least one wire electrode, a hard emissive coating (containing carbon nanotubes in one embodiment), and a color phosphor coating and is individually sealed containing a plasma gas. Polymer-based color filter coatings may also be applied to the surface of the plasma tubes after they are gas processed and sealed to drastically increase the bright room contrast, brightness, and color purity of the display. The plasma tubes are preferably created using hot glass extrusion followed by a tube draw, therefore tight dimensional control is obtained and the intra pixel shape may be tailored to provide for the most efficient plasma kinetics.

Since the electrodes in both the electroded sheet and the plasma tube array are preferably composed of very conductive wires, extremely large tubular plasma displays may be addressed. The thin lightweight flexible electroded sheets may be bonded to one surface of the plasma tube array using a pressure sensitive adhesive. The wire electrodes from the plasma tubes may extend away from the tube array and be electrically connected to the drive electronics at a 90 degree angle from the ends of the tubes. Therefore, even an extremely large panel is capable of being tightly rolled across the tube direction creating a color video display that may be rolled up around a pencil. These tubular plasma displays (TPDs) only require a few manufacturing process steps none of which are alignment process steps, photolithography steps nor large vacuum deposition equipment. Therefore, very large tubular plasma displays can be economically manufactured.

In another embodiment of the present invention, two or more displays are combined together to form an electronic display. One type of dual-purpose display is constructed using an electronic sign attached to a color video display. The color electronic sign is reflective and bistable and when in the off state is transparent. Therefore, placing the electronic sign in front of the color video display allows the video image to be presented through the electronic sign. A rollable dual-purpose display is formed by attaching a three-layer stacked color electronic sign formed using electroded sheets to a tubular plasma display formed using a tube array attached to an electroded sheet. Lenses may be designed into the tubes or electroded sheets to form a three-dimensional display or a multiple view display. Images may also be displayed on both sides of the electronic panel creating a double-sided display.

BRIEF DESCRIPTION OF THE DRAWINGS

FIG. 12b schematically shows the wires imbedded in the polymer film using the process shown in FIG. 12a.

FIG. 13b schematically shows the wires with TCEs with polymer film after the process of FIG. 13a.

FIG. 14b schematically shows the wires with TCEs with polymer film after the process of FIG. 14a.

FIG. 60 schematically shows the root of a fiber or tube draw process showing the forces exerted in the root above and below the point of inflection.

DETAILED DESCRIPTION OF THE INVENTION

Figure 1:
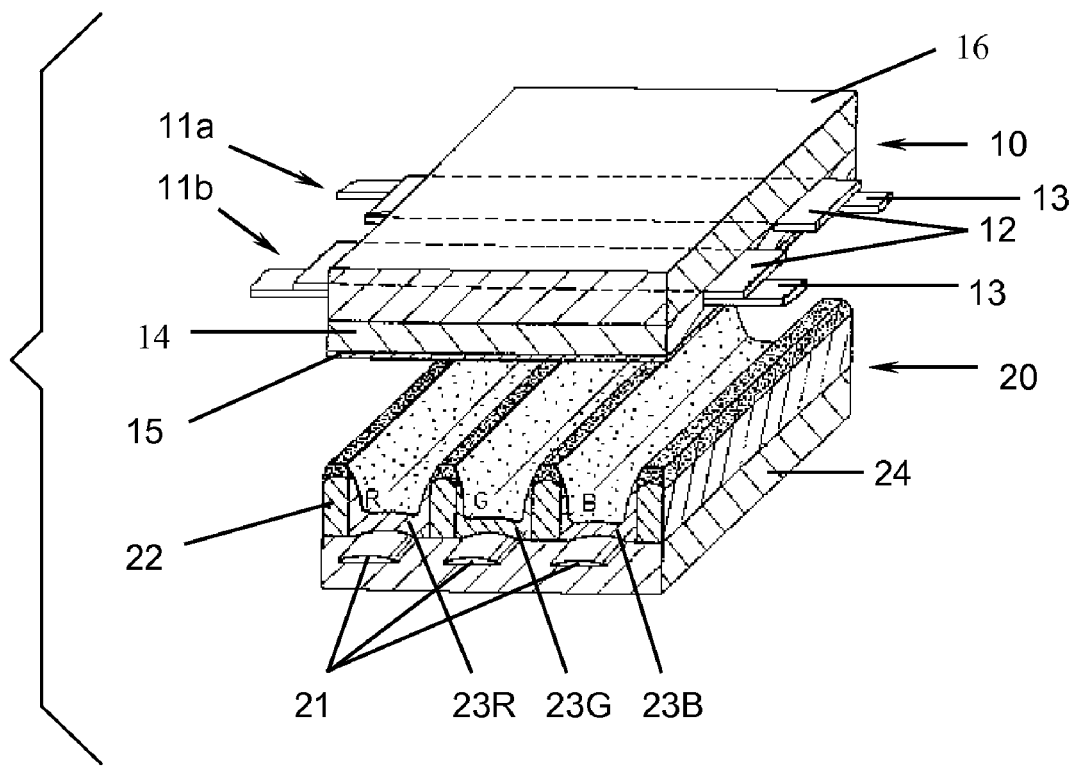
FIG. 1 illustrates a standard plasma display in accordance with the prior art.
Figure 2:
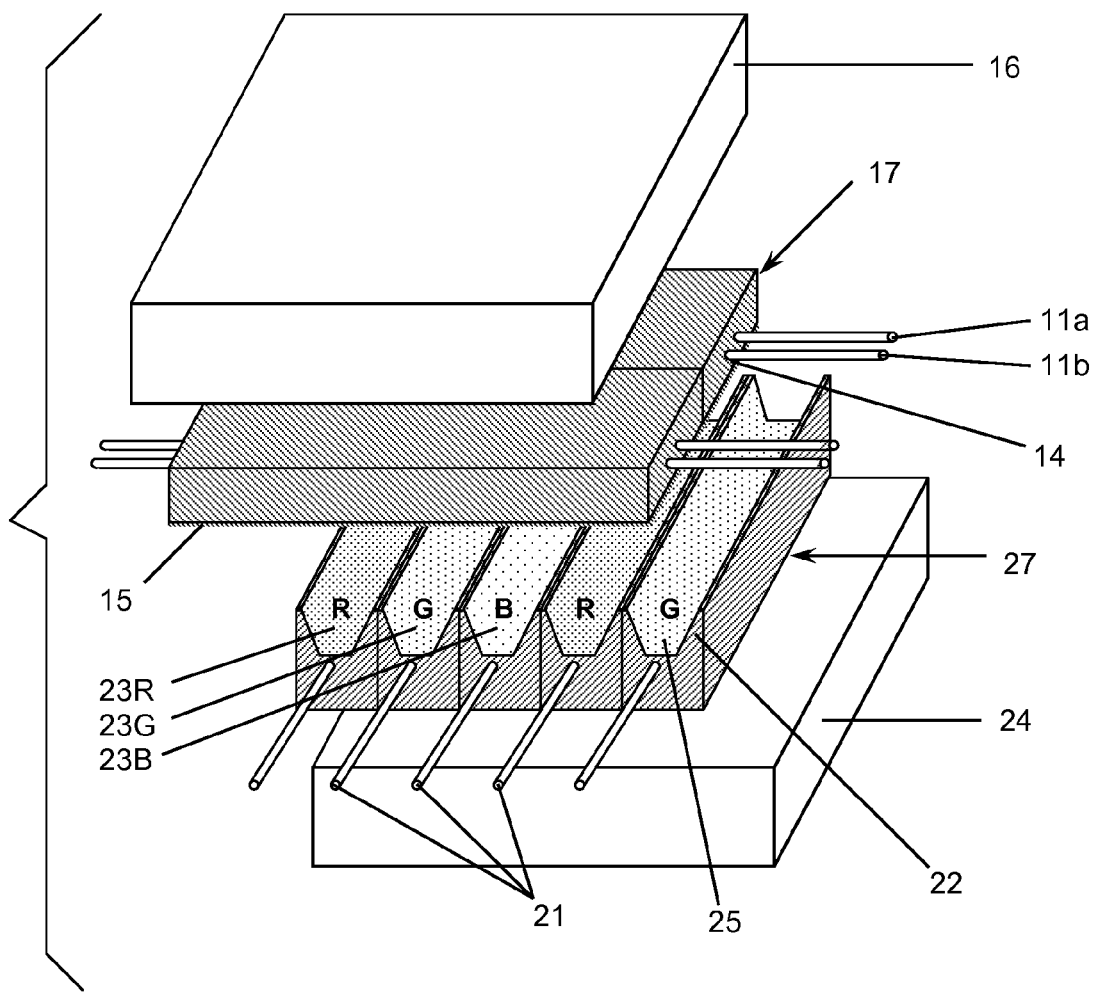
FIG. 2 illustrates a fiber-based plasma display with all functions of the display integrated into the fibers with embedded wire electrodes in accordance with the prior art.
Figure 3:
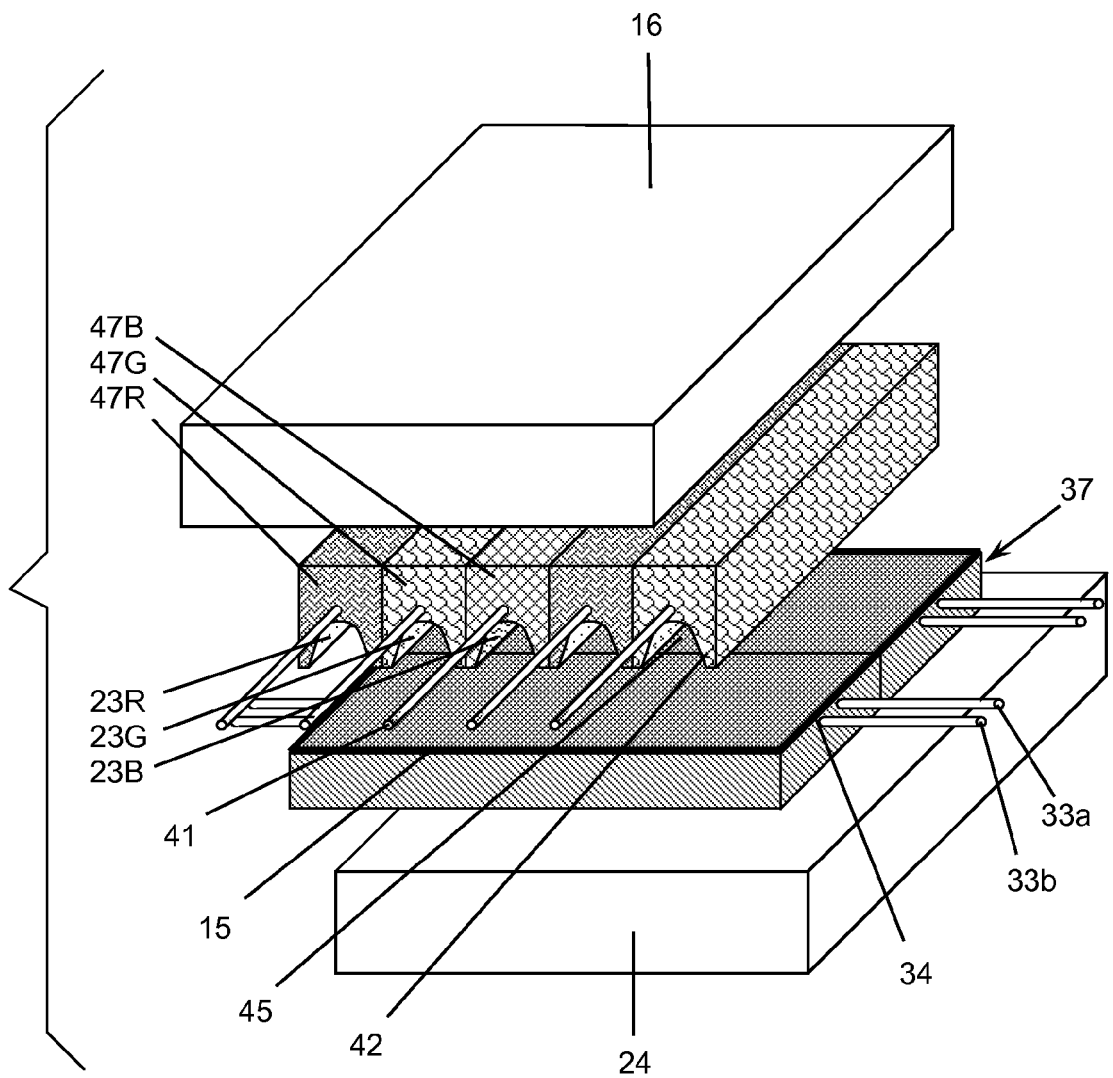
FIG. 3 illustrates a fiber-based plasma display composed of an array of fibers containing the phosphor coatings on the side facing the viewer and an array of fibers containing the sustain electrodes in accordance with the prior art.
Figure 4:
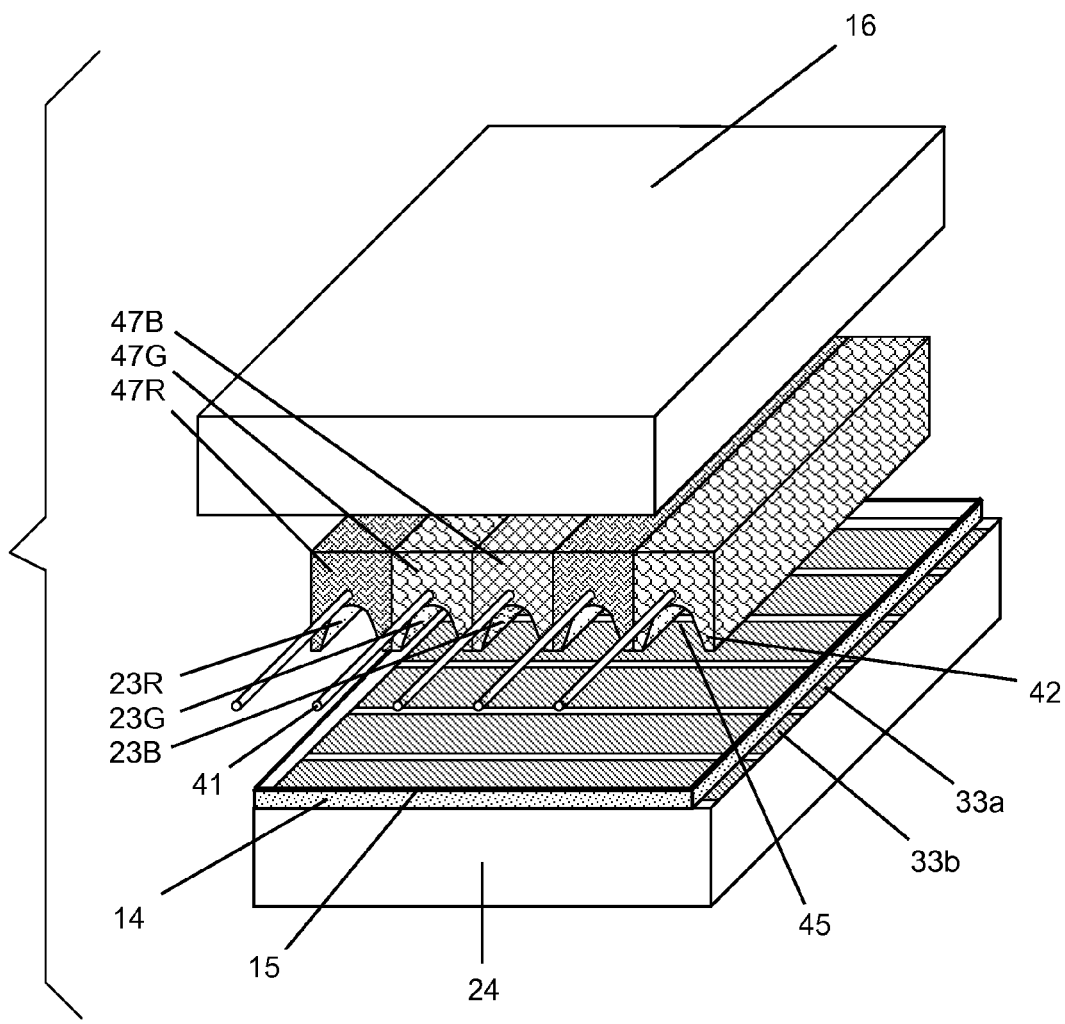
FIG. 4 illustrates a fiber-based plasma display composed of an array of fibers containing the phosphor coatings on the side facing the viewer in accordance with the prior art.
Figure 5:
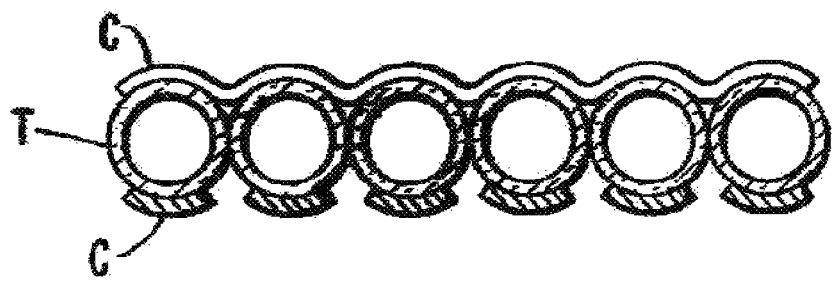
FIG. 5 illustrates a plasma display with plasma tubes and electrode films attached to the outside of the plasma tubes in accordance with the prior art.
Figure 6:
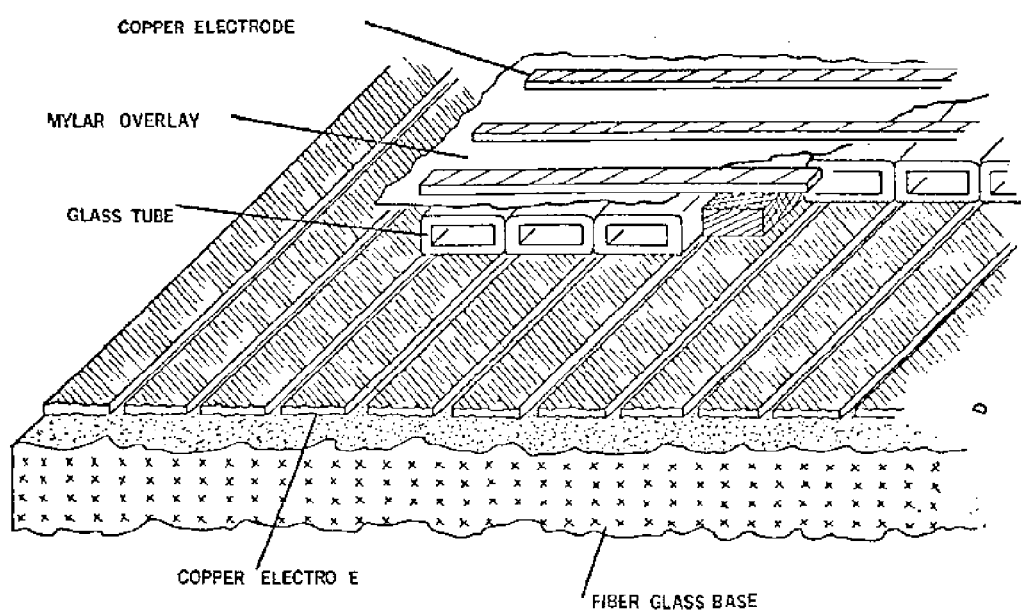
FIG. 6 illustrates a plasma display with plasma tubes in accordance with the prior art.
Figure 7:
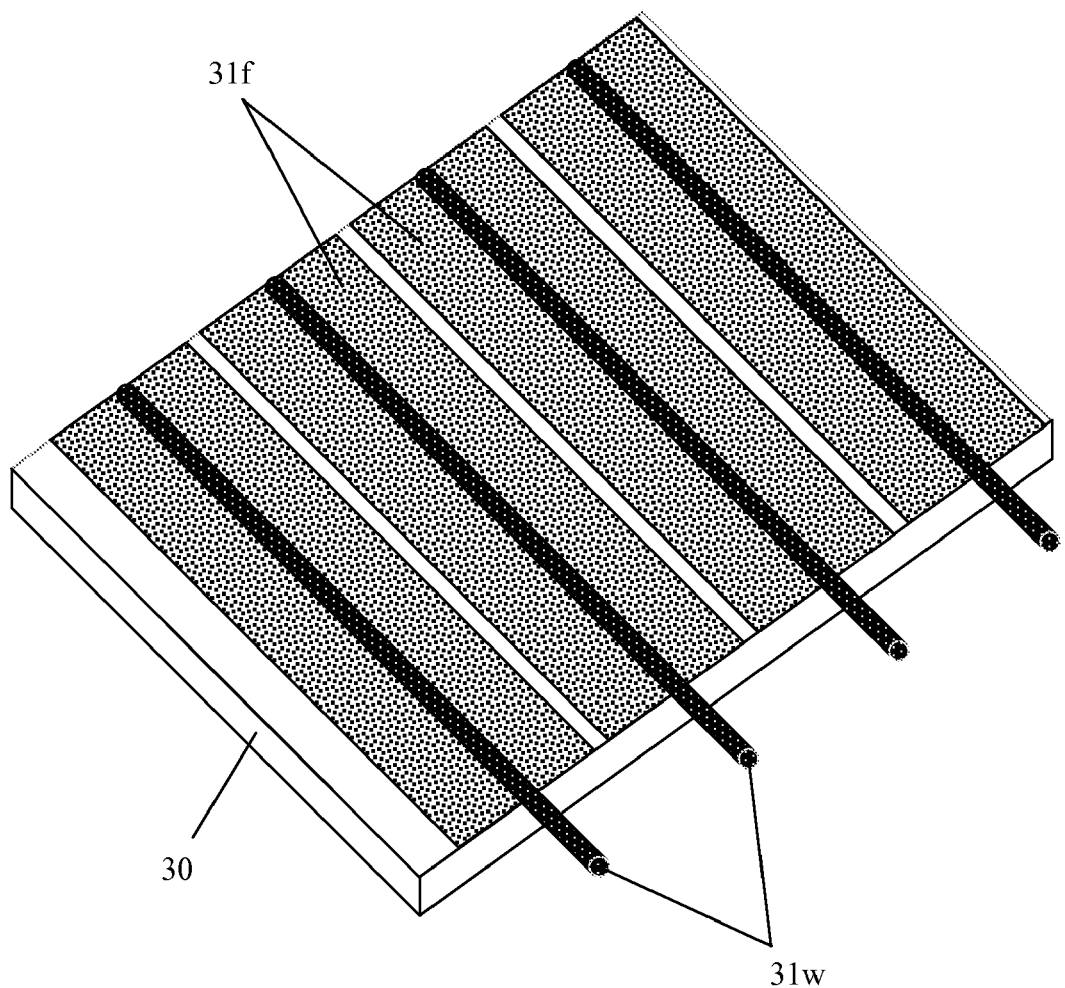
FIG. 7 schematically shows an array of wire electrodes electrically connected to transparent conductive lines on a substrate.

In one embodiment of the present invention, a layer in an electronic display is composed of a substrate 30 containing an array of wire electrodes 31w electrically connected to patterned transparent conductive electrode 31f lines, as shown in FIG. 7. The wire electrodes 31w, which are defined as a highly conductive thread-like or fiber-like material, are used to carry the bulk of the current. The wires are formed using a standard wire forming process; they are free standing entities and are not evaporated or deposited on the substrate. The wire electrodes 31w are capable of being extended away from the substrate 30 and connected directly to a printed circuit board. The transparent conductive electrode (TCE) 3 if is used to spread the charge or voltage from the wire electrode 31w across a pixel. The TCE 31f is a patterned film that, in most flat panel display applications, must be at least 50% transparent, and is preferably greater than 90% transparent. The TCE 31f must form a good electrical connection with the wire electrode 31w (low interface resistance) and must be electrically connected to the wire electrode 31w along most of the length of the electrode. The TCE material does not have to have a high conductivity because it only needs to be conductive enough to spread the charge or voltage across the pixel width. The substrate 30 that houses the wires/TCEs strips is preferably polymer or glass. Use of a thin polymer substrate 30 yields a light, flexible, rugged sheet that may be curved, bent or rolled.

Using a wire combined with a TCE to form the electrode strips allows for very high speed addressing of a very large display. The wire electrode, which is used to carry the bulk of the current along the length of the line, has a low resistive drop because it can be composed of a highly conductive material, like copper, and also has a large cross-sectional area compared to a metal film electrode ($R=\rho l/A$). In order to get a metal film electrode with a low resistivity, the metal has to be deposited using a physical vapor deposition (PVD) process like e-beam evaporation or sputtering, then patterned and etched, which is very costly. Reasonable conductivity may be alternatively achieved using a screen printed silver paste; however, the silver paste has to be fired at elevated temperatures (~400° C.) to achieve any real conductivity, which is much too high a temperature for most polymers. Most metal conductive coatings that may be economically applied to polymer substrates have only slightly better conductivity (~5Ω/□) compared to the most conductive ITO films (~10Ω/□).

Controlling the addressing of a large display requires that the voltages applied to the electrodes be uniformly brought up to voltage along the entire length of the line especially if grayscale addressing is required. The lines have resistance along their length and are capacitively coupled to the orthogonal electrodes. The time for the far end of the line to come up to 98% of the total voltage is $\tau=4RC$. Assuming a 3'×6' display at 20 dpi is used to address a 5 μm thick liquid crystal with an average dielectric constant of 15, then the total line capacitance is 62 nF. If the line was formed using a highly conductive transparent material with a sheet resistance of 100Ω/□ then the resistance of the entire line would be 144 kΩ and the line would take 8.9 ms to come up to 98% of the total voltage. If a 0.002" diameter copper wire is used to carry the current along the length of the electrode, the line resistance would be reduced to 15Ω and take less than 1 μs to come up to voltage.

The wire electrode may be composed of any composition; however using a lower resistivity base material yields the most conductive wire. One potential issue with a highly reflective colored material like copper is that it changes the color of the electroded layer. One method of removing this reflective copper color is to coat the wire electrode with a black absorbing film. This black absorbing layer has to be electrically conductive so it can make good electrical connection to the transparent conductive electrode (TCE). The TCE is preferably composed of one or more of many different materials including, but not limited to, 1) a conductive polymer, such as that sold by Bayer called Baytron®, which also goes by the names of Poly(3,4-ethylenedioxythiophene) poly (styrenesulfonate) or $[-CH_2CH(C_6H_4SO_3H)-]_m[-CH_2CH(C_6H_4SO_3)-]_{0.33n}/[C_6H_4O_2S-]^{0.33+}n$ or PEDT/PSS or PEDOT/PSS; or 2) a nanotube or nanorod coating, such as composed of a single wall carbon nanotube or multi-wall carbon nanotubes; or 3) a physical vapor deposited (PVD) film, such as indium tin oxide (ITO) or zinc oxide doped with fluorine (ZnO:F). There are many different types of TCE films that may be used, the above films are listed as examples only and are not intended to be an exclusive listing of all the different TCE films.

There are many different methods of applying the TCE coatings. The TCE coatings may be sprayed using a traditional spraying system, however for some of the TCE coatings, like the nanotube solutions, it would be advantageous to use an ultrasonic sprayer to help break the nanotubes apart as they are sprayed. The TCE coating may also be sprayed using an airbrush, which is useful in that its spray opening may be very well controlled to only let small particles through, hence controlling any agglomerates. Alternatively, the TCE coatings may be printed, which would allow for a low cost method of patterning the lines. Some examples of the printing process include, but are not limited to, transfer printing, screen printing, inkjet printing, and intaglio printing. If a TCE slurry solution is used, then the TCE coating may alternatively be brush coated, dip coated, spin coated, extruded, etc. If the TCE coating is a hard coating, like ITO, then a physical vapor deposition (PVD) process is required like e-beam evaporation, sputtering, CVD, arc spraying, etc.

The TCE coating has to be patterned into lines to electrically isolate one wire with TCE from its adjacent electrode. If a precision printing process is used, then the TCE coating may be easily patterned during the deposition process. If a directional coating process is used to deposit the TCE film like spraying or some of the PVD processes, then a shadow mask may be used to pattern the TCE film into lines. The TCE coating may alternatively be patterned by applying an additional patterned coating, like photoresist, to protect the TCE during an etching process. The patterning and etching process may use several different masking films and methods of applying the masking films and may use a wet or dry etching process to pattern the TCE into lines. The TCE coating may alternatively be patterned into lines using a lift-off process, where prepattern lines are placed on the substrate at the points where the TCE is to be separated then after the TCE film is deposited, the prepatterned lines are removed separating the TCE film into lines. The prepatterned lines may be a polymer, like photoresist, or hard lines like wire, fiber or thread that is removed once coated, which is very similar to a shadow mask. The TCE film may alternatively be cut into lines using a scraping tool or cut with a laser. The TCE film could also be cut by forcing wedge shaped line objects down into the coating. Adjacent TCE coatings may alternatively be electrically isolated by coating the film along the separation lines with a material the reacts with the TCE to destroy the conductive nature of the film. The conductive nature of the TCE film may also be destroyed using heat from a laser beam. There are many different methods of depositing a patterned transparent conductive electrode (TCE), the above methods are listed as examples only and are not intended to be an exclusive listing of all the different coating and patterning methods.

Figure 8A:
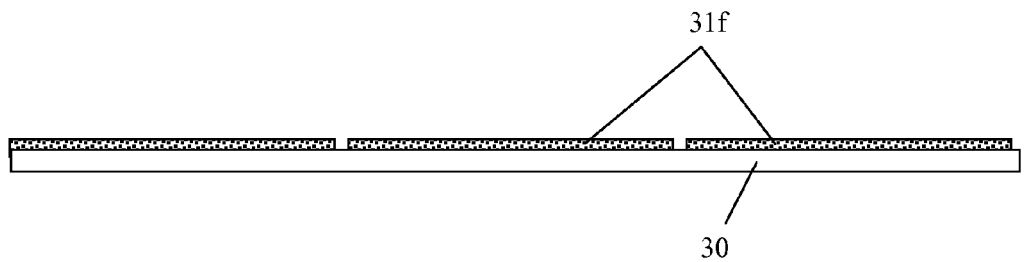
FIG. 8a schematically shows a cross-section of a substrate with an array of transparent conductive lines on a substrate.
Figure 8B:
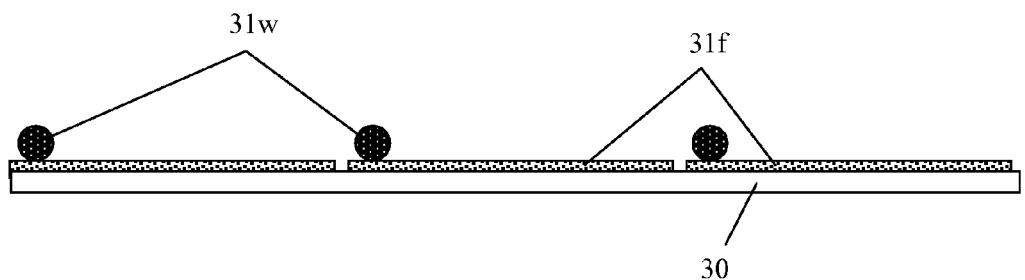
FIG. 8b schematically shows a cross-section of the structure in FIG. 8a with wire electrodes added to the transparent conductive lines.
Figure 8C:
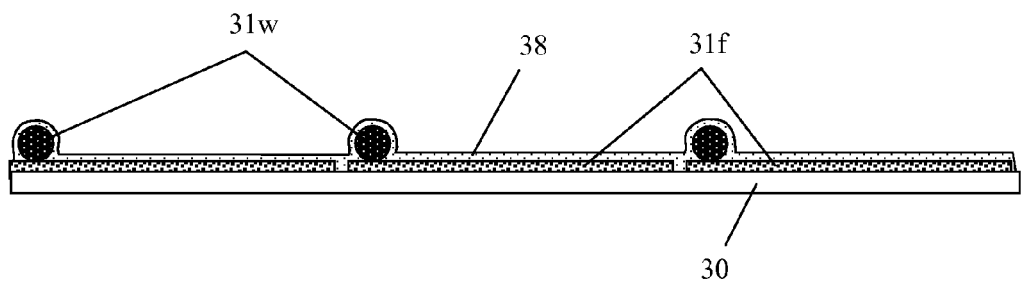
FIG. 8c schematically shows a cross-section of the structure in FIG. 8b with a lockdown film across the wire electrodes.

FIG. 8 shows a method of forming the electroded sheet where the wires 31w and the TCEs 31f are placed on a thin polymer or glass substrate 30 and locked down onto the substrate with a film or coating 38. This electrode configuration allows for electrical communication with the rest of the display through thin polymer or glass substrate 30. This structure requires a voltage drop across the thin substrate, but if the thickness of the substrate is very uniform, then the electric field is very uniform across the pixel and panel. FIG. 8a shows the first step in the process where the TCEs 31f are deposited in a pattern on the substrate 30. FIG. 8b shows wire electrodes 31w applied to the TCEs 31f. A lock down coating 38 is applied over the electrodes to hold them in place, as shown in FIG. 8c. Note that the patterned TCEs 31f do not have to be wide lines, but may have structure associated with them, such as sometimes used in a sustainer plate for a plasma display like a tubular plasma display discussed below.

Figure 9:
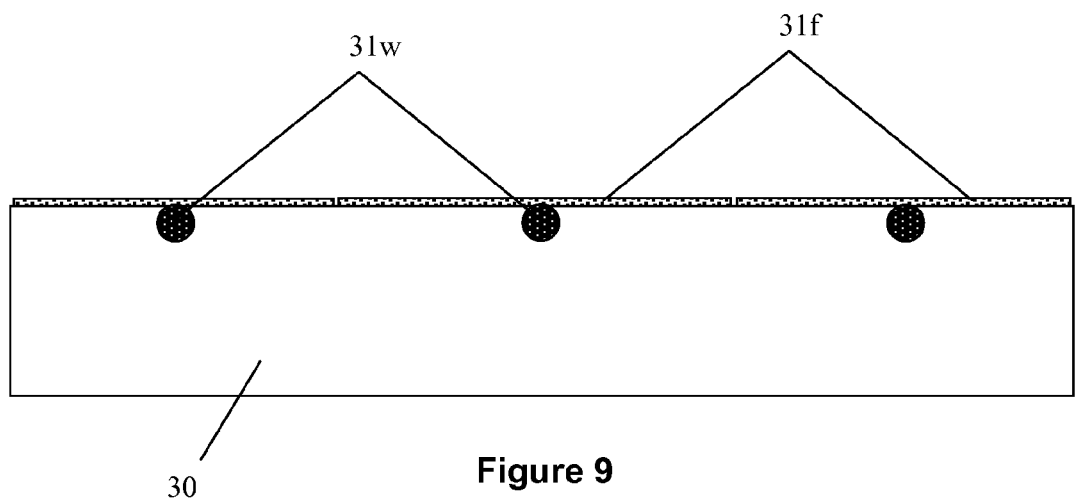
FIG. 9 schematically shows a cross-section of wire electrodes imbedded in the surface of a substrate and electrically connected to transparent conductive electrodes (TCEs).

Some applications require that the electrodes are located on the surface that is in contact with the electro-optic material to either supply current to the electro-optic material, such as an electrochromic device or an organic light emitting display (OLED), or to maximize the voltage across the electro-optic material. It is also imperative in most of these displays that the surface of this electroded sheet be flat. Therefore, the wire electrodes 31w have to be imbedded into the surface of the substrate 30. FIG. 9 shows an example of an electroded sheet where the wire electrodes 31w are imbedded into the surface of the substrate 30 and TCEs 31f are applied to the surface of the substrate 30 and electrically connected to the wire electrodes 31w. Although the substrate 30 may be glass, it is much easier to imbed wire into the surface of a plastic plate.

Figure 10:
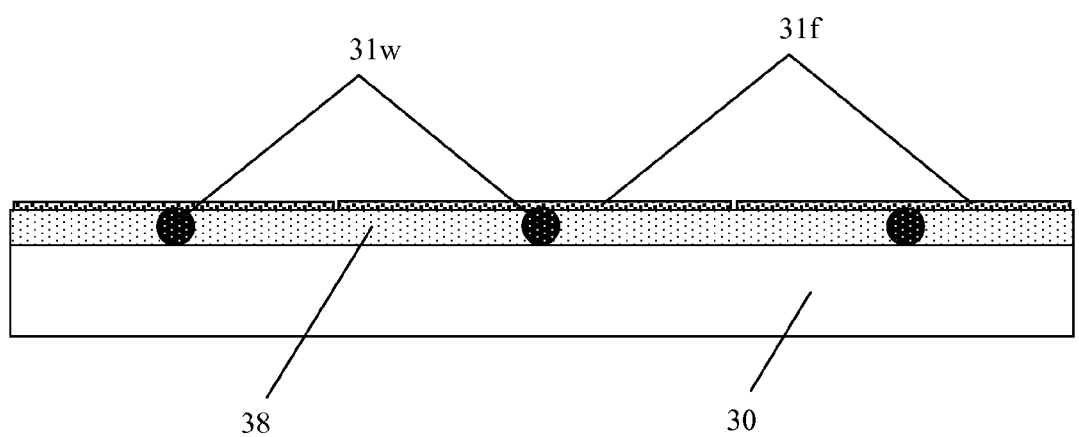
FIG. 10 schematically shows a cross-section of wire electrodes imbedded in the surface of a polymer film on a substrate and the wire electrodes electrically connected to TCEs.

FIG. 10 show another example of wire electrodes 31w imbedded into a substrate. In this case, a substrate 30 is coated with a polymer layer 38 containing wire electrodes 31w, which are connected to the TCEs 31f. The polymer layer 38 locking the wire electrodes 31w to the substrate may be formed using many different processes. The wires 31w may be extruded with the polymer layer 38 directly onto the surface, the wires 31w could be arrayed on the surface and coated with the polymer layer 38, or the substrate 30 could contain the polymer layer 38 and the wire electrodes 31w could be simply pushed into the polymer layer 38. The substrate 30 may be composed of glass, however, if a flexible, rugged electroded sheet is required then it is advantageous to use a polymer substrate. One low cost, readily available flexible material is a polymer coated polyethylene terephthlate (PET, sold by DuPont under the trademark Mylar®) film.

Figure 11:
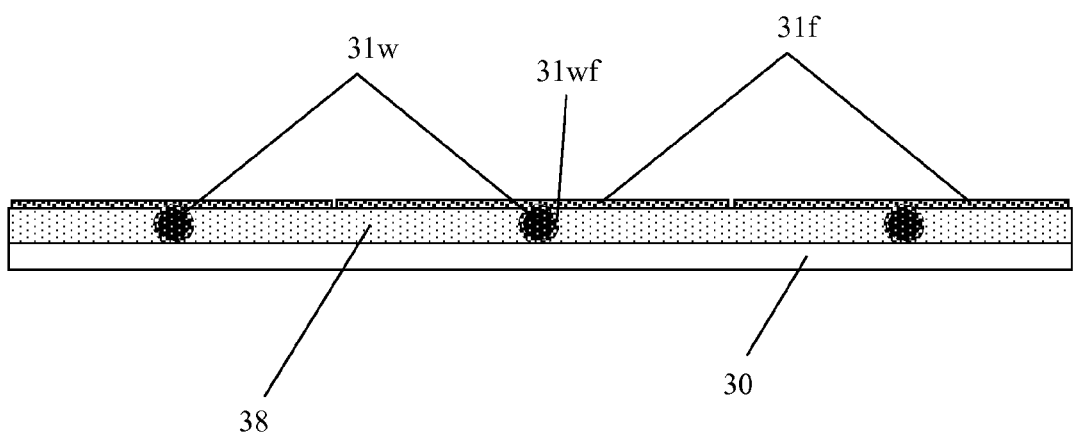
FIG. 11 schematically shows a cross-section of a structure similar to that in FIG. 10 where the wire electrodes are coated with an electronically conductive film.

FIG. 11 shows the wire electrodes 31w coated with a conductive coating 31wf in one embodiment of the present invention to lower interface resistance between the wire 31w and the TCE 31f. This wire conductive coating 31wf may be formulated to have a lower interface resistance with the wire electrode 31w. Adding nanotubes or nanorods to the wire conductive coating helps connect the wire electrode 31w to the transparent conductive electrode 31f during the subsequent flattening process, discussed below. The coating 31wf may alternatively be black or absorbing to remove any reflection from the wire electrode. For example, adding a black conductive coating to a copper wire 31w removes the "copper" tint in the layer. A wire coating 31wf also helps the wire 31w adhere to the polymer film 38. The wire electrode, which may have any cross-sectional shape including, but not limited to, round, oval, square, rectangular, or triangular shape, may also have surface structure to help it stick to polymer film 38.

FIG. 12 represents a method of creating the electroded sheet by forcing an array of wire electrodes 31w onto a polymer coated 38 substrate 30 and then spray coating 31s TCE 31f lines onto the wires 31w using a mask 69. FIG. 12a shows forcing the wires 31w into the surface of the polymer film 38. Two flat glass plates 19a and 19b are sandwiched around the wires 31w and polymer coated 38 substrate 30. By applying force to the plates and heat to soften the polymer film 38, the wires 31w may be pushed into the polymer film 38 surface. Some examples of applying force to the plates 19 include, but are not limited to, using a ram, a pressurized bladder or a vacuum bag.

Figure 12A:
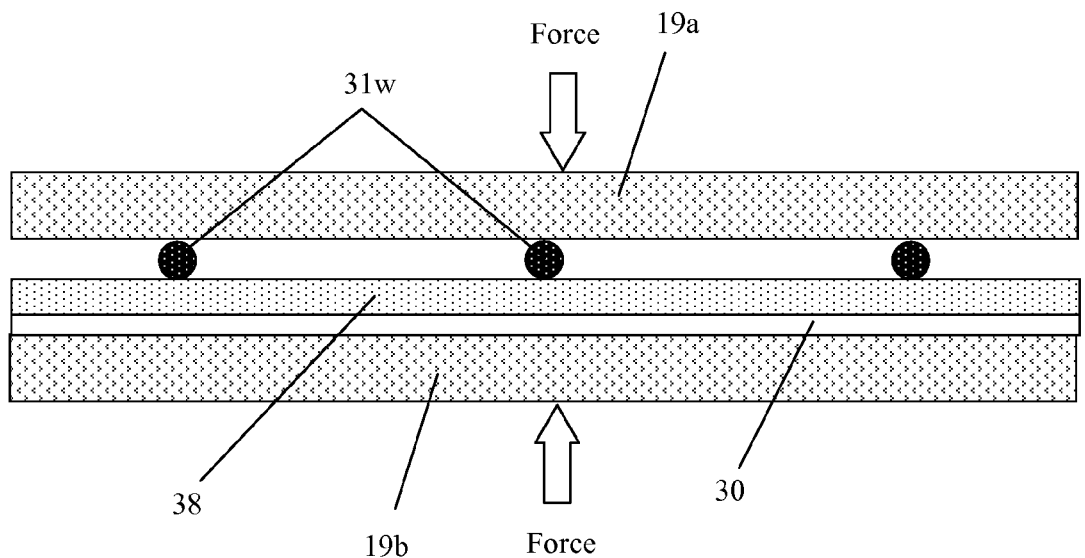
FIG. 12a schematically shows a method of using glass plates to force wires into the surface of a polymer coated substrate.
Figure 12B:
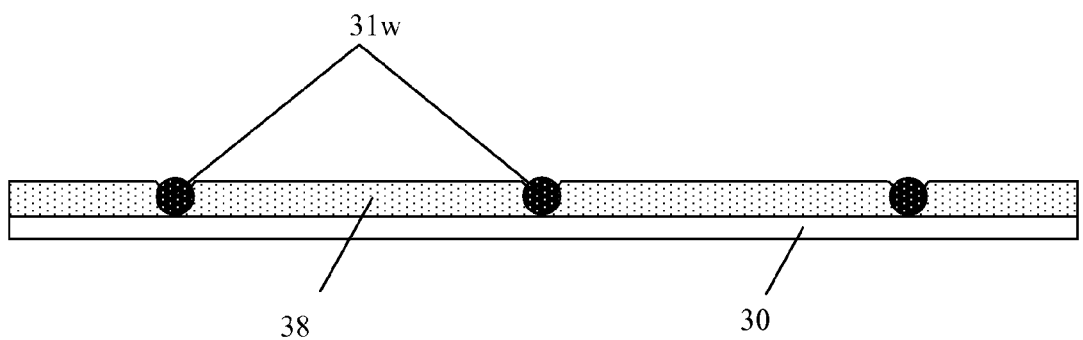

One advantage of using glass plates 19 to push the wires 31w into the surface of the polymer film 38 is that the glass plates produce a very flat surface with the wire electrode 31w and the polymer film 38 all in the same plane, as shown in FIG. 12b. This very flat surface provides a well controlled electro-optic cell gap. Several different methods could be used to push the wire electrode 31w into the polymer 38 surface. The wires 31w and coated 38 substrate 30 may be pulled through a die or they may be pulled through or across rollers. The entire process may alternatively be done in a roll-to-roll process.

One advantage of using a polymer film 38 on a higher temperature substrate 30 like PET is that the PET substrate 30 will not soften during the wire 31w imbedding process and thus acts as a backstop for the wire electrodes 31w. Therefore, the maximum final depth of the wire electrodes 31w into the polymer film 38 is limited to the total thickness of the polymer film (minus the extra volume that the wires displace). Therefore, if the diameter of the wire electrodes 31w is larger than the thickness of the polymer film 38, then the wire electrodes 31w are not totally imbedded into the polymer film 38. These protruded wire electrodes 31w may be used to form spacers for an electro-optic material when the electroded sheet is placed against a second substrate.

Figure 12C:
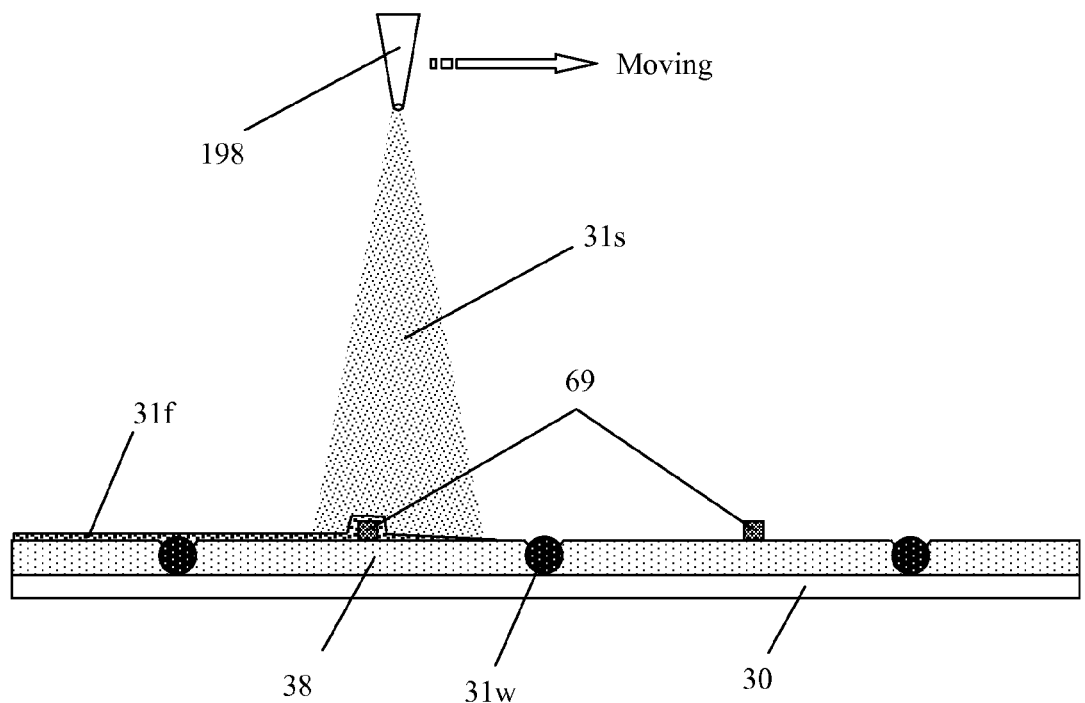
FIG. 12c schematically shows a process of patterning TCEs on the surface of a substrate.
Figure 12D:
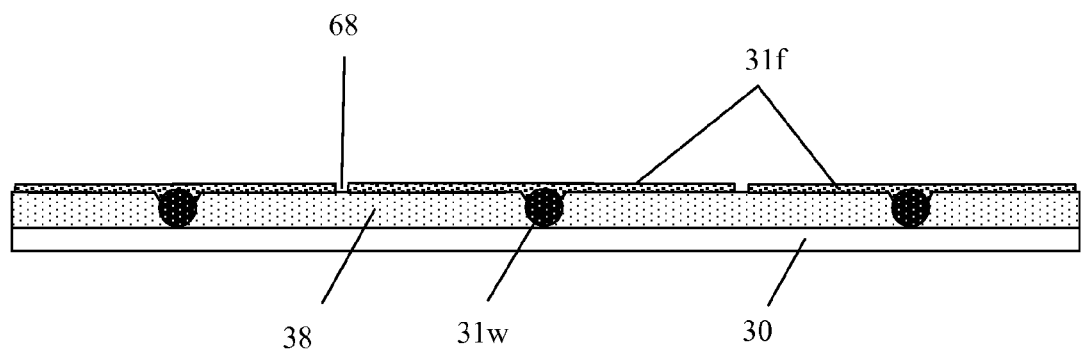
FIG. 12d schematically shows the final electroded sheet with the wire imbedded in a polymer and electrically connected to TCEs.

Once the wires 31w are forced into the surface of the polymer film 38, TCE 31f lines are patterned across the wire electrodes 31w. FIG. 12c shows a method of using a sprayer 198 to spray 31s a transparent conductive material onto the wire electroded surface. The transparent electrode material 31f is shadowed or blocked from depositing on the surface using a shadow mask 69. Some examples for the shadow mask include, but are not limited to, wire, fiber, monofilament, or even a thread, which is preferably coated to reduce the "hair" on the sides of the thread. It is also advantageous to wrap the wire 31w imbedded substrate 30 with the shadow mask 69 onto a curved surface to keep the shadow mask 69 tight against the surface of the polymer film 38 during the spraying 31s process. When the shadow mask 69 is removed, it creates openings 68 in the TCE 31f material, hence patterning it into lines and electrically isolating each electrode line from its adjacent electrode counterpart, as shown in FIG. 12d. Once the wire electrodes 31w are forced into the surface of the polymer film 38, any process may be used to deposit and pattern the TCEs 31f.

FIGS. 13 and 14 show methods of creating the electroded sheet which are similar to that explained in FIG. 12 except the TCEs 31f are placed under or over the wire electrodes 31w before they are pushed into the surface of the polymer film 38.

Figure 13A:
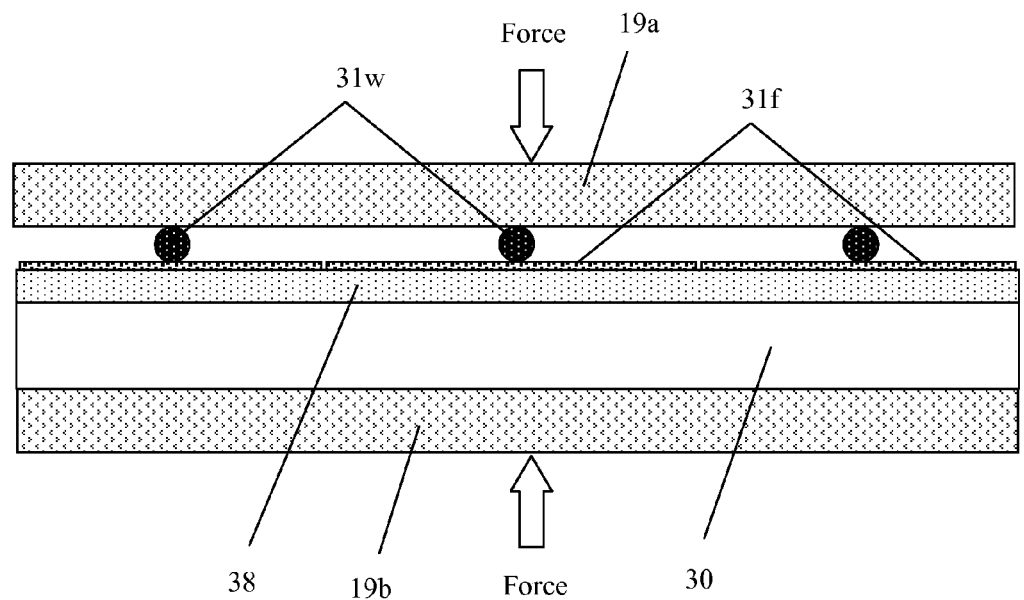
FIG. 13a illustrates a method of placing wire electrodes over TCEs and forcing them to flow into the surface of a polymer.
Figure 13B:
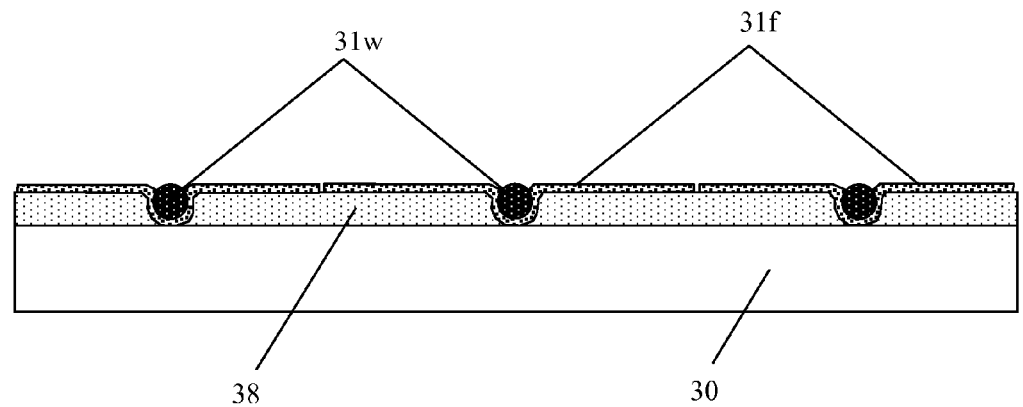

FIGS. 13a and 13b show a method of placing the patterned TCEs 31f under the wire electrodes 31w as they are forced into the polymer film 38 coated substrate 30. This method of forming the electroded sheet requires that the TCE 31f coating is thermoformable or can flow. Some conductive polymer films are thermoformable and the nanotube coatings are flowable to some degree, however most of the PVD films like ITO tend to break up when forced to flow.

Figure 14A:
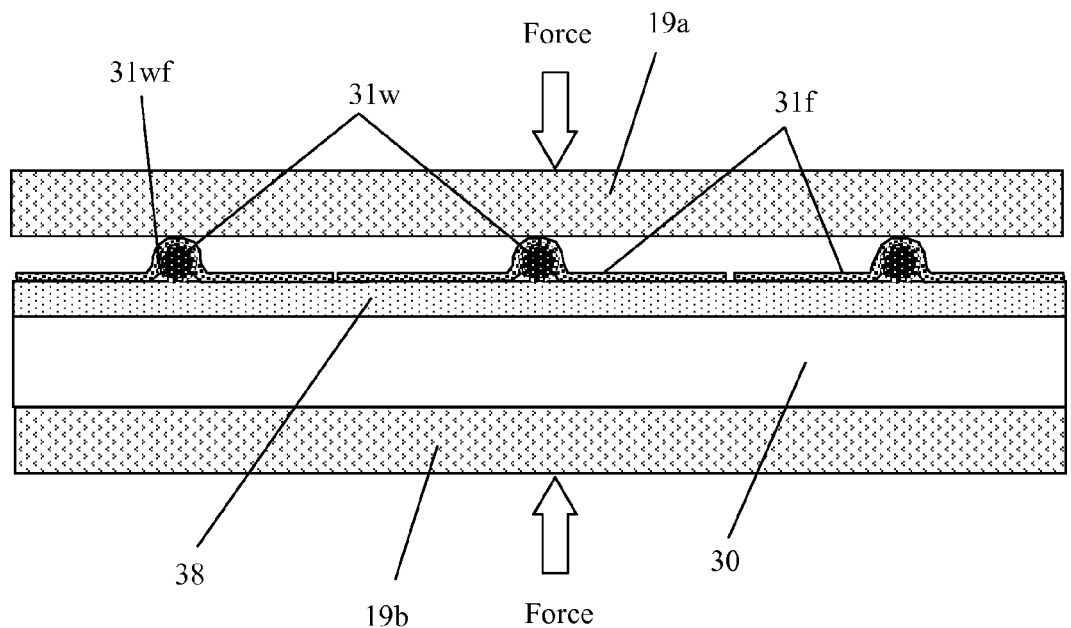
FIG. 14a illustrates a method of placing TCE lines over wire electrodes and forcing them to flow into the surface of a polymer.
Figure 14B:
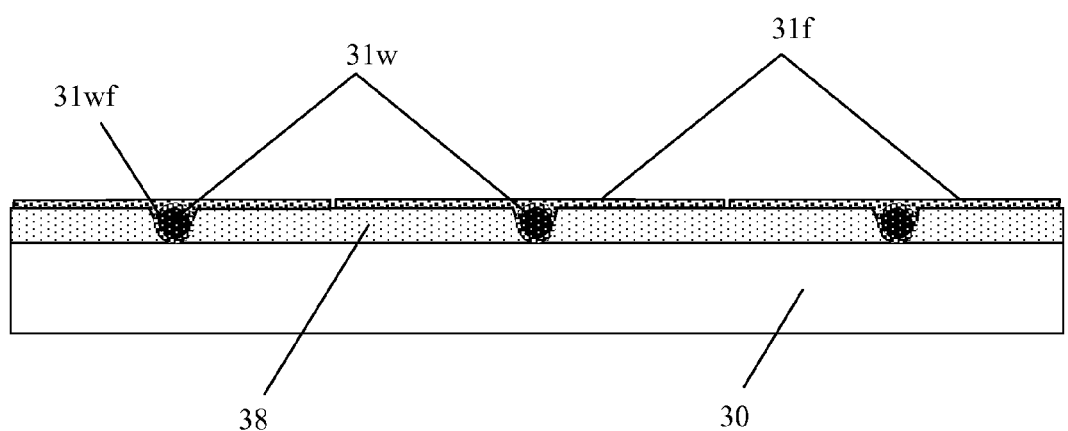

FIGS. 14a and 14b show a method of covering the wire electrodes 31w with patterned TCEs 31f and forcing them to flow into the surface of polymer film 38. Coating the wire electrodes 31w with a conductive film 31wf helps keep the wires 31w electrically connected to the TCEs 31f during the flowing process. Also if the TCE 31f is composed of carbon nanotubes, then when the flat glass plate 19 pushes against the nanotube coating any nanotubes sticking up will be either forced flat or into the polymer film 38, such that they do not protrude into electro-optic material and affect the local electric field in the electro-optic layer after display assembly.

Drum Process

The above examples all explain methods of pushing the wire electrodes 31w into a polymer substrate 30 or a polymer film 38. Pushing the wire electrodes 31w into the substrate 30 or 38 with a plate 19 creates an electroded substrate 30 or 38 where the wire electrodes 31w are even with the top of the substrate and the plate 19 creates a very flat surface. However, the plate 19 is in contact with the polymer surface 30 or 38, which may create contamination or cause the polymer substrate 30 or 38 to stick to the plate 19. Another method of placing the wire electrodes 30w into the polymer surface is to force the polymer 30 or 38 to flow into the wire electrodes 31w, such as tensioning wires 31w on a curved polymer 30 or 38 surface.

Figure 15:
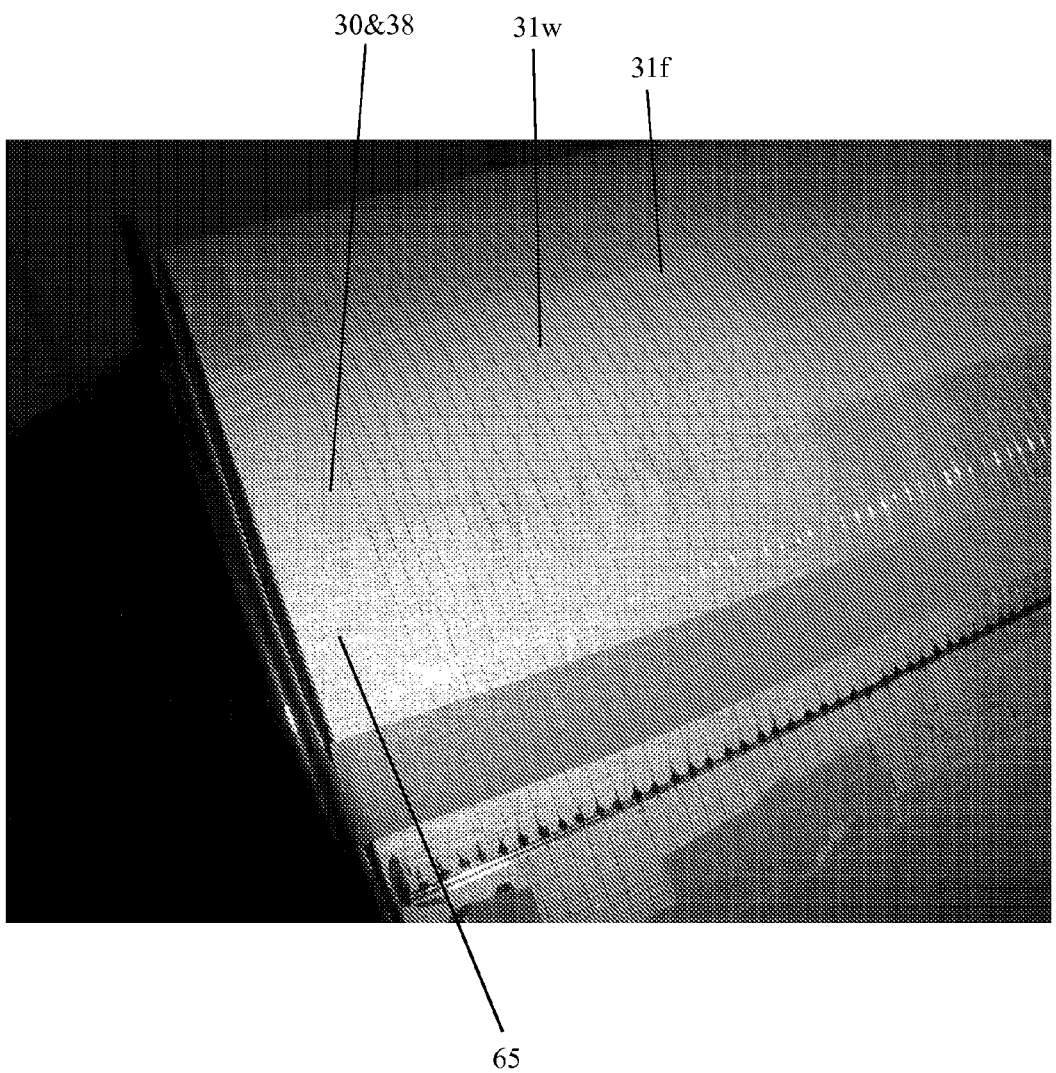
FIG. 15 is a photograph of a drum showing the process of imbedding wires into a polymer coated PET sheet.

FIG. 15 shows a method of using a drum 65 to force a polymer 38 coated substrate 30 out into wrapped wires 31w. The drum 65 is wrapped with a polymer 38 coated substrate 30 (like a PET substrate) with the polymer coating 38 facing outward. The wire electrode 31w is then wrapped around the drum 65 across the surface of the polymer 38 coated PET substrate 30. The wrapped drum 65 is then heated to soften the polymer coating 38. During the temperature change, the drum 65 and the wire 31w expand. Choosing a drum 65 material that has a higher expansion coefficient than the wire 31w places the wire 31w under tension and forces the wire 31w into the surface of the polymer 38. The effective length of wire 31w on the drum 65 after the increase in temperature ΔT as a result of the expansion of the drum is given by $$L_w(\Delta T_D) = \pi[d_D(1+CTE_D \Delta T) + 2t_s + 2r_w] \quad \text{Equation 1}$$

where $d_D$ is the diameter of the drum 65, $CTE_D$ is the coefficient of thermal expansion of the drum 65, $t_s$ is the thickness of the PET substrate 30 and $r_w$ is the radius of the wire electrode 31w. The effective length of the wire 31w on the drum 65 after the increase in temperature ΔT as a result of the expansion of the wire is given by $$L_w(\Delta T_w) = \pi[(d_D + 2(t_s + t_f) + 2r_w)(1 + CTE_w \Delta T)] \quad \text{Equation 2}$$

where $CTE_w$ is the coefficient of thermal expansion of the wire 31w and $t_f$ is the polymer film 38 thickness. Note that these equations assume that the wire electrode 31w has sunk through the polymer film 38 and is resting on the PET substrate 30 surface. If the effective length of wire 31w as a result of wire expansion (Equation 2) is longer than the effective length of wire 31w as a result of drum 65 expansion (Equation 1) then the wire 31w does not sink into to PET substrate 30 surface unless the wire 31w is sufficiently tensioned when wrapped onto the drum 65. To calculate the length of the wire 31w before the wire 31w sinks through the polymer film 38 leading to the maximum stress on the wire 31w, the thickness of the polymer film 38 should be added to the substrate 30 thickness $t_s$. The total stress on the wire 31w after the increase in temperature ΔT and sinking into the PET substrate 30 surface is simply given by Youngs Modulus of the wire material, $YM_w$, times the strain (ΔL/L) or $$\text{Stress}_{\Delta T} = YM_w[L_w(\Delta T_D) - L_w(\Delta T_w)]/L_w(\Delta T_w) \quad \text{Equation 3}$$

Note that the diameter of the drum 65, the change in temperature, ΔT, and the difference in expansion coefficient between the drum 65 and wire 31w materials have the largest effects on the wire 31w stress at the elevated temperature.

As the temperature increases, the drum 65 expands to tension the wire 31w and the polymer film 38 softens such that the wire 31w sinks into the polymer film 38. The wire 31w stops once it 31w reaches the PET substrate 30, which does not soften at the elevated temperatures. Choosing a polymer film 38 thickness equal to the diameter of the wire 31w places the surface of the wire 31w and the surface of the polymer 38 coated PET 30 at the same level. However, when the wire 31w is forced into the polymer film 38 it displaces the same volume of polymer 38 material. Since there is no plate pressing down on the surface, small mounds of polymer material 38 push-up on the sides of the wire. These polymer mounds may be flattened during a post flattening process. A transparent conductive electrode (TCE) 31f may be patterned onto the wire electrodes 31w after they are imbedded into the polymer film 38. Since the wire 31w containing polymer 38 substrate 30 is already wrapped on a drum 65, the simplest process to pattern the TCE 31f is to use a wire masking process. A second wire or a thread mask 69 may be wrapped onto the drum 65 between the wire electrode 31w. Wrapping the wire or thread mask 69 under tension places it very tight onto the polymer film 38. Spraying the drum 65 with the TCE 31f and unwinding the wire or thread mask 69 creates a patterned TCE 31f. Note that any areas on the polymer 38 coated PET 30 may be masked before spraying the TCE 31f to create non-coated areas.

If a slot is placed across the surface of the drum 65 and the polymer 38 coated PET 30 is not placed across the slot, then a circuit board could be plugged into the wire electrodes 31 and soldered into the wires 31w. Therefore, when the wires 31w are finally cut a wire 31w electroded sheet with TCE 31f connected to a printed circuit board is formed off of a single drum 65.

The wire may alternatively be tensioned on the drum 65 using many other different methods. The drum 65 may be composed of two or more pieces and the pieces could be forced outward to place tension on the wire 31w. Force on the wire 31w may alternatively be applied be pushing or pulling the wires 31w. For example, a slot may be placed in the drum 65 and a printed circuit board may be connected into the wires 31w and pulled toward the center of the drum 65 in part tensioning the wires 31w.

Arced Plate

Figure 16:
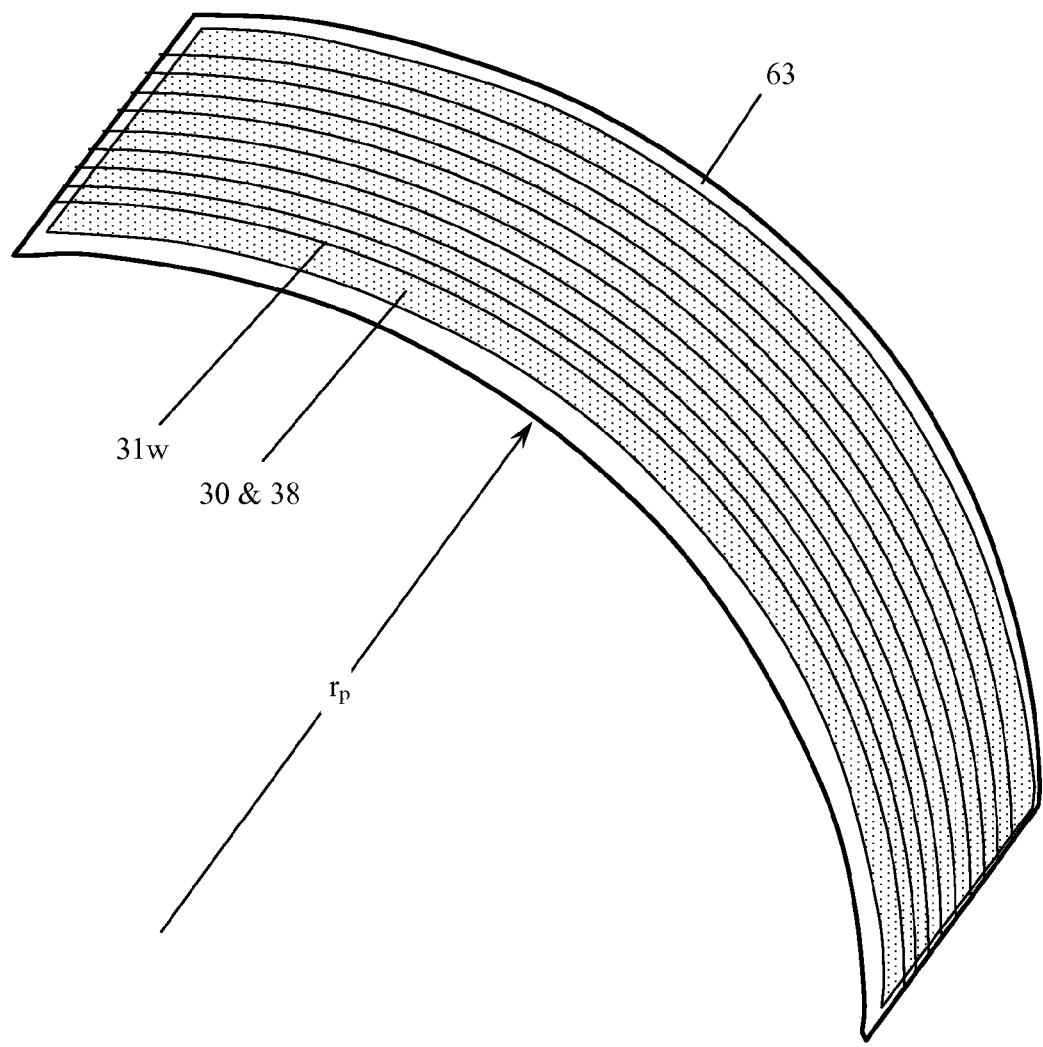
FIG. 16 schematically illustrates the process of bending a sheet to force wires to flow into a polymer coated substrate.

FIG. 16 shows a method of using a bent plate 63 to force a polymer 38 coated substrate 30 out into wrapped wires 31w. This method uses a process similar to the drum process explained above in FIG. 15. A polymer 38 coated PET substrate 30 is placed on a plate 63 and wrapped with the wire electrode 31w on a set pitch. Note that printed circuit boards with an edge connector may be attached to the ends of the plate 63 to set the pitch of the wire 31w and allow for direct connection to the drive electronics. After the wire 31w is wrapped around the plate 63, the plate 63 may be bent away from the wires 31w, which allows the wires 31w to be strung extremely straight. The plate 63 may then be bent toward the wires 31w to a given radius of curvature, $r_p$. Bending the plate places tension on the wire electrodes. The amount of tension or stress on the wires 31w is given by $$\text{Stress}_{bend} = YM_w\{[(r_p + t_s + r_w)/(r_p - r_w)] - 1\} \quad \text{Equation 4}$$

where $r_p$ is the radius of curvature of the plate. The plate 63 may be bent in many different ways. It may be bent over a mandrel or drum, the center may be pushed out, the plate may be squeezed from the top and bottom, the plate may be sagged, etc. After the plate 63 is bent, the plate 63 is placed in an oven and the increased temperature used to soften the polymer 38 places an additional stress on the wire due to the difference in thermal expansions between the plate 63 and wire 31*w* materials. This stress is identical to that explained above in Equations 1-3 except the diameter of the drum, $d_D$, is replaced by twice the radius of curvature of the plate, $2r_p$. Therefore, the total stress on the wire 31*w* is the combination of the two stresses. Note that the total stress placed on the wire 31*w* has to stay well below the yield stress of the wire 31*w* material to guarantee that the wire 31*w* does not break. Two plates 63 may alternatively be used in this process. The plates 63 have their perspective polymer 38 coated PET substrates 30 and are placed back-to-back. Therefore, when the wire 31*w* is wrapped on the plates 63, two separate electroded polymer sheets are produced during the process.

After the wire electrodes 31*w* are imbedded into the polymer 38 coated PET substrates 30, the TCE 31*f* may be patterned onto the wire electrodes 31*w*. A similar process to that just explained to imbed the wire 31*w* into the polymer 38 could be used. The plate(s) 63 may be flattened and a wire or thread mask 69 may be wrapped around the plate(s) 63 between the wire electrodes 31*w*. The plate(s) 63 may be bent to spring the wire or thread mask 69 straight and then the plate(s) 63 may be bent to tension the wire or thread mask 69. After the surface of the wire 31*w* electroded substrate 30 is sprayed with a TCE 31*f*, the wire or thread mask 69 may be unwound to create a patterned TCE 31*f*. The printed circuit boards may be soldered onto the wire electrodes 31*w* to create an electroded sheet with attached electronics for an information display.

Maskless Process

Figure 17:
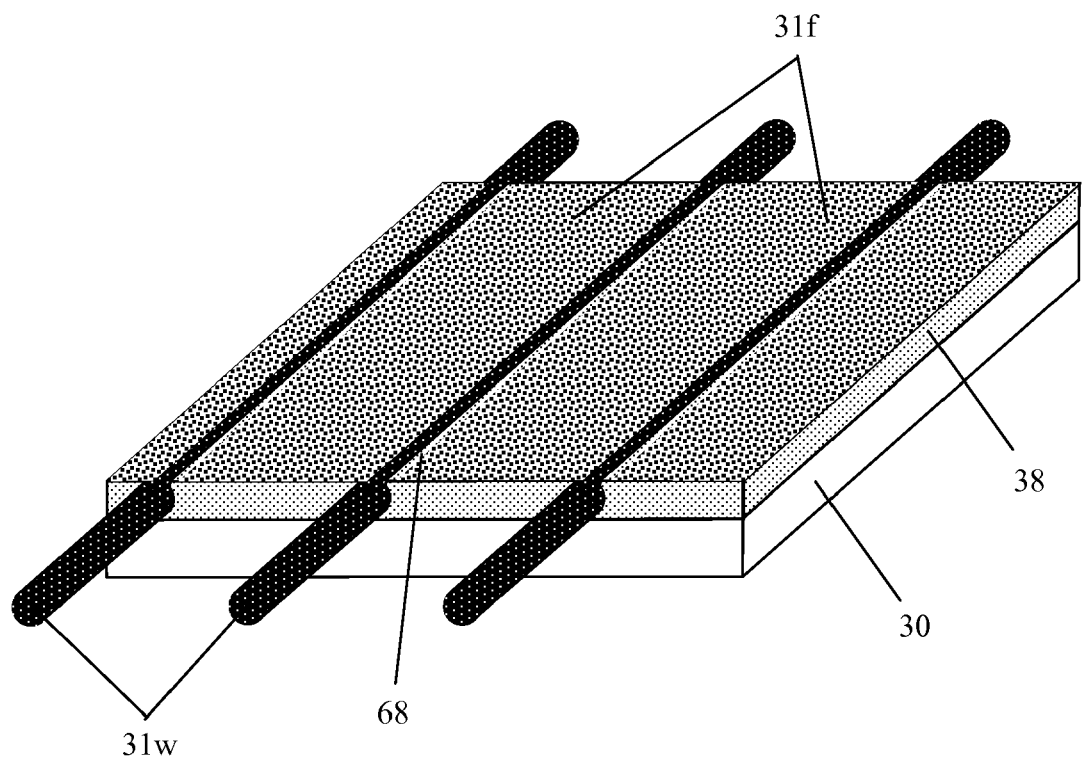
FIG. 17 schematically represents an electroded sheet formed using a maskless process.

FIG. 17 shows a schematic of a section of the electroded sheet. The electroded sheet includes a base material 30 such as PET, coated with a polymer 38, into which the wire electrodes 31*w* are embedded. A transparent conductive electrode (TCE) coating 31*f* is applied to the surface of the polymer 38 and wires 31*w*. The TCE coating 31*f* is patterned such that each strip only contacts one wire 31*w*, with a small area 68 of no coating next to the adjacent wire 31*w*. This will allow for current to pass through an individual wire 31*w*, spread the charge to the side through the TCE 3 if, stopping just before it reaches the adjacent wire 31*w*. In this manner, individual lines may be addressed by attaching the individual wires 31*w* to a circuit board and separately addressing them as required for the specific images.

Figure 18A:
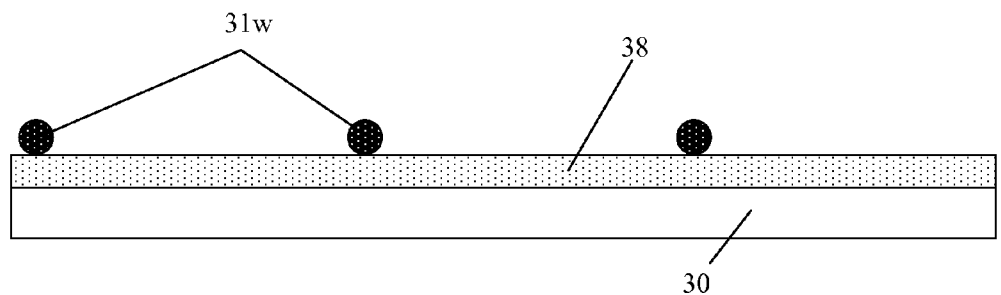
FIG. 18a is a schematic of a PET/Polymer sheet with wires positioned on the polymer prior to embedding into the polymer.

FIG. 18*a* shows wire electrodes 31*w* arrayed on the surface of a polymer substrate 38/30. The structure in FIG. 18*a* is preferably obtained by wrapping a PET 30/Polymer 38 sheet (preferably preshrunk) on a drum (of higher thermal expansion than the wire) of sufficient diameter to give the length and width of electroded sheet desired. The sheet is wrapped such that the PET 30 is against the drum. The wire 31*w* is wrapped around the covered drum, controlling the tension on the wire 31*w*, and traversing either the wire 31*w* or the drum to give the desired spacing between the wires 31*w*. The beginning and the end of the wire 31*w* is secured to the polymer or drum for subsequent processing. The wire 31*w* may be wrapped using guides or any other means desired to control the spacing and uniformity.

An alternate method to form the structure in FIG. 18*a* is to place the PET 30/Polymer 38 sheet on a stiff plate, and wrap back and forth across the sheet with guides/pins at either end to hold the wire 31*w* and give the proper spacing. Tension in the wire 31*w* must be controlled. The beginning and the end of the wire 31*w* is attached to the polymer or plate by tape or any other means. The wrapped stiff plate is then placed in a fixture and bent to a radius to put the desired tension on the wires 31*w* and hold them 31*w* tight to the plate.

Figure 18B:
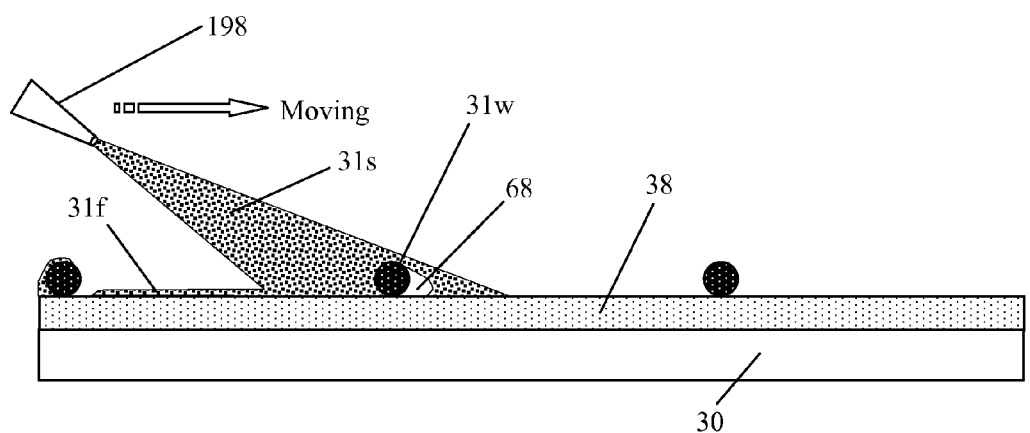
FIG. 18b is a schematic of the process used to coat the electroded sheet with a transparent conductive electrode.

FIG. 18*b* shows the sheet in FIG. 18*a* being coated with the transparent conductive material 31*f*. The wrapped drum or radiused plate is sprayed with a TCE coating 31*s* at an angle across the wire electrodes 31*w*. Any area not to be coated should be masked off before spraying. The substrate 38/30 containing wire electrodes 31*w* is positioned so the spray nozzle 198 is at one end of the sheet and positioned to spray at an angle (preferably 1° to 89°) relative to the substrate and normal to the wire electrodes 31*w*. The preferable spray angle is just shy of 45 degrees. The wires 31*w* act as a mask 68 preventing coating on one side of the wire 31*w*. The TCE spray nozzles 198 move across the polymer surface 38 and down the length of the substrate (or the substrate moves under a stationary nozzle) at the speed and spacing necessary to give the desired coating thickness. Multiple coats may be required to achieve the required electrical conductivity and uniformity of the TCE 31*f*. The traverse speed of the nozzle 198, concentration of the TCE, spray pressure, distance between the nozzle 198 and the substrate, and air flow around the sprayed part, among other parameters, all affect the coating concentration and uniformity of the TCE coating 3 if on the substrate 38/30 and wire electrodes 31*w*.

Figure 18C:
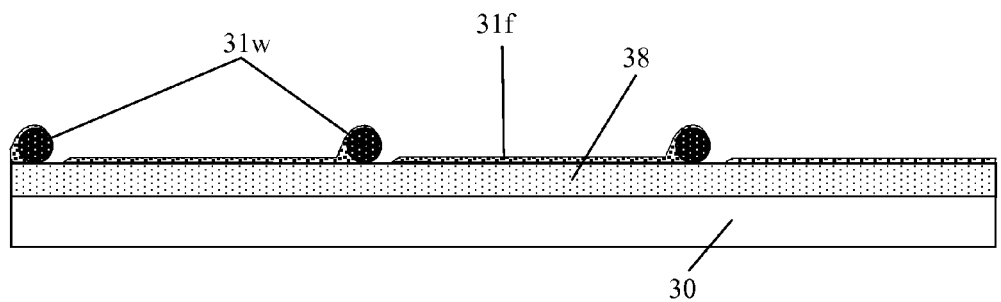
FIG. 18c represents the substrate containing wire electrodes coated with a TCE film using a maskless process.

FIG. 18*c* shows the substrate 38/30 containing the wire electrodes 31*w* from FIG. 18*b* after spray coating the TCE 31*f* at an angle. The transparent conductive electrode 31*f* is preferably uniformly coated on the polymer 38 and one side and top of the wire electrodes 3 if. The wires 31*w* have served as a shadow mask to create patterned TCE strips 31*f* and now they 31*w* are ready to be embedded into the polymer surface 38.

Figure 18D:
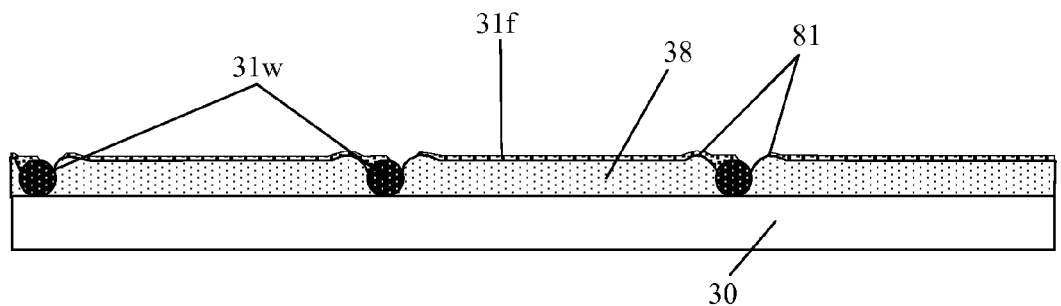
FIG. 18d shows a schematic of the wires embedded into the surface of the polymer substrate.

FIG. 18*d* shows the sheet from FIG. 18*c* after embedding the wires 31*w* into the polymer 38. The wires 31*w* are embedded into the polymer 38 by placing the drum (or bent plate) with the wire coated electroded sheet into an oven at a temperature above the softening point of the polymer 38. The temperature is chosen to maximize the conductivity of the transparent conductive electrode 31*f* and provide the proper tension on the wires 31*w* to allow them to embed into the polymer 38 down to the surface of the PET 30. Note the wires 31*w* are embedded into the surface using a contactless process so as not to disturb the electrical connection between the wire 31*w* and the TCE 31*f*. Once embedded, the drum or plate with the electroded sheet is cooled slowly to prevent stresses in the electroded sheet. The polymer layer 38 holds the wires 31*w* in place. After embedding, there may be some shorts across the uncoated area near the wires 31*w*. These shorts may be burnt open by applying a voltage across adjacent wires 31*w*.

The wire electrodes 31*w* have to be under tension, such that there is a normal force that presses them 31*w* against the polymer substrate 38/30 during the entire coating and embedding processes. The normal force, caused by the tension in the wires 31*w*, has to be large enough to hold the wires in place during the spraying process step and has to be large enough to completely embed the wires into the polymer surface 38. After the wires 31*w* are coated with the TCE 31*f*, they could be pressed into the surface using a roller or plate. If a plate is used, then either the drum containing the TCE coated wires would have to be rolled across it or the TCE coating would have to be strong enough to hold the wires onto the polymer surface when the electroded sheet is removed from the drum or arced plate.

Figure 18E:
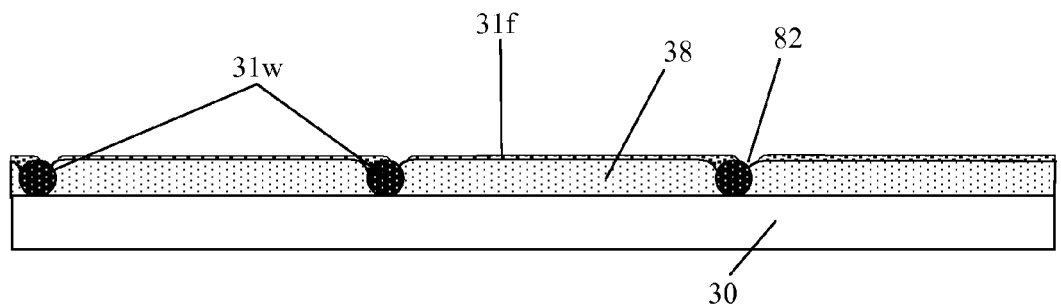
FIG. 18e shows a schematic of the electroded sheet after flattening the surface.
Figure 18F:
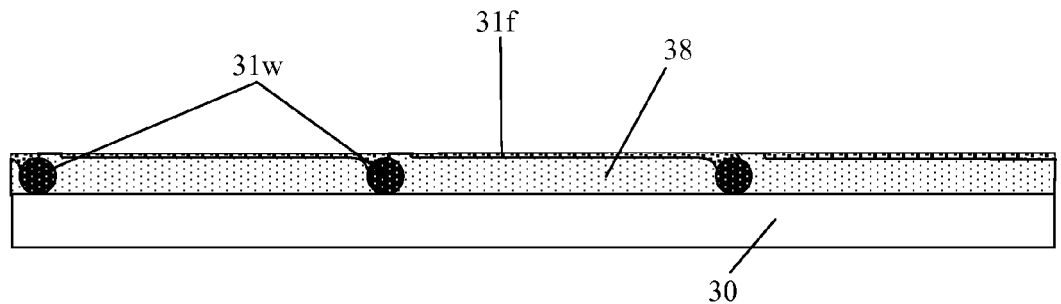
FIG. 18f shows a schematic of the electroded sheet after flattening the surface at a higher temperature.

In some display applications, especially those involving a liquid crystal material, it is imperative to flatten the surface of the electroded sheet. When the wire electrodes 31w are embedded into the polymer 38 surface, they 31w have to displace the same amount of polymer 38 as their 31w volume. This displaced polymer will form mounds 81 along side of the wire electrodes 31w. FIG. 18e shows an electroded sheet that has been run through a flattening process. The electroded surface is pressed against a flat non-stick surface (such as silicone coated glass) and upon heating the electroded sheet above the softening point of the polymer 38 causes the surface to flow. Pressure may be applied by placing the assembly in a vacuum bag or by using a pressure diaphragm against the PET surface 30. Flattening while under vacuum removes any air pockets that may cause defects or irregularities in the flattened surface. A soft flattening process, where the temperature is only raised slightly above the softening point for a short period of time, flattens the mound 81 around the wires 31w, but the polymer does not flow enough to fill the voids 82 around the wires. In order to create a very flat surface, as shown in FIG. 18f, the viscosity of the polymer has to be low enough to fill the void or the pressure on the electroded sheet in the flattening machine has to be high enough to flow the polymer 38. Slow cooling of the electroded sheet after flattening minimizes the stresses in the sheet. After flattening, there may be some shorts along side the wires from where the wires shadowed the TCE 31f. These shorts may be burned out by applying a voltage across adjacent wires 31w.

Figure 18G:
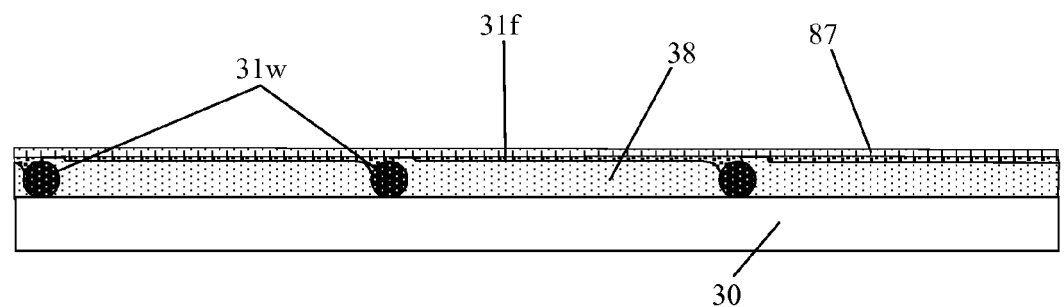
FIG. 18g shows the electroded sheet with a film applied to the surface.

FIG. 18g shows the electroded sheet with a film 87 applied to the surface. The film 87 may be applied before or after the flattening process step. The film 87 may be applied as a spray or sheet and may be a polymer or a silicone base material. The film 87 may also server as a chemical or physical blocking layer or barrier for a subsequent display manufacturing process. The barrier 87 may be designed to stop the penetration of water or ions from the outside environment into an electrooptic layer, such as a liquid crystal or an emissive electrooptic material, like an organic light emitting material (OLED). Note ions coming through the electroded sheet tend to mask charge or voltage applied to a capacitor (switch) that is used to modulate a LC. Also if the electroded sheet is used for an OLED device, then a barrier film 87 to water has to be applied to the surface because water or oxygen tends to destroy the OLED material. A barrier film 87 may alternatively be used to stop ion migration from a component inside the panel into the electroded sheet. If an ionic electrooptic material is used, then the ions can randomly migrate around in the display. If the ions migrate to the other side of the electrode, where they are no longer in the presence of an electrostatic field, then they can not be moved. Therefore, these electrostatically immobile ions contain charges which create an electric field of their own and may cause addressing issues. Ions or other chemical materials may migrate from inside the panel through the electroded sheet to the outside environment if the proper barrier layer 87 is not applied to the electroded sheet. One example where a barrier is needed is to contain a corrosive material like is traditionally in an electrochromic display.

The barrier may also be placed on the flattening plate and transferred to the electroded sheet. The flattening plate may have a release coating on it and the barrier may be deposited on the release film for easy transfer. In fact, the wire electrodes 31w or the transparent conductive coating 31f may also be strung/deposited on a plate and transferred into the surface of the polymer substrate.

The film 87 may also be an adhesive layer to help the electroded sheet surface bond to another display component. The film modified electroded sheet surface used in many different display applications, such as, a tubular plasma display, a plasma-addressed display, a liquid crystal display, an electrochromic display, an OLED, or any other electronic display.

Webbed Process

Figure 19:
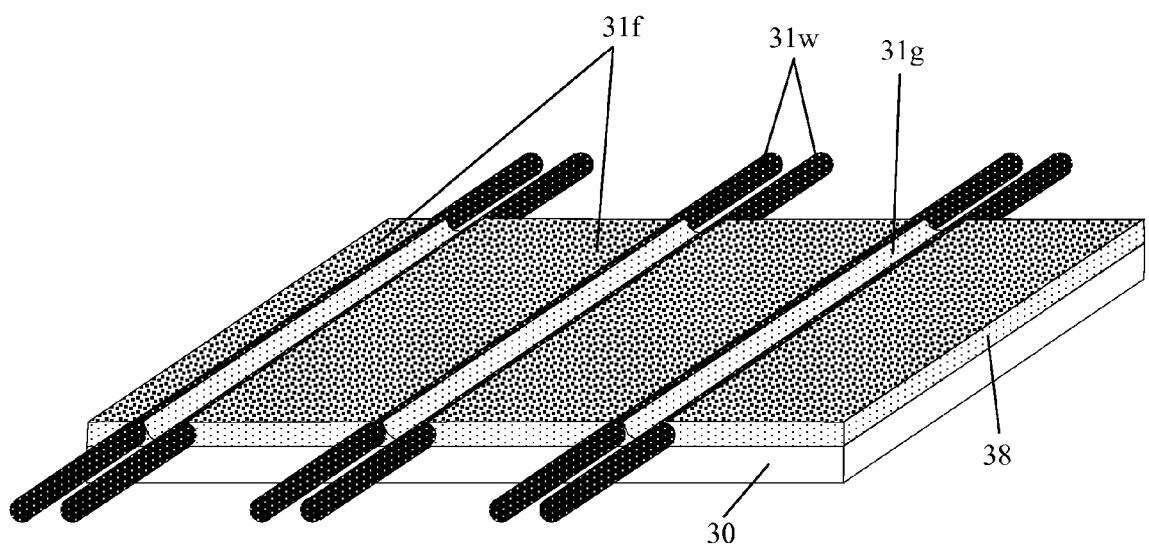
FIG. 19 schematically shows a section of the electroded sheet formed using a web process.

FIG. 19 shows a schematic of a section of the electroded sheet formed using a web process. The electrode sheet includes a polymer substrate with wire electrode pairs 31w and transparent electrode webs 31f coated between the wire electrode 31w pairs. The wire electrode 31w pairs are separated by small gaps 31g that are formed during the manufacturing process explained below. These small well defined gaps 31g are very advantageous when the electroded sheet is used as a sustainer plate in a tubular plasma display.

Figure 20A:
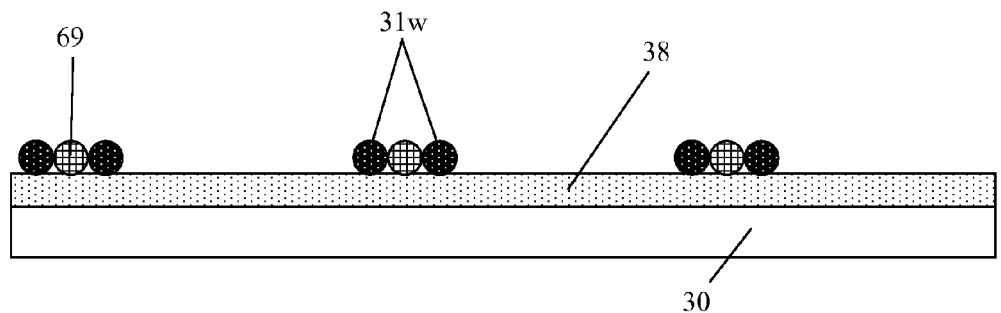
FIG. 20a schematically shows a polymer substrate with wires and masks positioned on the surface.

FIG. 20a shows the first step in forming a webbed electroded sheet by arraying wire electrode 31w pairs with masks 69 between the wire electrode 31w pairs on the surface of a polymer substrate 38/30. One method to form this webbed electroded sheet is to start by wrapping a polymer 38/PET 30 substrate (preferably preshrunk) on a drum, where the drum has a higher thermal expansion than the wire. The polymer substrate 38/30 is wrapped such that the PET 30 is against the drum. The wire 31w (copper, steel, tungsten, or any other conductive metal) and mask 69 (wire, nylon, thread, fiber, or any other material that may be removed before or after embedding) are then wrapped around the substrate covered drum. The tension in the wire 31w and mask 69 are controlled and the wire 31w pitch is controlled by traversing either the drum or the wire/mask guiding tool. The wire 31w and mask 69 may be wrapped individually or together using guides or any other means desired to control the spacing and uniformity. The mask 69 does not have to be the same material as the wire, nor the same diameter. It must be able to be easily removed from the polymer 38, and its diameter controls the spacing or gap 31g between the wire electrode 31w pairs.

Alternatively the webbed electroded sheet is formed by placing the substrate 38/30 on a stiff plate and wrapping the wire 31w and mask 69 back and forth across the substrate between guides/pins at both ends of the plate. Tension in the wire 31w and mask 69 must be controlled. The beginning and the end of the wire 31w and mask 69 are attached to the polymer or plate by tape or any other means. The wrapped stiff plate is then placed in a fixture and bent to a radius to put the desired tension on the wires 31w. Note that the tension in the wires may be controlled by the radius of curvature of the plate; therefore the thermal expansion of the plate does not have to be higher than that of the wire electrodes.

Figure 20B:
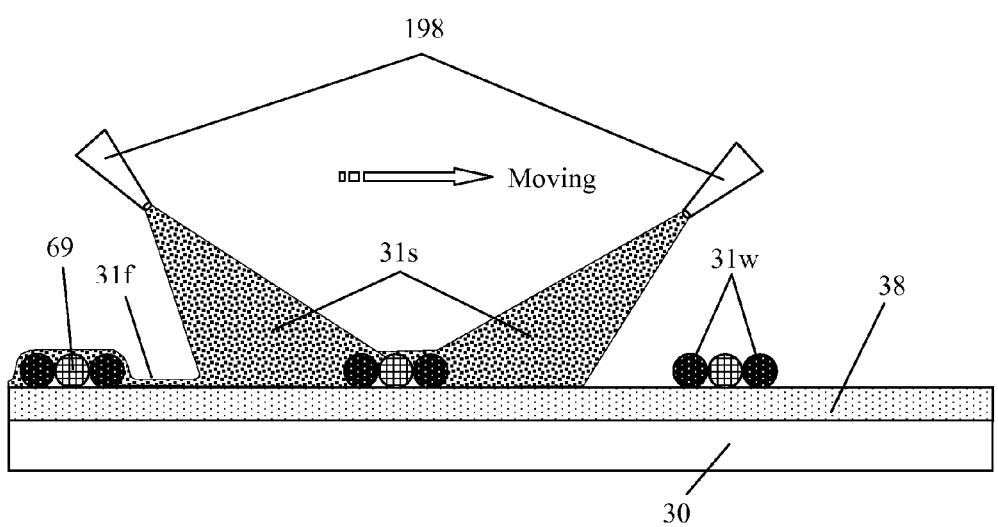
FIG. 20b schematically shows the spray process used to coat the transparent conductive electrode material on the wire masked polymer substrate.

FIG. 20b shows the sheet obtained in FIG. 20a being coated with the transparent conductive material 31f. A spray system 198 is used to coat the surface of the polymer substrate 38/30 and the wire electrodes 31w. The transparent conductive material must be sprayed 31s at a low angle and in both directions normal to the wire electrodes to assure that the TCE coating 31f covers the entire polymer surface 38, including under the edges of the wire 31w. The speed, step distance, angle and number of passes of the spray nozzles 198 must be controlled to achieve the electrical connection, conductivity, and uniformity of the final TCE coating 3 if. The concentration of the TCE, spray pressure, distance between the nozzle 198 and the substrate, and air flow in the spray system also affect the concentration and uniformity of the TCE coating 31f.

Figure 20C:
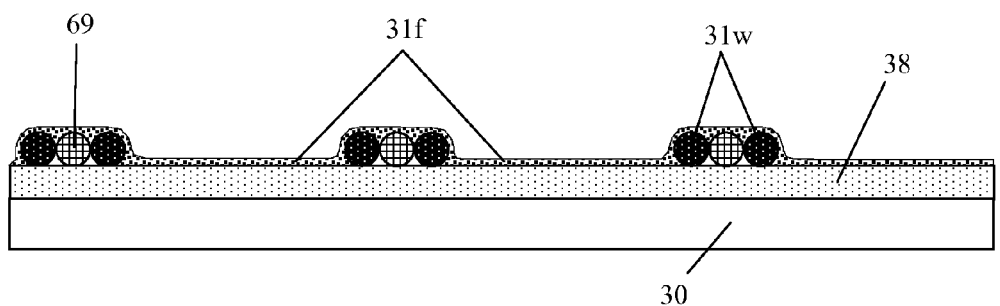
FIG. 20c schematically shows the electroded sheet after the coating process step.

FIG. 20c shows the substrate 38/30 containing the wire electrodes 31w from FIG. 20b after spray coating the TCE 31f. The transparent conductive polymer 31f is preferably uniformly coated on the polymer 38 and around the wire electrodes 31f. The coated electroded sheet is now ready to have the wires embedded.

Figure 20D:
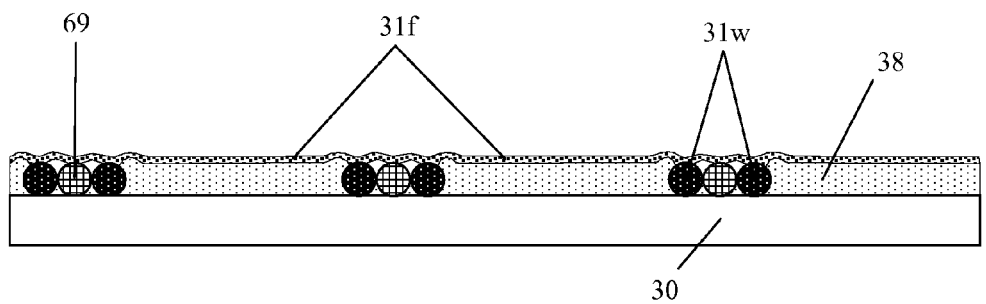
FIG. 20d shows a schematic of the wires and mask embedded into the polymer.

FIG. 20d shows the sheet from FIG. 20c after embedding the wires 31w and mask 69 into the polymer 38. The wires 31w and mask 69 are preferably embedded into the polymer 38 by placing the drum (or bent plate) with the coated TCE 31f into an oven at a temperature above the softening point of the polymer 38. The temperature is chosen to maximizes the conductivity of the TCE 31f and provide the proper tension on the wires 31w to allow them to embed into the polymer 38 down to the surface of the PET 30. The thermal expansion of the mask 69 may be larger than the drum or plate and the mask 69 does not have to get embedded in to the surface of the polymer film 38. Once the wires are embedded, the drum or plate with electroded sheet is cooled slowly to prevent stresses in the electroded sheet. The polymer layer 38 holds the wires 31f in place. Note that the wire electrodes 31w and mask 69 may be embedded into the polymer 38 surface before the sheet is coated with the TCE 31f.

Figure 20E:
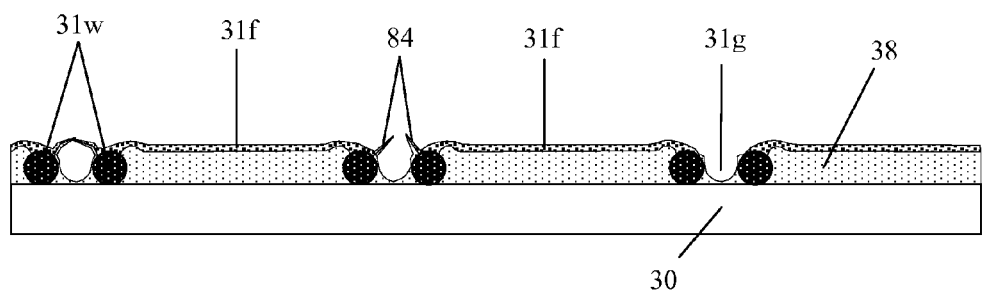
FIG. 20e shows a schematic of the wires embedded in the electroded sheet with the mask removed.

FIG. 20e shows the electroded sheet from FIG. 20d after the mask 69 is removed. After embedding, the mask 69 must be removed or stripped out of the polymer 38 surface. This must be done carefully such that the wires 31w are not pulled from the electroded sheet by the mask 69, and also such that any TCE 3 if or polymer 38 stripped with the mask 69 does not fall onto the electroded sheet. Note alternatively that the mask 69 can be removed before the wire electrodes 31w are embedded into the polymer 38 surface. Stripping the mask 69 from the electroded sheet leaves some shorts 84 between the wires because of the polymer 38 and TCE 31f over the mask 69. These shorts 84 may be burned open by applying a voltage across adjacent wire electrode 31w pairs. Because the TCE 31f forms a web between wire electrode 31w, no potential is applied across the TCE 31f coating, therefore causing no harm to the TCE 31f during the electrical short removal process. If a flat electroded sheet is desired then it is advantageous to burn these shorts 84 open after the flattening process step.

Figure 20F:
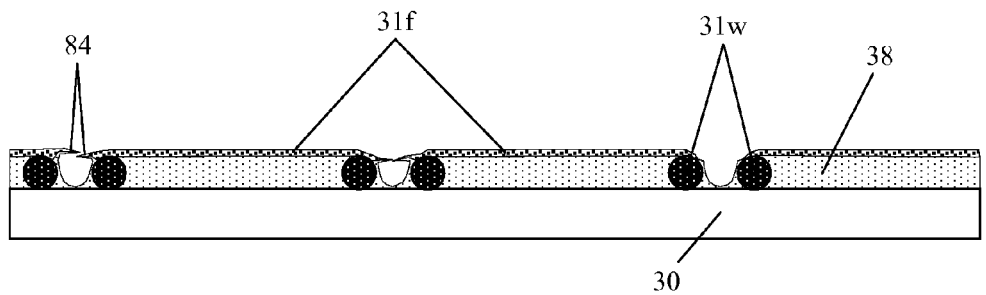
FIG. 20f shows a schematic of the electroded sheet after flattening the electroded surface.
Figure 20G:
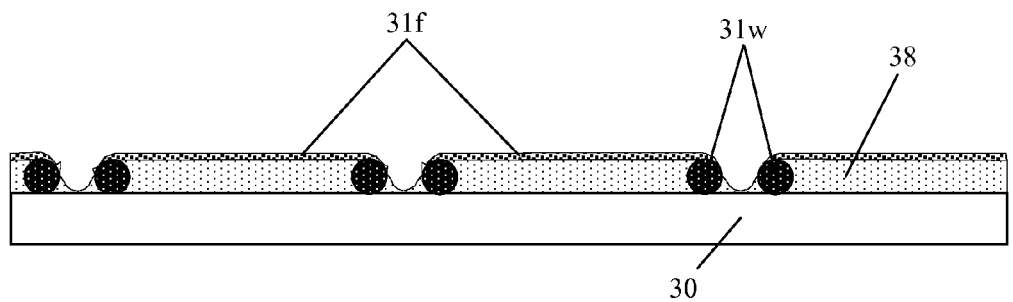
FIG. 20g shows the flattened electroded sheet with a planarizing layer applied to the surface.

FIG. 20f shows the electroded sheet from FIG. 20e after the electroded surface is flattened. The electroded surface may be flattened by pressing it against a flat non-stick surface (such as silicone coated glass or a silicone coated high temperature plastic) while heating the electroded sheet slightly above the softening point of the polymer 38. Pressure is preferably applied by placing the assembly in a vacuum bag, or by using a pressure diaphragm (vacuum press) against the PET surface 30. Flattening under vacuum removes any air pockets that may cause defects or irregularities in the flattened surface. The time, temperature and pressure of the flattening process has to be controlled so the wire electrodes 31w do not move into the void 31g and come into contract. If the diameter of the wire electrodes 31w is the same as or greater than the thickness of the polymer 38 then the wires 31w are pinched between the flattening plate and the rigid lower PET 30 substrate and keeps them from moving together. Slow cooling of the electroded sheet after flattening minimizes the stresses in the electroded sheet. After flattening, there may be some shorts 84 across the area between the wires from where the mask 69 was removed. These shorts 84 may be burned open, as shown in FIG. 20g, by applying a voltage across adjacent wires 31w.

Figure 20H:
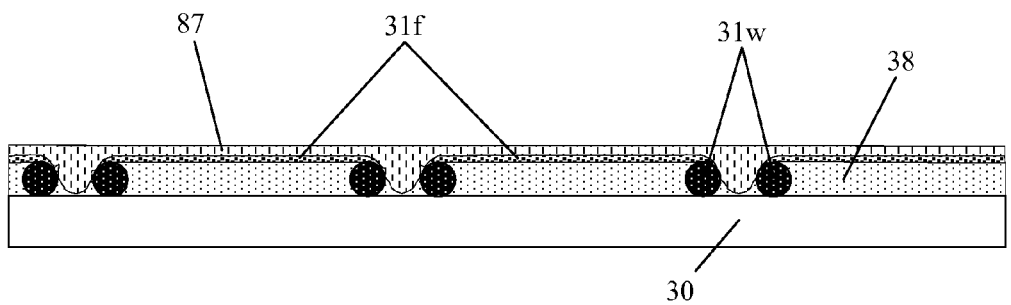

A planarization layer 87 may be applied to the surface of the electroded sheet to remove the voids 31g formed between the pairs of wire electrodes 31w, as shown in FIG. 20h. This planarization layer 87 may be added before or after the flattening process step. If the planarization layer 87 is applied before the flattening process step and its 87 softening point is lower than that of the polymer 38 substrate then the planarization layer 87 will flow into the void 31g before the polymer 38 substrate softens. The planarization layer 87 may also serve as an adhesive film to attach another display component to the electroded sheet. If the web-based electroded sheet is used as a sustainer plate in a tubular plasma display then leaving the void 31g between the pair of wire sustain electrodes 31w creates a region with a lower dielectric constant. Therefore, a smaller amount of the voltage drops directly between the wires, thus extending the electric field farther into the plasma tubes.

Heating the Wires

Some applications of the present invention require a chemically durable or higher temperature polymer substrate. In these types of applications the polyolefin 38 part of the substrate is not chemically durable enough or it softens at too low of a temperature. Therefore, it is desirable to have the wire electrodes embedded directly into the PET 30 substrate. However, some of the processes explained above, such as tensioning the wires into the surface, can not be used. Pushing the wires into the surface using a flat plate is difficult because PET does not start to soften until about 200° C. and the viscosity curve is not very steep making it almost impossible for the PET to flow up around the wires before it melts at about 250° C. The PET could be melted and allowed to flow around the wires, but the wires would have to be held to the plate surface and not allowed to penetrate into the surface. This entire process would have to be preformed in a vacuum at high temperatures, which makes the equipment very complicated and expensive.

One method of placing the wires into the surface at a low system temperature is to directly heat the wires. The wires may be directly heated using inductive, irradiative or resistive heating. Since the wires are made of metal they will suscept or absorb microwaves and may be inductively heated. If a high enough current flows through the wires, their temperature increases as a result of the resistive heating in the wire. The wires can also be irradiated with light (UV, visible or IR) to increase their temperature. In order for the wires to get imbedded in the surface of the PET, the wires have to be heated enough to melt the PET. The base temperature of the PET may be elevated to reduce the amount of power applied directly to the wires in order to embed them into the surface of the PET. The most simple and efficient process of embedding the wires into PET is to use a vacuum bag or a vacuum press with a microwave heating chamber that may be tuned for the load. Wire electrodes may be wrapped around a very flat plate, such as glass, and PET substrates may be placed over the wire electrodes on both sides of the glass plate. The entire substrate with wires and PET sheets may be placed in a vacuum bag and a vacuum, preferably below 100 mTorr, may be pulled inside the bag around the wire electrodes. The vacuum bag may then be placed in an oven that has both a thermal heater and a microwave heater. The temperature of the vacuum bag with enclosed parts may be increased to about 150° C. and then the microwave may be applied to increase the temperature of the wires high enough (>260° C.) to melt the PET and sink into the surface. The elevated temperature of the base PET allows the melted PET material from under the wire electrodes to flow around the wires and out across the surface.

Figure 21:
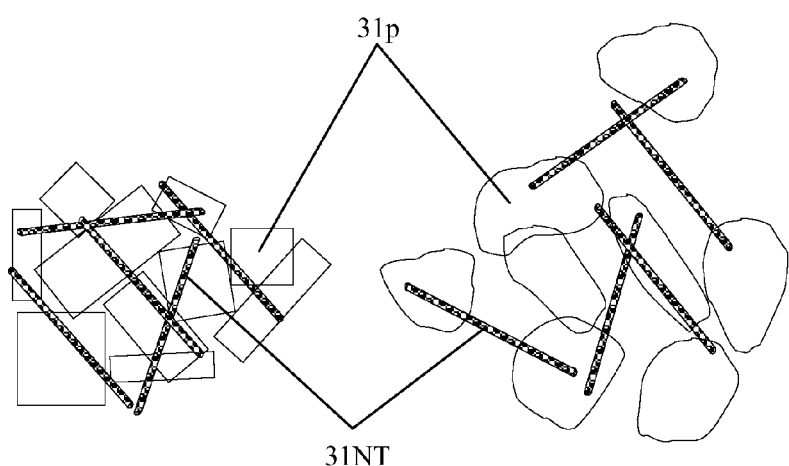
FIG. 21 shows islands of transparent conductive polymer interconnected with carbon nanotubes.

FIG. 21 shows an example of a transparent conductive coating deposited on a surface containing a mixture of transparent conductive polymer 31p and carbon nanotubes 31NT. If the concentration of conductive polymer 31p is low or it has a high surface tension then it forms islands. If these conductive polymer islands 31p are electrically disconnected, then they will not spread the voltage across the surface. Adding carbon nanotubes 31NT into the transparent conductive polymer while spraying or depositing the coating allows the nanotubes 31NT to bridge these polymer islands 31p and electrically connect them. The carbon nanotubes 31NT may also be coated over the island polymer 31p coating after the polymer coating 31p has been deposited. A very thin transparent electrically connected coating is capable of using this dual component 31p and 31NT coating. This dual component 31p and 31NT coating or just the nanotube 31NT solution may also be applied to the wire electrodes to enhance the electrical connectivity between the wire electrode 31w and the TCE 31f.

Zigzag Electrodes

Figure 22:
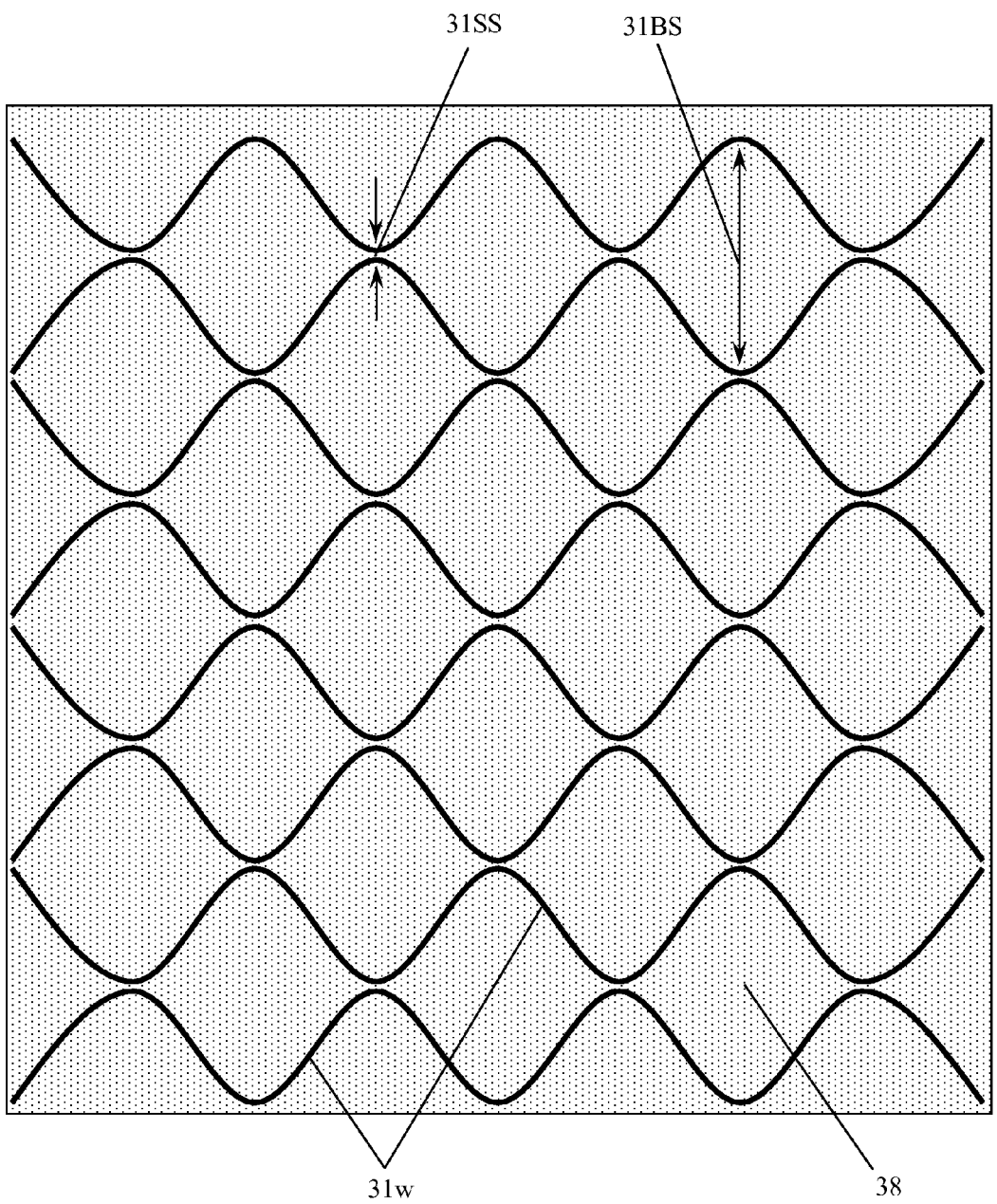
FIG. 22 schematically shows a planar view of an electroded sheet with the wires in a zigzag pattern.

Most of the above discussion was on adding a transparent electrode coating to a wire electrode to spread the voltage across the row of pixels. There are some displays, such as a plasma displays that do not require the transparent coating and any spreading of the voltage, if required, can be achieved using more than one wire per electrode line. In plasma displays that use a surface discharge top electrode structure (presently all color PDPs use this structure) firing of the plasma is sustained using two closely spaced sustain electrodes. These closely spaced sustain electrodes create a high panel capacitance in large displays. To lower the panel capacitance it is advantageous to only have the sustain electrodes closely spaced where the plasma is to be fired. Creating this closely spaced wire sustain electrode area 31SS followed by the sustain electrodes moving away from each other 31BS will form a zigzag pattern in the wire sustain electrodes 31w embedded in the surface 38 of the electroded sheet, as shown in FIG. 22.

One issue with the zigzagged electroded sheet is that in order to achieve proper firing of the plasma in a tubular plasma display the electroded sheet will have to be aligned to the plasma tube array. Each plasma tube will have to be aligned such that the centerline of the plasma tube is attached to the electroded sheet along the line of the close spacing 31SS of the wire electrodes 31w. It will be possible to fire the plasma in the plasma tubes and align each tube to the electroded sheet by maximizing the luminous of the plasma generated light. Note that no alignment is required in electroded sheets with straight wires.

Figure 23:
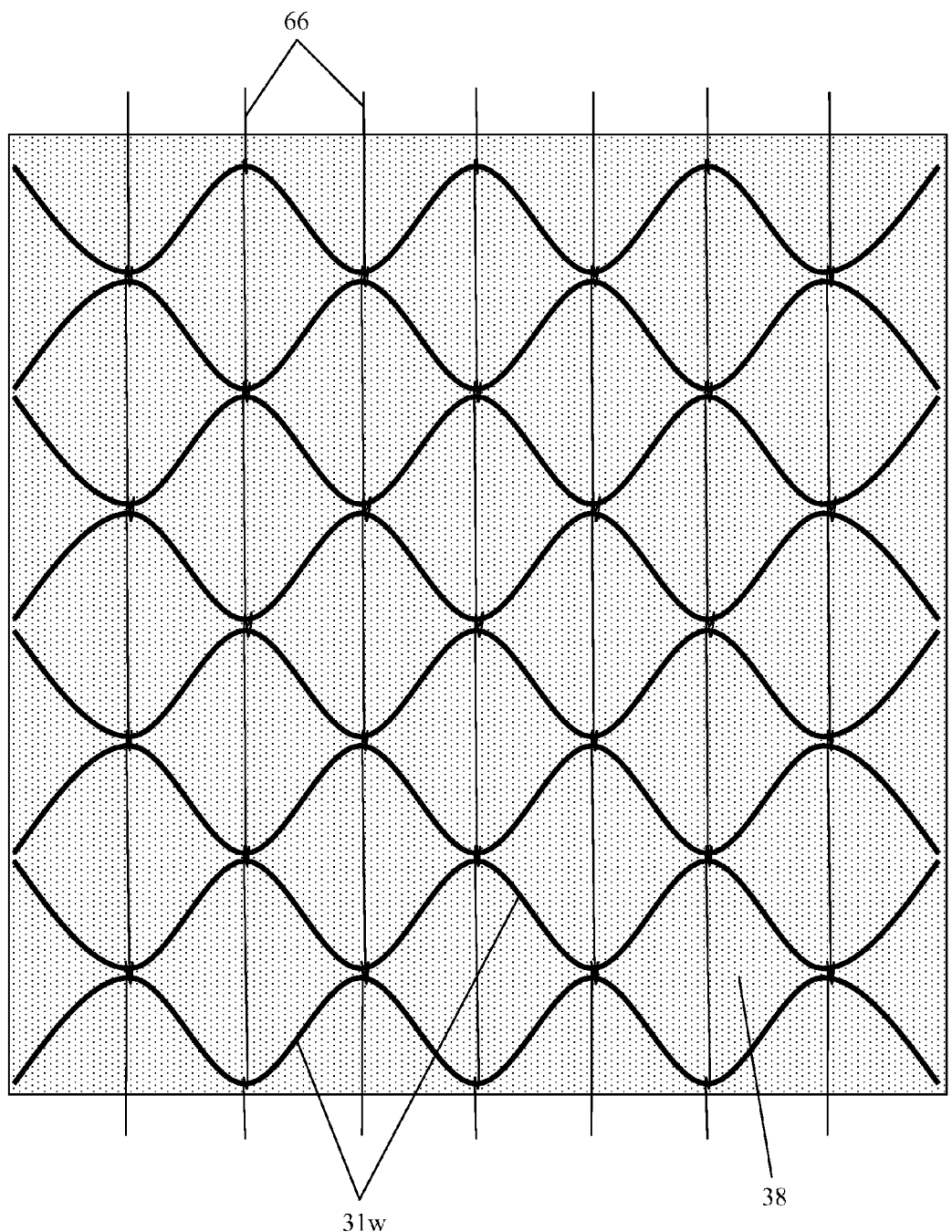
FIG. 23 schematically shows a planar view of an electroded sheet with the wires in a zigzag pattern formed by tying the wires into a mesh.

The zigzagged electroded sheet may be fabricated using several different techniques. FIG. 23 shows a method of forming the zigzag structure where the wire electrodes 31w are tied together using small thread-like material 66 to form a wire electrode mesh. The wire mesh can be stretched across the surface of the polymer substrate and embedded in the polymer surface 38. The thread-like material 66 can be removed, via heat or chemicals (liquid or gas), once the wires are held against the polymer surface 38 during the embedding process, so they do not move. If the thread-like material 66 is made out of a low melting point polymer than it 66 may be melted into the surface 38 of the electroded sheet. Melting the thread-like material 66 into the electroded sheet surface will eliminate the requirement of removing the material 66 from the electroded sheet.

Figure 24:
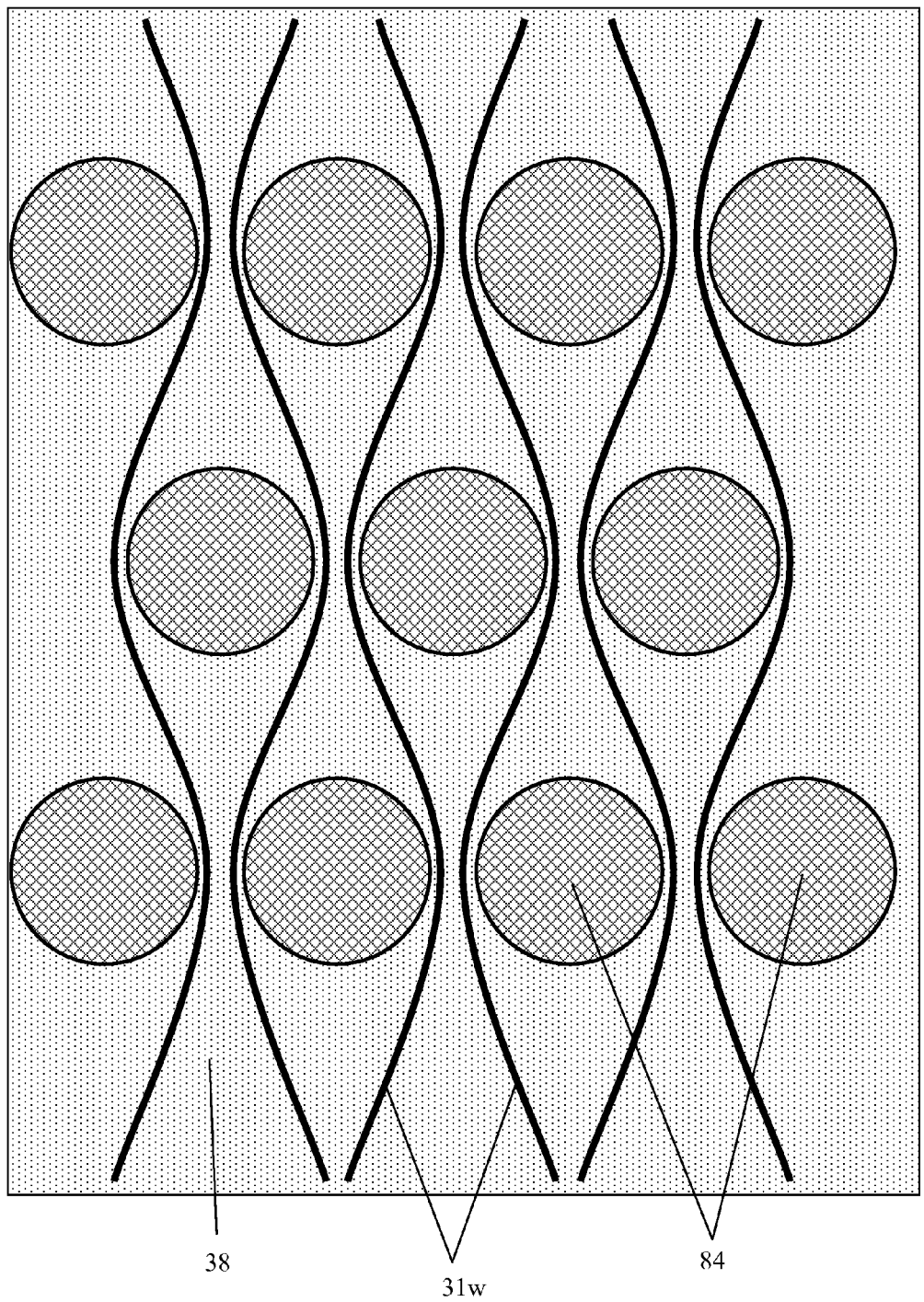
FIG. 24 schematically shows a planar view of an electroded sheet with the wires in a zigzag pattern formed using pins.

FIG. 24 schematically represents a method of using pins 84 to make the wire 31w zigzag structure. The wire electrodes 31w can be interleaved between rows of pins 84 and when the pins 84 are forced together, the wires 31w will form around the pins 84 to form the zigzag pattern. The pins 84 on a carrier with the zigzag wires 31w can then be placed down onto a polymer substrate and the wires can be pushed out of the pin array 84 and into the polymer surface 38 to form an electroded sheet. A soft metal material, like copper, may be required in some of the zigzag forming processes, so the structure can be easily stretched and formed into the zigzag pattern. The surface of the wire electrodes can also be coated with a film, which may include carbon nanotubes, to spread the effective voltage away from the wire electrode or to remove a reflection from the wire.

Figure 25:
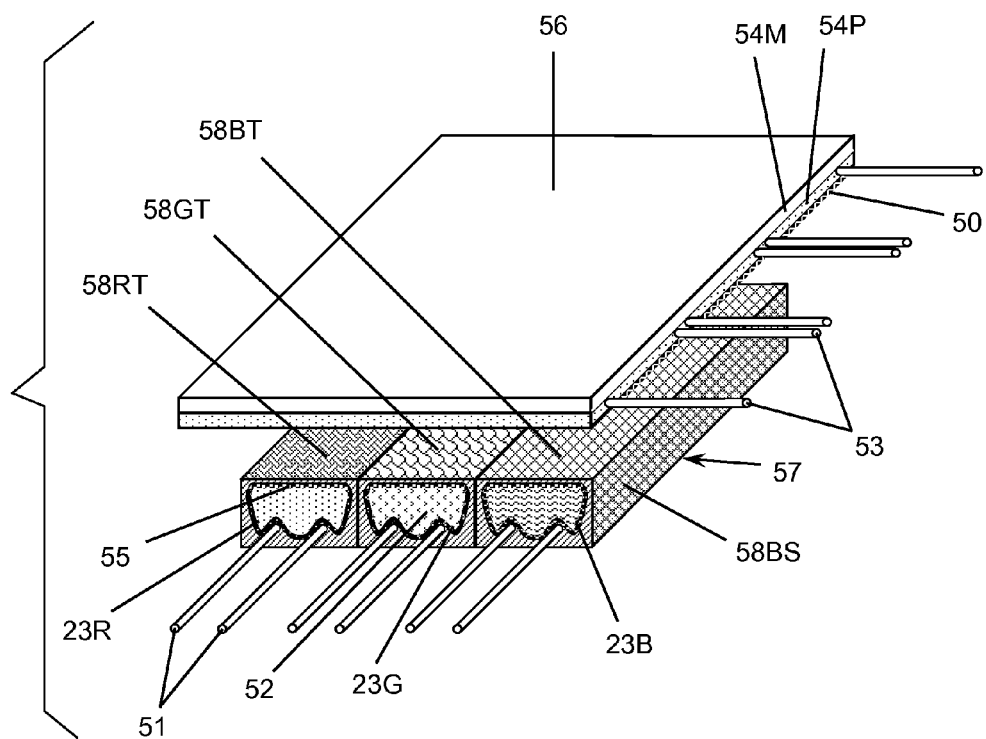
FIG. 25 illustrates a tubular plasma display with wire electrodes embedded in the plasma tubes and an electroded sheet containing wire electrodes.

In one embodiment of the present invention, a tubular plasma display (TPD) includes an electroded sheet attached to an array of plasma tubes, as shown in FIG. 25. The electroded sheet 56 is preferably a polymer substrate 54 containing wire electrodes 53. The plasma tubes 57 preferably contain wire electrodes 51, a hard emissive coating 55, a phosphorescent material 23 and a plasma gas capable of generating ultraviolet light. Color filter coatings 58RT, 58GT, 58BT are preferably added to the top of the plasma tube 57 and a black matrix 58BS is added to the sides of the plasma tubes 57. The electroded sheet 56 is preferably directly bonded to the array of plasma tubes 57, where the wire sustain electrodes 53 in the electroded sheet 56 are nominally orthogonal to the wire address electrodes 51 in the plasma tubes 57. Using wire electrodes in both the electroded sheet 56 and the tubes 57 allows for low cost manufacturing and high quality operation of very large plasma displays. The wire electrodes are preferably composed of materials that have high electrical conductivities and have a large diameter (0.002" to 0.005"), which gives them a relatively large cross-sectional area. These two key traits lead to highly conductive lines and the capability of addressing very long lengths or very large displays (>500" diagonal).

Figure 26:
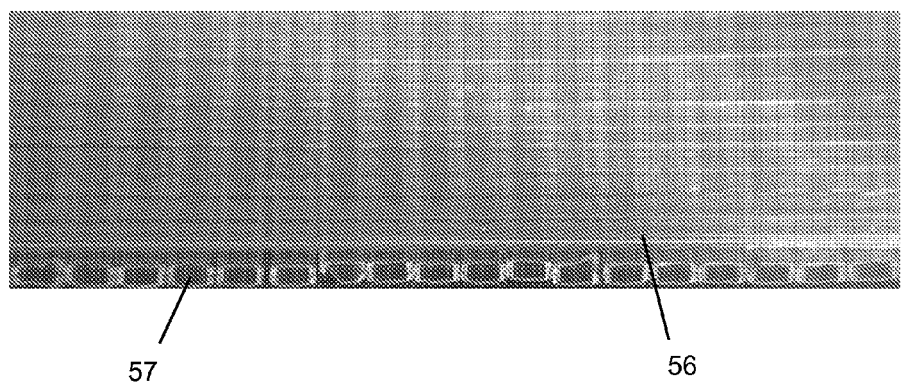
FIG. 26 is a photograph of a tube array connected to an electroded sheet.
Figure 27:
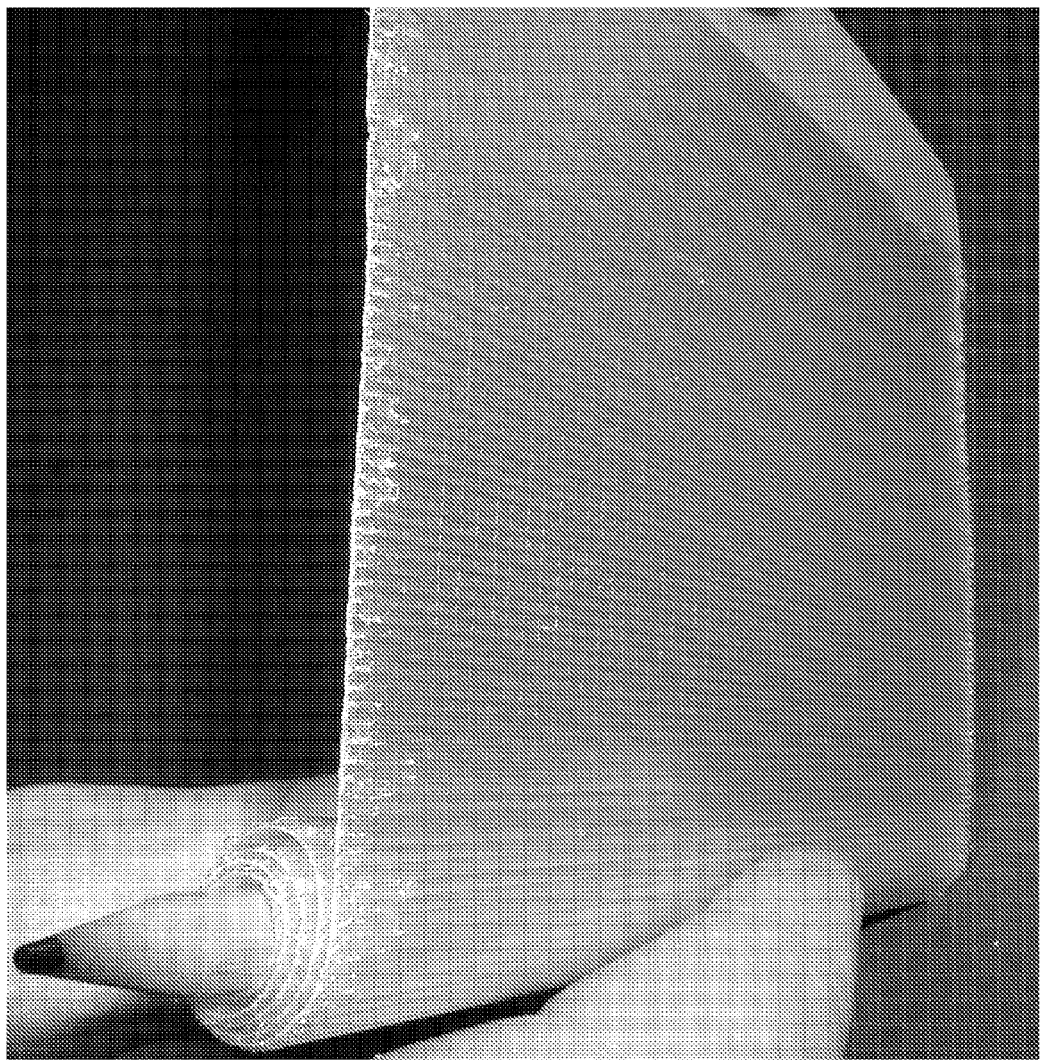
FIG. 27 is a photograph of a tube array connected to an electroded sheet that is rolled around a pencil.

The plasma tube array 57 is preferably connected directly to the electroded sheet 56, as shown in FIG. 26. In this example, contact adhesive is used to attach the tube array 57 to the electroded sheet 56. The only part of the tube array 57 that is attached to the electroded sheet 56 is the top surface of the tube. Only attaching the top surface of the tube 57 to the electroded sheet creates a very flexible and rollable panel orthogonal to the tube direction. FIG. 27 shows a tubular plasma display containing a tube array 57 connected to an electroded sheet that is rolled around a pencil. In this image the tubes 57 are not coated with a phosphor layer nor are the electrodes connected to electronics to better show the way the tubes roll. Since the tubes are composed of borosilicate glass (Pyrex®) they may be sealed closed and a monochrome display using a neon-base gas may be fabricated. The total height of the plasma tubes 57 only have to be slightly higher than the depth of the plasma channel 52 and the electroded sheet 56 base polymer substrate 54 only needs to be slightly thicker than the diameter of the wire electrodes 53, therefore the overall thickness of the panel may be as thin as 0.5 mm. The cross-sectional volume of glass in the tubes 57 is relatively low since most of the tube volume is plasma gas. This low glass volume and thin electroded sheet means that a 100" diagonal tubular plasma display panel weighs less than 3 pounds.

A tubular plasma display may be designed to be addressed using most of the waveforms traditionally used in the industry for AC plasma displays. Tubular plasma displays may be addressed using both erase addressing (explained in U.S. Pat. No. 5,446,344, herein incorporated by reference) and write addressing (explained in U.S. Pat. No. 5,661,500, herein incorporated by reference). To increase the dark room contrast of the panel, a ramped voltage may be used to set the initial charge conditions in the panel (explained in U.S. Pat. No. 5,745,086, herein incorporated by reference). In order to cut the number of addressable lines in half during each video frame an interlaced addressing scheme may be used similar to that explained in U.S. Pat. No. 5,436,634, herein incorporated by reference. In fact, since the largest market for these tubular plasma displays is home television and the new US high-definition standard is 1080I then it makes the most sense to design these tubular plasma displays to operate in an interlaced mode of addressing.

Figure 28:
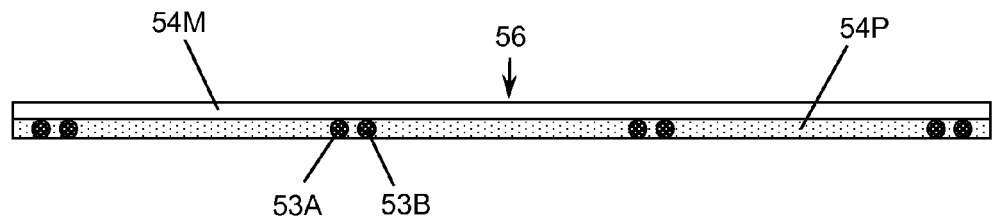
FIG. 28 schematically shows a cross-section of an electroded sheet with wire electrodes embedded in the surface of the film.

FIG. 28 shows a cross-sectional view of an electroded sheet 56 normal to the wire electrodes 53. Wire electrodes 53 are used to carry the capacitive current along the length of the electroded sheet or the display. In most plasma panel configurations these wire electrodes 53 are in pairs 53A and 53B and are referred to as sustain electrodes. In order for the electroded sheet 56 to be attached to the plasma tubes 57, the wire electrodes 53 have to be embedded into the polymer surface so they do not add pressure points on the tube array and crack the tubes. However, the wire electrodes 53 should not be embedded far below the surface of the polymer substrate 54 or the voltages required to address and sustain the plasma will be increased and the variability in the voltage will be difficult to control.

Using wires as the electrodes in the panel has several advantages. First, the wires are preferably formed from a metal with a high conductivity, like copper, and that compounded with a large cross-sectional area of the electrode allows for a very conductive electrode. Conductive electrodes are necessary when creating very large displays to keep the RC time constant low enough to be able to reliable address and sustain long electrode lines. Second, the wire electrodes are manufactured in a separate high temperature process to produce spools of highly conductive wire that may be subsequently added to a low temperature polymer substrate. Therefore, an electroded sheet is formed with highly conductive metal electrode lines in a low temperature polymer substrate. Third, the electroded sheets may be manufactured in very large sizes. Polymer sheets are presently manufactured in over 20 feet wide continuous rolls. Fourth, the cost of creating the electroded sheets is very low. Polymer substrates used in the electroded sheets discussed in this application cost between \$0.05/sqft to \$0.30/sqft and the fine wire in the electroded sheets costs between \$1/km to \$5/km. This results in an electroded sheet cost between \$0.50/sqft to \$2.50/sqft. One major cost advantage over the traditional methods of creating a substrate with electrodes is that the electroded sheet process does not require any metal deposition, vacuum depositions, patterning or etching. The traditional deposit, pattern and etch processes are also limited in substrate size until the expensive processing equipment is developed, purchased and operational. Fifth, using a very flexible wire embedded in a very flexible polymer substrate results in a very flexible, rugged, rollable electroded sheet. Whereas, traditional metal coatings deposited on a polymer substrate that is repeatably flexed and rolled tends to break-up. Sixth, circular wires in the electroded sheet tend to scatter light coming out of the tubular plasma display, whereas a flat patterned metal electrode reflects most of the incident light back into the panel. Therefore, using wire electrodes leads to a brighter display. Seventh, there are many options when connecting the wire electrodes to the drive electronics. The wire may be attached, via soldering, directly to a printed circuit board. Since the wires in the electroded sheet are on a predefined pitch, an edge connector may easily and economically be plugged into the wire array and soldered for a strong electrical bond. The wires may also be partially unzipped from the polymer film and fanned in or out for more options on connecting to the electronics. The partially unzipped wires may also be bent at a 90 degree angle and connected to the drive electronics orthogonal to the major wire direction. This 90 degree wire connection scheme allows all the electronics to be placed on a single edge of the display.

The wire electrodes 53 in the electroded sheet 56 may be embedded in many different types of polymer films 54. The lowest cost and most readily available films are thin polycarbonate and PET (polyethylene terephthalate) films. Silicone substrates or films 54 may alternatively be used; however they are much more expensive and the wire electrodes 53 have to be formed into the silicone films 54 in the gel form. A thin polymer film that is much easier to embed the wire electrodes into is a thermal overlaminate, like polyolefin 54P on PET 54M. In these thermal overlaminates the wire electrodes 53 may be embedded in the polyolefin section 54P of the film at a relatively low temperature (~100° C.). In addition, these low cost thermal laminates may be supplied with a textured PET surface, which serves as an antireflective surface. The polyolefin surface also serves as an adhesive layer. The polyolefin surface is traditionally designed to be very tacky at its softening point and bonds very strongly to the plasma tubes 57. The polyolefin 54P on PET 54M sheet is very tough and durable. The film stack has been designed to be UV stable and the PET surface is very chemically stable. Antiscratch surface coatings may also be applied to the PET surface. The electroded sheet's 56 polymer substrate 54 may alternatively be composed of a reflective white material or an absorptive black material; however the light has to be transmitted out of the opposite side of the tube array 57.

The wire electrodes 53 may be imbedded into the polymer substrate 54 using many different processes. The wires may be pressed into the polymer surface using a roller or plate or may be pulled through a die. Another method of placing the wires into the polymer surface without touching the polymer surface is to place the polymer sheet on a drum and wrap the wires onto the surface of the polymer sheet. Upon heating the drum the polymer surface softens and the wires are pulled into the polymer film as the drum expands. Imbedding the wires in a polyolefin film on PET during this drum embedding process provides a "backstop" for the wire electrodes. Using a polyolefin film thickness equal to the wire diameter places the wires into the polyolefin and they are level with the electroded sheet surface. This stressed wire imbedding on a drum also works using an arced plate. If the electroded sheet is only composed of a polymer substrate containing wire electrodes then the wire electrodes do not have to be exposed to the surface of the electroded sheet. In this case, the wires may be formed directly into the polymer film using a polymer/wire draw process or they may be placed on a polymer substrate and overcoated with a second polymer film or they could be laminated between two polymer films. The laminating adhesive film used to attach the electroded sheet to the tube array also covers the wire electrodes. In this adhesive over laminating process, it is advantageous for the wires to be protruding out of the surface, however the wires should protrude less than the thickness of the adhesive over laminate. The wire will get embedded into the adhesive layer and be located closer to the plasma tubes in the final display panel, leading to lower addressing and sustaining voltages. In one example, the wire electrode in the electroded sheet protrudes less than 25 µm out of the electroded sheet and the wire electrode in the electroded sheet is less than 75 µm deep into the polymer substrate. Several other methods of forming wire electroded sheets are known and the above examples are only intended to illustrate the principle of applying wires to a polymer film to create an electroded sheet.

In some instances it is desirable to have a flattened electroded sheet 56 to connect to the plasma tube array 57. Since the surface of the polymer sheet is moldable it may be flattened by pressing it against a flat plate at an elevated temperature. The flattening process preferably has to be preformed under a vacuum (below about 200 mTorr) in order to get the entire surface flat with no trapped air pockets. The "grooves" around the embedded wire electrodes help during this flattening process to supply channels for the air to escape from the electroded sheet/flattening plate interface. If a flattening plate is used to produce a flattened surface, then either a vacuum bagging process or a vacuum pressing process is desired. In order for the electroded sheet to be released from the flattening plate after the flattening process step, a release film will need to be applied to the flattening plate. One of the best release films for most polymer substrates is a thin silicone coating. This silicone coating may be applied to a polymer film, like PET, and the silicone coated PET film may be placed between the electroded sheet and a ridged flat plate or the silicone film may be applied directly to the ridged flat plate. A flat silicone coated glass release plate has the advantage that it may be reused several times to keep the flattening cost low. The surface of the electroded sheet may also be flattened by running a very smooth roller across the surface.

Figure 29:
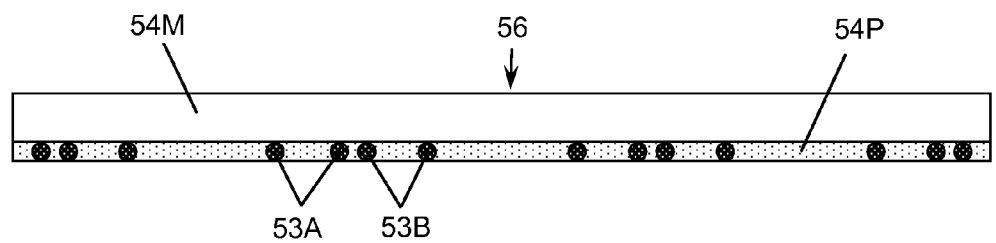
FIG. 29 schematically shows a cross-section of an electroded sheet with two wire electrodes per line embedded in the surface of the film.
Figure 30:
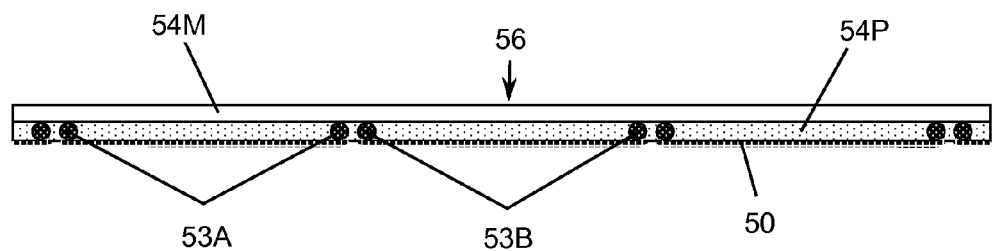
FIG. 30 schematically shows a cross-section of an electroded sheet with wire electrodes embedded in the surface of the film where the wire electrodes are electrically connected to a transparent conductive film.

FIG. 29 shows an electroded sheet 56 that has more than one wire per electrode 53. Using more than one wire per electrode 53 spreads the effect of the electric field from the electrodes 53 into the plasma chamber 52. This spreading of the electric field leads to a spreading of the plasma, hence increasing the luminous and luminous efficiency of the plasma and lowering the voltages. Another method of spreading the extent of the electric field from the wire electrode 53 is to connect a transparent conductive electrode (TCE) 50 to the wire electrode 53, as shown in FIG. 30. The wire electrode 53 carries the bulk of the current along the length of the line and the TCE 50 spreads the voltage across the width of pixels in the line.

FIG. 30 shows a web of TCE 50 between two wire electrodes 53A or 53B. In a surface discharge plasma display the gap between the wire electrodes 53A and 53B controls the initial firing of the plasma. Therefore, the gap between adjacent wire electrodes 53A and 53B must be uniform across the entire electroded sheet 56. Using a TCE 50 web between a pair of wire electrodes 53 has manufacturing advantages in that there are two anchoring lines to electrically connect the wire 53 to the TCE 50. The plasma voltage is applied to both sides of the TCE 50, leading to a more uniform voltage across the TCE 50 and along the length of the entire electrode. In addition, having two anchoring lines helps keep the TCE 50 connected to the wire electrodes 53 over the lifetime of the product. Another advantage of using a webbed TCE 50 between wires is to keep adjacent electrode lines 53A and 54B electrically isolated from each other. During the manufacturing of an electroded sheet 56, the electrode stripes, composing the TCE 50 connected to the wire electrodes 53, have to be electrically isolated from each other. Invariably small shorts exist between the electrode stripes as a result of flakes of TCE shorting the masked area between electrode stripes. The easiest and most efficient method of removing these shorts is to apply a voltage between adjacent electrode stripes, in turn burning out the TCE short and obtaining electrically isolated electrode stripes. Having adjacent pairs of highly conductive wires to apply the voltage across leads to the highest probability of only removing, via burning out, the shorts in the electroded sheet.

In order for the panel to be rollable, the transparent conductive electrode 50 has to be formed out of a material that will not break-up when the polymer substrate 54 is bent. Some acceptable coatings include, but are not limited to, a transparent conductive polymer, like Baytron, or a coating formed using conductive nanotubes or nanorods, like carbon nanotubes. It could be very beneficial to use a combination of conductive polymer and nanotubes, therefore if the conductive polymer forms islands the nanotubes will bridge these islands and electrically connect them together. Both of these coatings form a transparent conductive film that is very rugged and do not become electrically disconnected when stressed as a result of rolling or bending of the electroded sheet.

If a TCE coating 50 is used in the electroded sheet 56, then a double-sided adhesive may be used to bond the electroded sheet 56 to the plasma tubes 57. This double-sided adhesive also protects the TCE 50 from getting rubbed against the plasma tubes 57 while the panel is being flexed or rolled.

Figure 31:
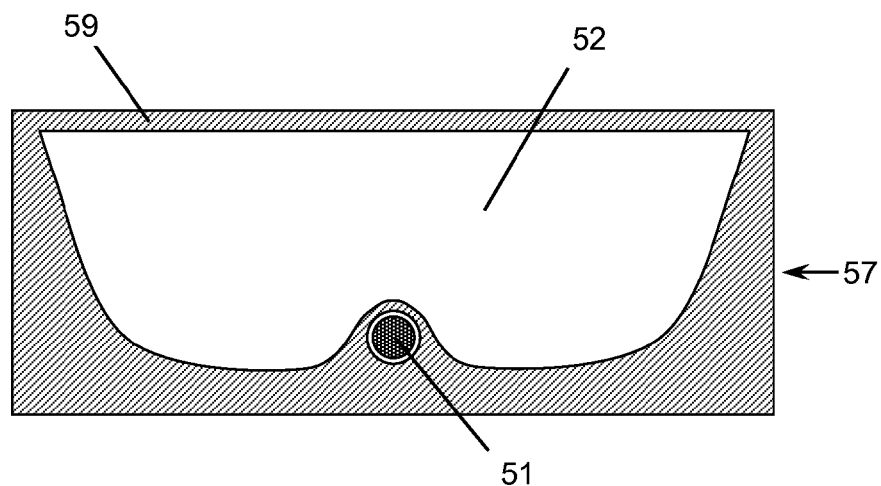
FIG. 31 schematically shows a cross-section of a plasma tube containing a wire electrode.

FIG. 31 schematically shows a cross-section of a plasma tube 57 containing a wire electrode 51. If the plasma tube 57 is used in a surface discharge plasma display, then the wire electrode 51 is used as an address electrode, whereas if the tube 57 is used as a two electrode plasma display panel, the wire electrode 51 is used as one of the sustain electrodes. The plasma tube 57 has a plasma chamber 52 that is evacuated and backfilled with a plasma gas. For monochrome panels, this plasma gas is traditionally composed mainly of Neon, whereas for color panels the plasma gas usually contains Xenon to generate ultraviolet radiation. The top surface 59 of the plasma tube 57 is a thin fairly uniform glass wall 59 such that minimal electric field is dropped across it. This surface 59 is the part of the plasma tube 57 that is attached to the electroded sheet 56 to form the tubular plasma display. Very large displays may be manufactured using the tubular structure. In fact, a plasma has been ignited in a plasma tube over 6 football fields long (about 0.5 kilometers).

The wire electrode 51 containing plasma tubes 57 are preferably formed using a fiber or tube draw process, sometime referred to as a redraw process. The wire electrodes 51 are included into the plasma tubes 57 during the tube draw. Wire from a spool is threaded through "tunnels" or wire guides in the preform. As glass tube 57 is drawn, the wire guide decreases in size and pulls the wire into the tube from the spool of wire attached above the preform. The tube containing the wire electrode is drawn and spooled onto a large diameter drum. The tubes are removed from the drum as tube arrays for subsequent processing. The preforms in which the tubes are drawn from are preferably formed using hot glass extrusion or may be drawn from a tank melt through a die.

Figure 32:
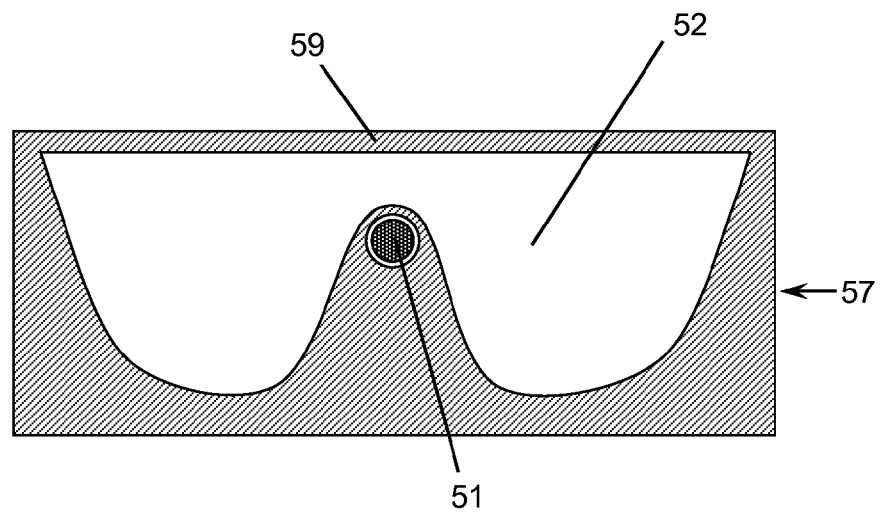
FIG. 32 schematically shows a cross-section of a plasma tube containing a wire electrode where the wire electrode is extended up into the plasma to be located closer to the top addressing surface.
Figure 33:
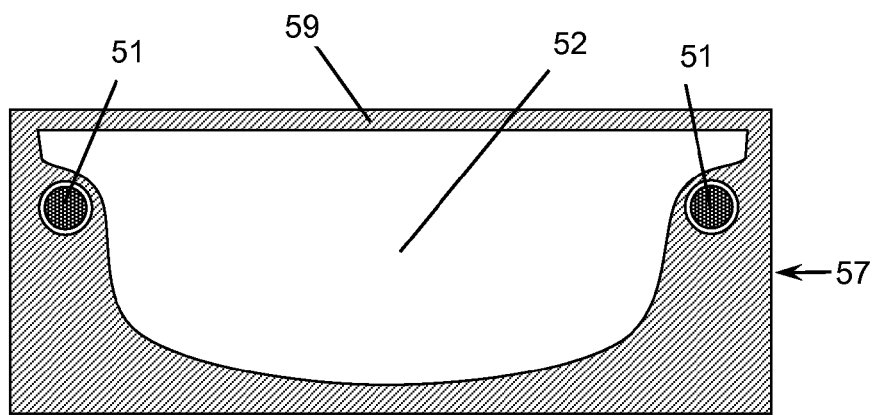
FIG. 33 schematically shows a cross-section of a plasma tube containing two wire address electrodes in the sides of the tube located close to the top addressing surface.

FIG. 32 depicts a structure where the wire electrode 51 is positioned inside the plasma tube 57 close to the sustaining surface 59 of the plasma tube 57. In a surface discharge plasma display, moving the address electrode closer to the sustaining electrodes 53 lowers the required addressing voltage and speeds up the addressing time. One problem with this structure (FIG. 32) is that the wire address electrode 51 is in the center of the plasma cell 52, which has an effect on the electric field from the sustain electrodes 53. FIG. 33 shows a tube 57 structure that moves the address electrode 51 into the sides of the tube walls. Moving the wire electrodes 51 to the sides of the tube 57 provides a large unobtrusive gas volume for uniform plasma firing. Placing the wire address electrodes 51 near the top also shortens the addressing distance in turn lowering the addressing voltage and speeding up the addressing time. Having a small gas gap between the wire electrodes 51 and the top of the plasma tube 59 provides the electric field an open space to reliably address the pixel.

Figure 34:
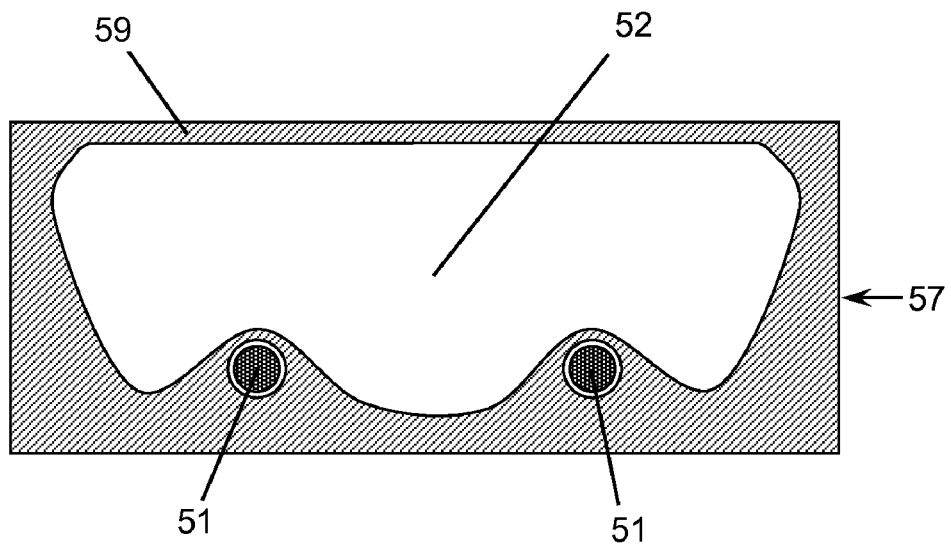
FIG. 34 schematically shows a cross-section of a plasma tube containing two wire electrodes located in the bottom of the plasma tube.

FIG. 34 shows a plasma tube 57 with two wire electrodes 51 at the bottom of the plasma channel 52. Spacing two wire electrodes 51 at the bottom of the plasma channel 52 increases the effective width of the address electrode, which leads to faster more uniform addressing of the plasma.

Figure 35:
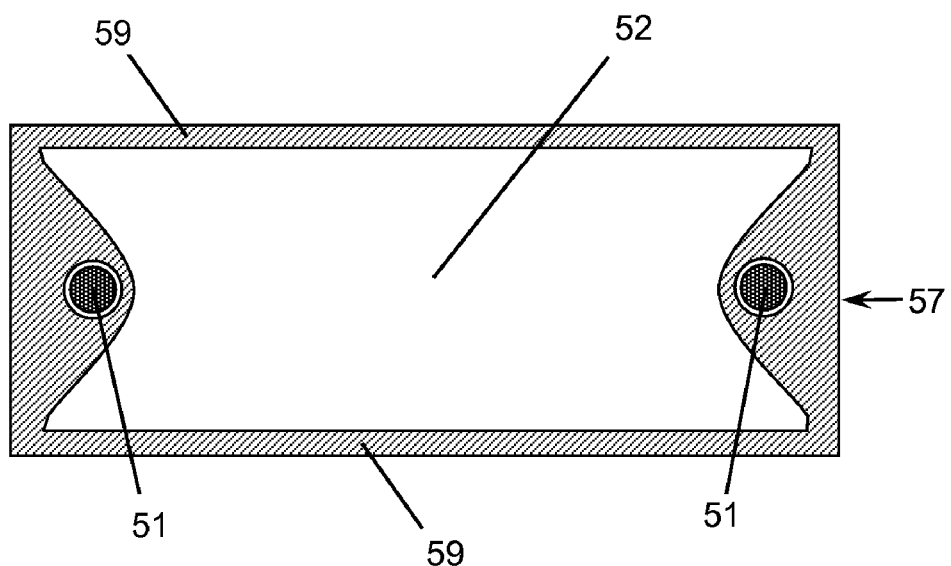
FIG. 35 schematically shows a cross-section of a plasma tube containing two wire electrodes located in the sides of the plasma tube.

In FIG. 35 the wire electrodes 51 are placed in the center of the plasma tube 57 side walls. In this case, there are two thin glass wall surfaces 59 such that either side may be attached to the electroded sheet 56. Creating a tube with two thin walls 59 and thicker side walls has advantages in pulling the surfaces 59 of the tube 57 flat during the tube draw process, as discussed below.

Figure 36:
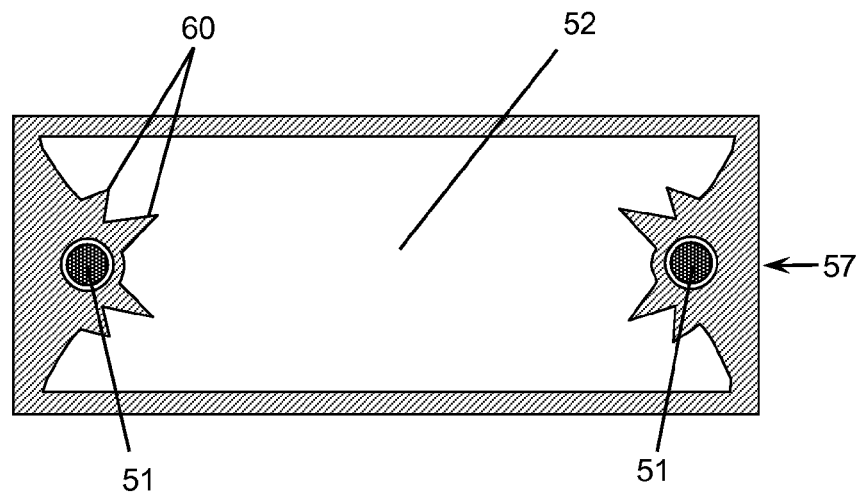
FIG. 36 schematically shows a cross-section of a plasma tube containing two wire electrodes located in the sides of the plasma tube where the glass around the wire electrodes have structure to enhance the firing of the plasma.
Figure 37:
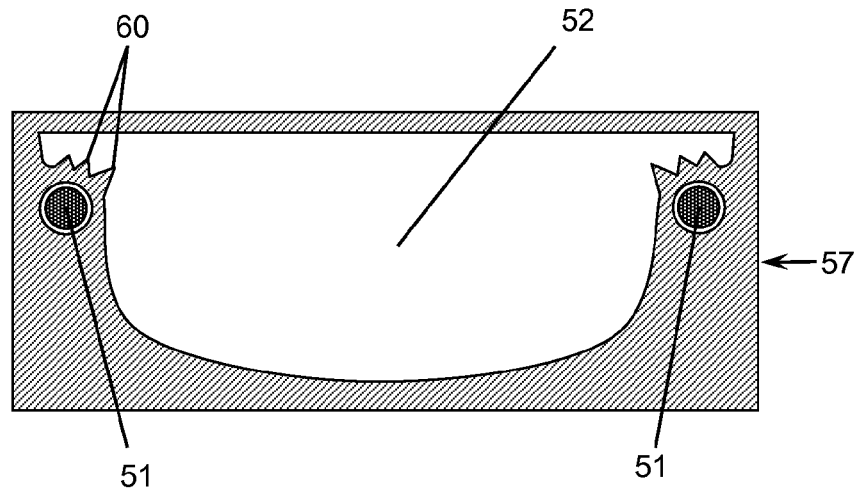
FIG. 37 schematically shows a cross-section of a plasma tube containing two wire address electrodes in the sides of the tube located close to the top addressing surface where the glass around the wire electrodes have structure to enhance the addressing of the plasma.
Figure 38:
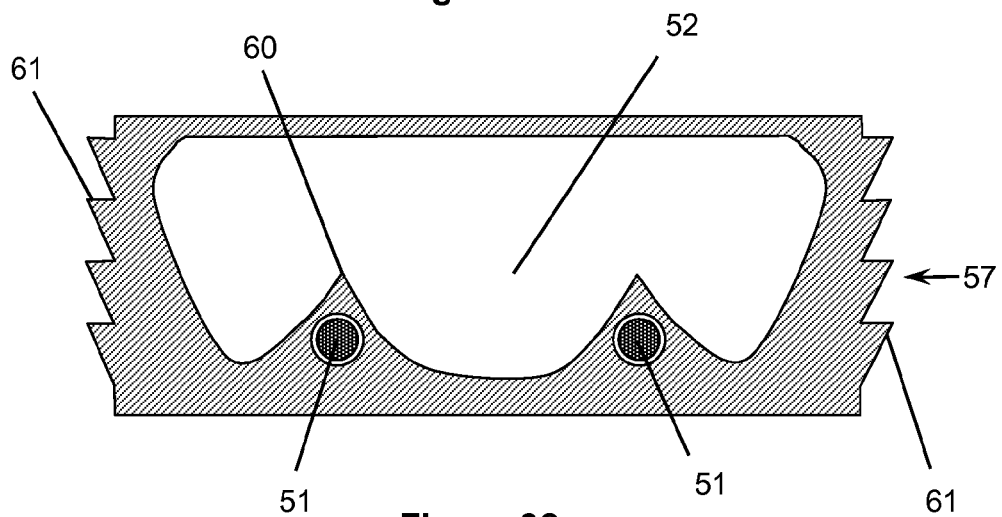
FIG. 38 schematically shows a cross-section of a plasma tube containing two wire electrodes located in the bottom of the plasma tube with a spike in the glass around the wire electrodes to enhance the addressing of the plasma and structure on the outside walls of the tube to redirect light.

FIGS. 36-38 show different plasma tube 57 structures with texture 60 around the wire electrodes 51. The addition of intrapixel shape 60 around the wires 51 assists in firing the plasma in the plasma chamber 52. The electric field strength is higher in the glass spikes around the wire electrode 51 since the tube's glass has a higher dielectric constant than the gas. Depending on the shape of the plasma tube 57 and the structure of the texture 60 around the wire electrodes 51, the effect of a concentrated electric field could lower the addressing, firing or sustaining voltages required to operate the display. In addition, the addressing speed, as well as the luminance and luminance efficiency, may be increased.

FIG. 38 also shows structure 61 on the outside of the tube 57. This structure 61 on the outside walls of the plasma tubes 57 may be used to scatter or redirect light coming from the plasma tube out toward the viewer. Coating the bottom sides of the triangular shapes with a reflective coating will increase the efficiency of the light redirecting structure 61.

Figure 39:
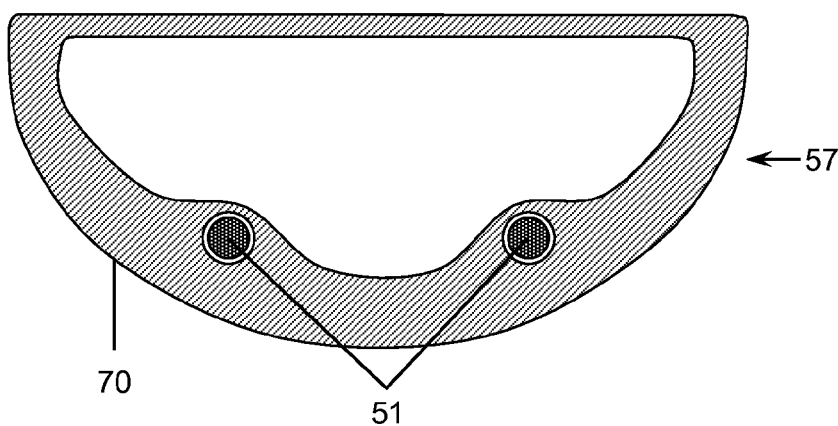
FIG. 39 schematically shows a cross-section of a plasma tube containing two wire electrodes located in the bottom of the plasma tube where the sides of the tubes are curved to increase its flexibility when bent in a panel.

FIG. 39 shows a plasma tube 57 with rounded sides and bottom 70. Rounding the sides and bottom 70 of the tubes 57 in the tube array/panel/display creates a panel with more flexibility. First, the panel is able to be bent/rolled slightly away from the electroded sheet or opposite to the easy rolling direction since there is a recess on the sides of the tubes. Second, rounding the corners 70 of the tube 57 makes the plasma tubes much stronger and more flexible when bent along the tube direction. Third, adjacent tubes 57 do not come into hard contact along the entire edge of the tube 57 when the panel is rolled/unrolled. Therefore, the stress applied to the tubes during usage is minimized. In addition, if any particulates get between the tubes they do not form a contact point and break a tube. Fourth, a round tube bottom and flat tube top help when assembling the display. When assembling the tube array, if a tube 57 is flipped over, the tube 57 is easily noticed because it rolls and the flat surface has a noticeably different reflection than the rounded tube surface.

Figure 40:
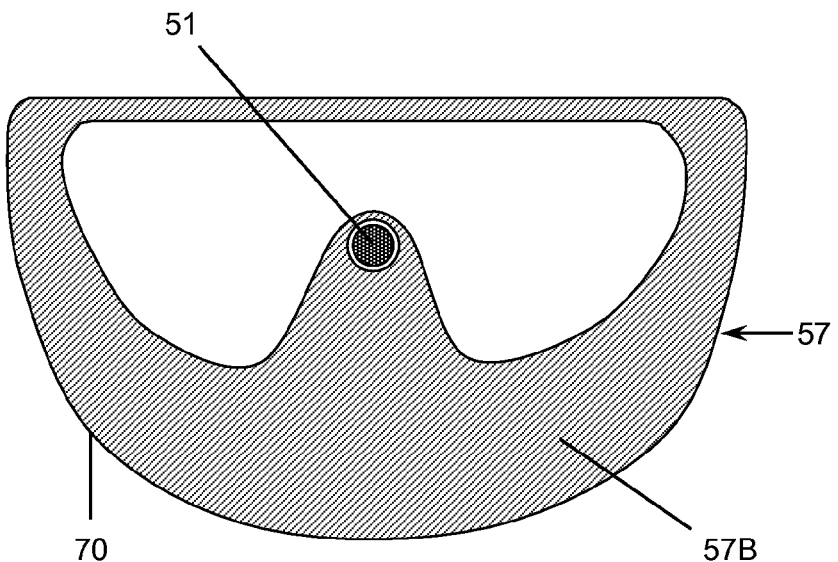
FIG. 40 schematically shows a cross-section of a plasma tube containing a wire electrode with a thick curved base to enhance the mechanical strength of the plasma tube.

FIG. 40 shows a tube structure 57 with a much thicker glass base 57B. Designing a tube with a thick base 57B and thick side walls with a curved base 70 creates a much stronger tube that has a much higher crush resistance. Having rounded edges on both the inside and outside tube corners, such as those traditionally obtained using hot glass extrusion or tank drawn preforms also has a dramatic effect on the strength of the final glass tubes 57. Another method to strengthen the glass tubes is to apply a coating to the tube surface. This coating could be a color filter coating as discussed below or it could be a surface modification film. These surface coatings help protect the surface from scratches, which tends to weaken the glass tubes.

Figure 41:
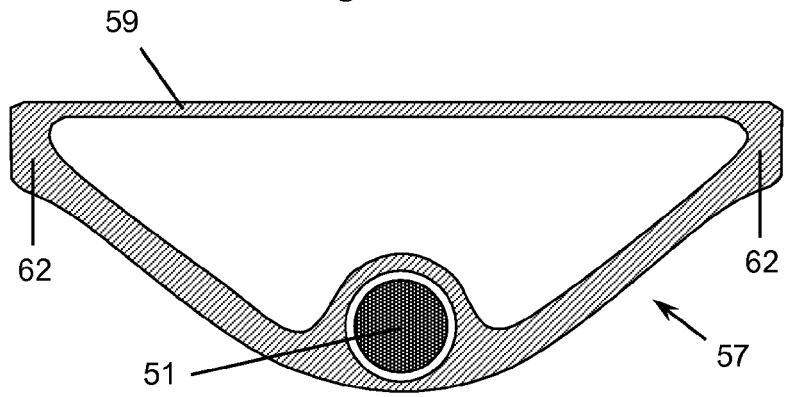
FIG. 41 schematically shows a cross-section of a plasma tube containing a wire electrode with very thin walls to create a very light weight tube array.

FIG. 41 shows a tube structure 57 with minimal glass volume, which leads to a very light weight tube array. The electrode 51 is shown to be much larger than in the other figures, showing that either a much larger wire electrode 51 may be used or the image is magnified and the tube is much smaller than in the other figures. In order to obtain a flat surface in the thin top layer 59 extra glass has to be added to the sides of the tube 62 in order to pull the thin glass surface 59 flat during the fiber draw. These thicker glass regions 62 may also be composed of a stiffer glass or a glass with a lower viscosity. The effects on the draw forces on the shape of the tube are explained below.

Figure 42:
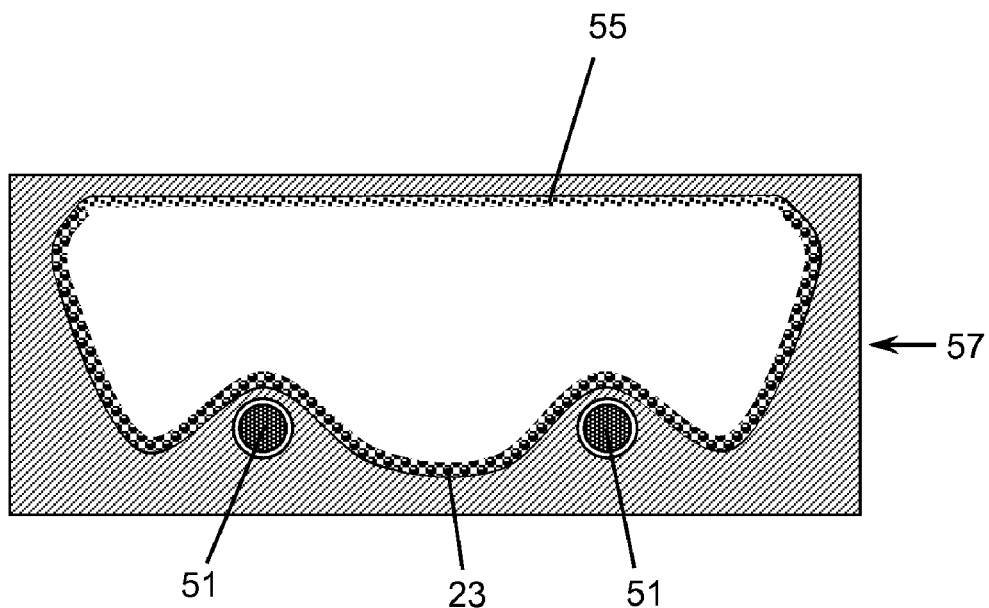
FIG. 42 schematically shows a cross-section of a plasma tube containing a hard emissive coating on one surface and a phosphor coating on the other surfaces.

FIG. 42 shows a plasma tube 57 containing wire address electrodes 51 with a hard emissive coating 55 on the inside top surface and a phosphor coating 23 on the other inner tube surfaces. In order to create a color display, at least three different color phosphor coated tubes are required. Traditionally, the three primary color phosphors used are red, green and blue. Therefore, arraying a panel with RGB phosphor filled tubes and controlling the amount of light generated at each pixel along the length of the tubes creates a full color image. To create a plasma display with higher quality images the different color tubes may be different widths. The relative width of one of the color tubes may be increased to compensate for the lower luminance of the one of the colors (usually blue) or to increase luminance or brightness of a particular color, like green, since the human eye is more sensitive to green, a wider green pixels will have the appearance of a brighter display.

To stop any phosphor ion damage the phosphors could also be placed on the outside of the plasma tubes. However, the walls of the plasma tubes would have to be transparent to the UV generated inside the tubes. Most glass compositions that have fairly high UV transmissions, like silica, also have very high melting and forming temperatures and usually have a fairly large network and are not pervious to some of the preferred plasma gas mixtures, such as Helium. Placing the phosphors on the outside of the plasma tube would also make the gas processing and sealing of the plasma tubes easier since a hermetic seal would be easier without phosphors in the seal area.

The hard emissive coating could be a traditional magnesium oxide, MgO, like in traditional plasma displays or could be a different material, like strontium oxide, or a combination of several different metal oxides or metal fluoride components. The hard emissive coating is used to reduce the amount of sputtering of the glass surface that the plasma is being fired against and also serves as a secondary electron emissive coating. A traditional method of coating the tubes with ebeam evaporation or sputtering is virtually not possible for small long plasma tubes. Therefore, a solution coating or chemical vapor deposition, CVD, coating is required. Solution coating, such as magnesium acetate, magnesium methoxyethoxide or strontium isopropoxide, may be coated on the inner tube walls and then pyrolized to form a MgO or SrO containing emissive coating. The solution coating may alternatively be formed using a nanopowder of a hard emissive coating, like MgO, SrO, CaO, etc., mixed into a vehicle, like amyl acetate. The vehicle could also contain a pyrolizable solution like discussed above. Therefore, a MgO powder could be mixed with a strontium isopropoxide solution to form a compound hard emissive coating. When the strontium isopropoxide in the vehicle is pyrolized it will bond the MgO powder together and attach it to the inner surface of the plasma tubes.

The phosphor and hard emissive coatings could be coated after the tubes 57 are formed using an off-line coating process. The coatings may be simply flushed through the plasma tubes to create a film on the inside surface of the tubes. Heat may be applied to the coating to assist in evaporating some of the solvent to create a thicker coating. The coatings could also be pulled though the tube to deposit a layer on the inner tube surface. A powder coating could also be blown through the tube and coated on the tube walls. Electrostatics could be used to attract the powder to one or more of the surfaces. Also, one or more of the surfaces could be coated with an adhesive layer to hold onto the powder. A settling process could also be used to coat one or more surfaces. In this case, the phosphor or hard emissive powder would be mixed in a vehicle and placed into the tubes. The tubes would then be placed in a horizontal position so the powder may settle. The liquid vehicle may then be slowly decanted from the tubes so as not to disturb the powder coating. To create a thicker film the coating solution may be repeatedly coated inside the tube. A drying step may be required between each coat.

After the plasma tubes are coated with a hard emissive coating and a phosphor layer they are gas processed. There are several methods of gas processing the plasma tubes. The easiest and most manufacturable is to connect the ends of the plasma tubes to a gas tight manifold. An epoxy may be used to create a vacuum tight manifold seal around the ends of the tube array and the manifold may be attached to a vacuum system. The tube array may then be hung in a furnace to heat the tubes during the evacuation process. Proper design of the system allows the epoxy manifold to only be slightly above room temperature as the tube array is raised to several hundreds of degrees Celsius. A vacuum manifold may be placed on both ends of the tube array or may be placed on one end and the other end of the tubes may be sealed closed. After the temperature of the tubes is elevated under a high vacuum they may be backfilled with the plasma gas and the ends of the tubes near the gas manifold may be sealed closed. The tubes may be sealed closed using a gas torch or a hot bar may be placed against the surface of the tubes to seal them closed. Each tube is individually sealed closed containing its own plasma gas. If it is desired, the red, green, and blue phosphor coated tubes may contain different gases at different pressures, which can be optimized to the particular plasma tube geometry and color phosphor coating of that tube. However, the sustain voltage and margin of all the tubes used in a panel will have to be similar in order for the display to be properly addressed and operated.

A plasma may be ignited inside the plasma tubes to assist in the gas processing step. The simplest method of igniting a plasma inside the tubes is to place the tube array between two metal electrodes and apply an AC voltage to the metal electrodes. An oxygen or fluorine based gas may be ignited inside the tubes to help clean and remove any carbon contamination inside the tubes. A dual electrode sustainer plate may be used in order to minimize the ion damage on the phosphor layer. This dual electrode sustainer plate should be placed against the tube surface containing the MgO layer. This sustainer plate could have interleaved cathode and anode electrodes. In order to spread the ion bombardment across the entire inside surface of the plasma tubes it is necessary to translate the sustainer plate along the length of the tube. The sustainer plate may be in a form of a plate or a roller. It is also advantageous if the sustainer plate is composed of a metal foil on a soft backing so not to crush or crack any of the plasma tubes when pressed against the tube array.

Figure 43:
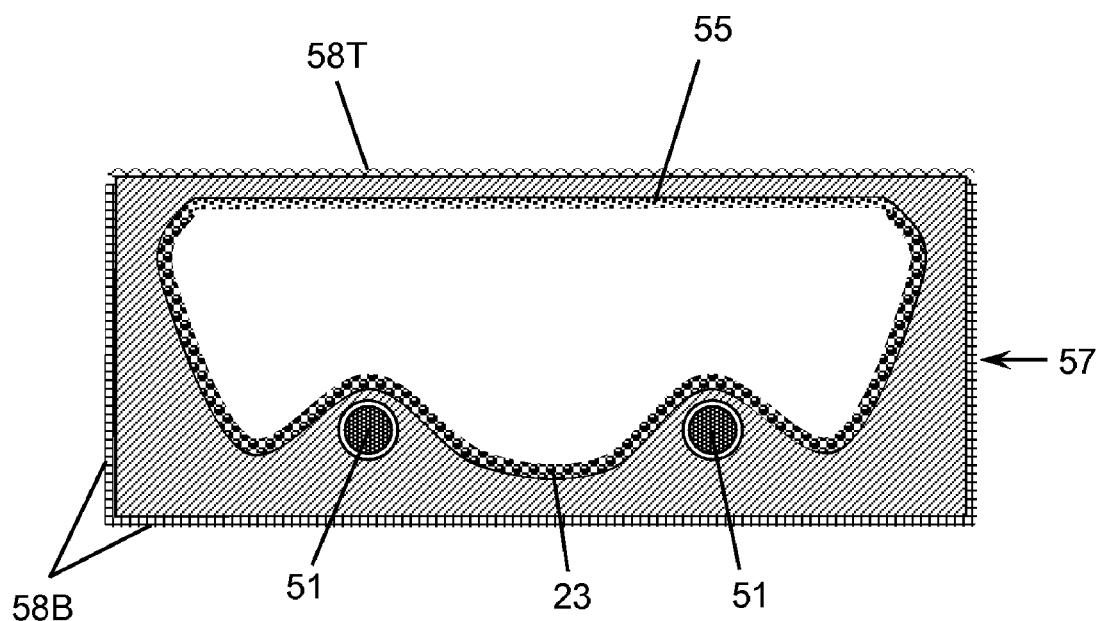
FIG. 43 schematically shows a cross-section of a plasma tube containing color filters applied to the surface of the tube.

FIG. 43 shows that a color filter 58 may be applied to the outside of the plasma tubes to increase the bright room contrast and the color purity of the panel. One of the only image quality specifications that LCDs have over PDPs is bright room contrast. That is because there is no easy way to economically add a color filter to a plasma display. The last steps in a PDP panel manufacturing process are high temperature frit seal and gas processing steps. These process steps are performed at about 350° C., which is too high of a temperature for any of the low cost high quality polymer color filter materials. However, when a plasma display is manufactured using plasma tubes, color filter films 58 may be applied to the surface of the tubes after they have been gas processed and sealed. Assuming that the tube in FIG. 43 has a green phosphor material 23 deposited inside the plasma tube 57 then a color filter film 58T may be applied to the top of the plasma tube 57 that transmits green, but absorbs red and blue light. The bottom and sides of the plasma tube 57 may be coated with a different color filter 58B that reflects green light, but absorbs red and blue. The top color filter film 58T allows the green phosphor generated light to escape out the top of the plasma tube 57, but absorbs any red or blue light incident on the tube, in turn enhancing the bright room contrast and color purity of the display. The color filter coated bottom and sides 58B reflect the green phosphor 23 generated light back into the tube, such that it escapes out of the top side of the tube and absorbs any red and blue light leaking through the top color filter or coming from an adjacent tube. This bottom and side color filter 58B increases the brightness and contrast of the display. To increase the brightness even further the color filter 58B may be solely coated on the bottom of the plasma tube 57 and the sides may be left bare. Similar examples can be explained for the tubes that have red and blue phosphor coatings. The color coating may be applied to the tubes by pulling the tubes across a coating head, the tubes may be dip coated by submerging them into a colored solution, or a color film may be sprayed onto the tube surface. Black coatings may be added to the sides or bottom of the plasma tubes to enhance the contrast of the display. Black coated tube sides also serve a black matrix function to better define the pixel.

A contact adhesive may be used to attach the tube array to the surface of electroded sheet. Using a pressure sensitive contact adhesive bonds the tube array containing the polymer color filter coatings 58 to the electroded sheet at room temperature. This final low temperature assembly step does not cause any color shift in the color filter. The contact adhesive may be initially applied to the electroded sheet and when bonded to the tube array forms a very strong bond to the tubes. A strong bond is advantageous when rolling and handling the panel and helps protect the color filter material from rubbing off. The contact adhesive removes any pressure points due to the wire electrodes in the electroded sheet or small particles on the plasma tubes, thus creating a more rugged panel. The contact adhesive also removes any reflection at the eSheet/plasma tube array interface.

Figure 44:
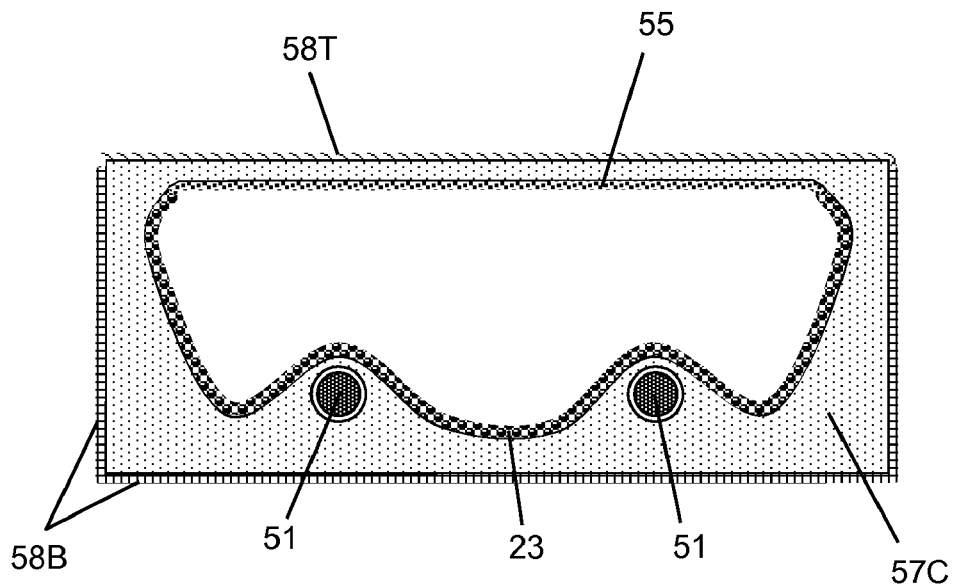
FIG. 44 schematically shows a cross-section of a plasma tube composed of a colored base glass and having color filters on the surface of the tube.

FIG. 44 shows that the plasma tube 57C could be formed out of colored glass, which adds a color filter to the plasma tube. It would also be beneficial if the glass used to form the plasma tube 57 reflects the ultraviolet light, UV, generated by the plasma gas, but transmits the photoluminescent visible light from the phosphor. The options for glass that reflect UV and transmit visible light are very limited. They will have to be in the form of a phase separated glass or glass ceramic with the size of the internal particles very small and a tight distribution. The major surface requiring UV reflection is a surface with the hard emissive coating, like MgO. A UV reflective surface could be obtained in the coating used to form this hard emissive coating. If a coating of nanoparticles is used with the correct UV reflectivity, then most of the UV light incident on this surface may be scattered back into the plasma tube, thus increasing the brightness of the display. In some embodiments, to obtain the optimum UV reflectivity a mixture of different nanoparticles with different dielectric constants, like MgO and SrO or CaO or $MgF_2$ or $CaF_2$, may have to be used.

Figure 45:
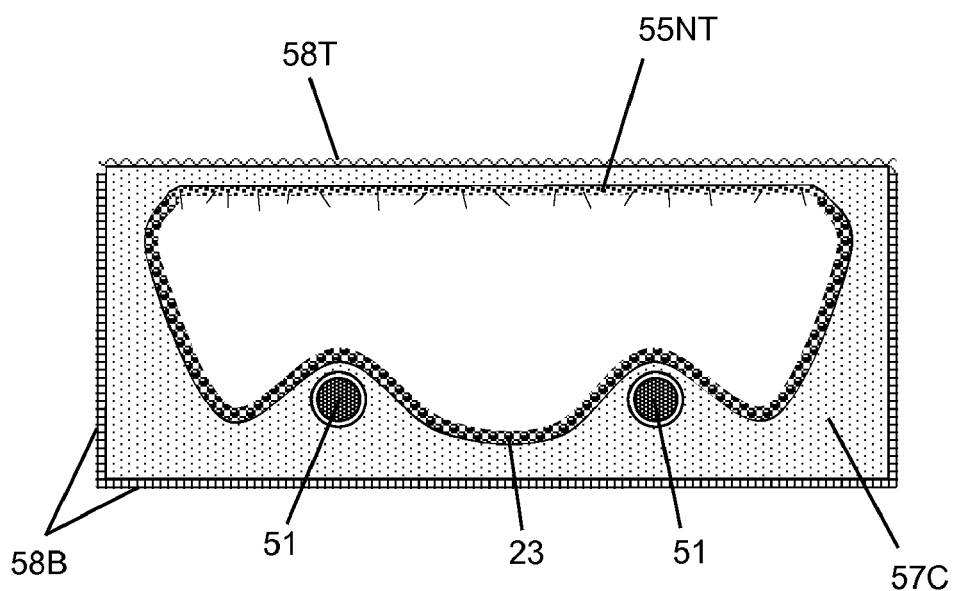
FIG. 45 schematically shows a cross-section of a plasma tube containing a hard emissive coating containing nanotubes on one surface and a phosphor coating on the other surfaces.

FIG. 45 shows a colored glass plasma tube 57C with its corresponding color phosphor coating 23, color filters on the top 58T, and color filter on sides and bottom 58B. The plasma tube has a hard emissive coating containing nanotubes, nanorods or nanoparticles 55NT on the top sustaining surface. Adding nanotubes to the MgO coating 55NT has at least two benefits. First, the nanotubes or nanoparticles act as small storage capacitors inside the plasma tubes. These small charge storage islands help in addressing the subpixels inside the panel. Having the capability to store more charge at each subpixel increases the voltage margin of the panel. An increased voltage margin allows for faster addressing and more options for cell structure, gas composition and voltage waveforms. Secondly, since nanotubes have a very low electron emission voltage (typically ~2 V/μm), they serve as electron emitters during sustaining, in turn, increasing the brightness of the display.

Figure 46A:
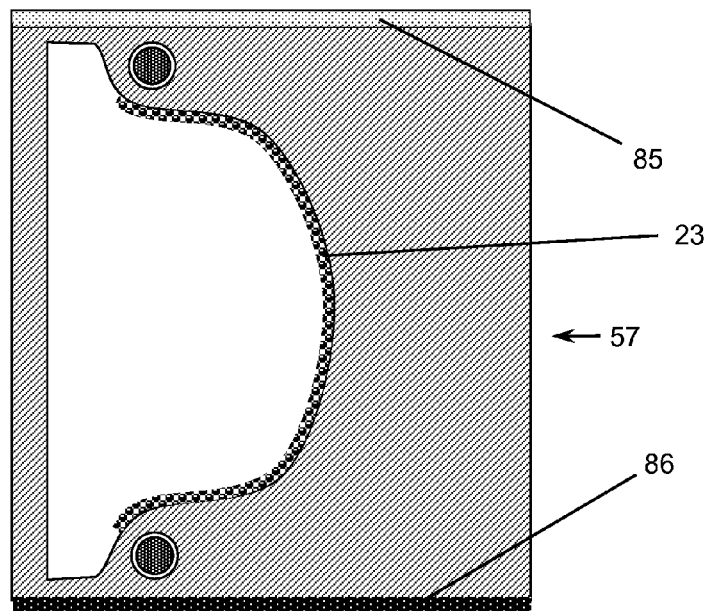
FIG. 46a schematically shows a cross-section of a plasma tube with a reflective side and an absorbing side.
Figure 46B:
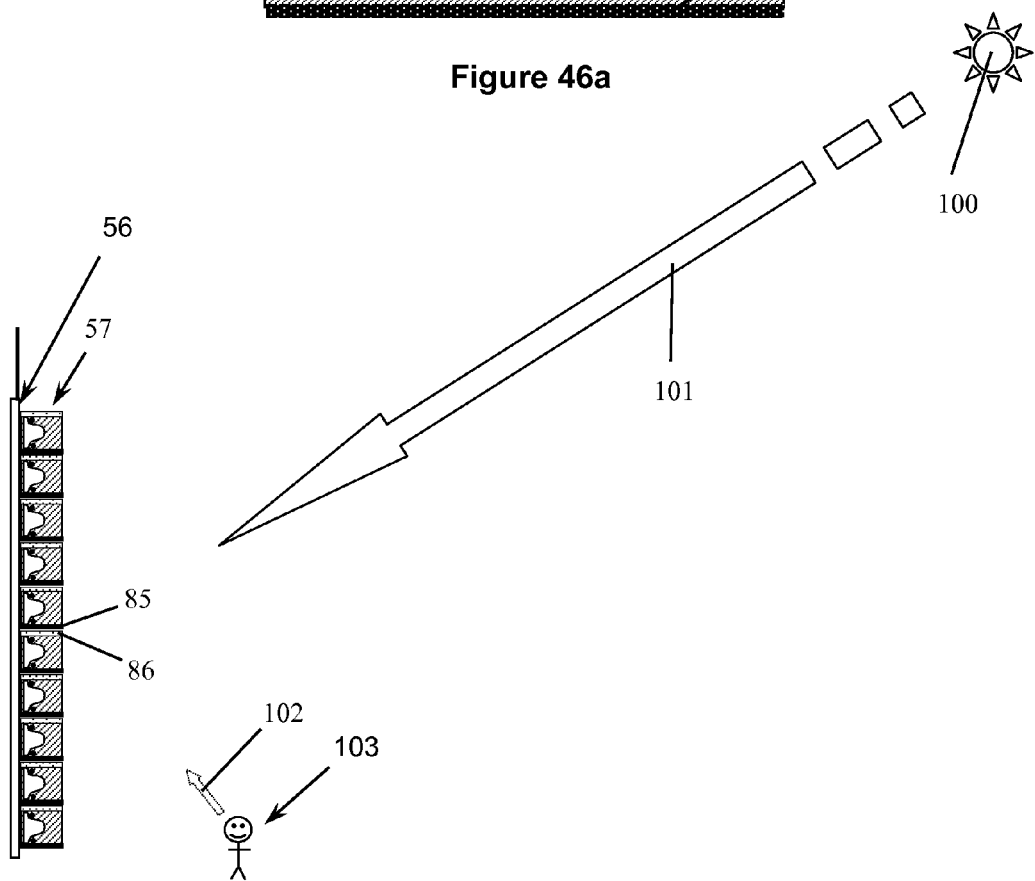
FIG. 46b illustrates an array of tubes in FIG. 46a illuminated with sun light.

FIG. 46 shows another embodiment of the invention where a black absorbing coating 86 is added to the side of the tube 57 to act as a visor during outdoor applications to block the sunlight 101 shining into the panel from the sun 100. The phosphor material 23 in the plasma tube 57 is very white and reflective in natural sunlight 101, therefore the sun blocking visor 86 blocks the sunlight 101 shining on the phosphor coating 23. This visor methodology is used in the Light Emitting Diode (LED) industry for outdoor electronic signs and is also used in traffic lights to remove the light reflecting on the light bulbs. However, in the traditional flat panel industry where the structure is built-up on the panel, it is difficult to achieve depth or height of an absorbing layer required to shadow the pixel from the sun 100. Using a light blocking visor structure 85 similar to that shown in FIG. 46a requires a tube height, $h = w/\tan(\alpha) - c$, where w is the width of the pixel, c is the depth of the phosphor channel and α is the angle of the sun with respect to the horizon. If a display has a pixel pitch of 1 mm with a 0.2 mm deep channel and the sun is very low on the horizon (30 degrees) then the height of the tube has to be 1.93 mm to block all the sun shining onto the phosphor. However, if a tube 57 is designed to block light as low as 30 degrees then the viewing angle from below is also 30 degrees and a greater percentage of the emitted light gets blocked as the viewer moves off the vertical axis of the display. FIG. 46 also shows adding a reflective layer 85 to the other side of the tube 57. If the tubes 57 are arrayed in a panel similar to that shown in FIG. 46b, then sunlight 101 shining on the tube array 57 from above the normal of the display gets absorbed by the sun blocking visor 86 reducing the amount of light incident on the reflective phosphors. However, a viewer 103 standing below the normal of the panel will observe 102 the white reflecting layer 85 part of the tube 57, which will reflect light generated by the phosphors toward the viewer 103. The concept of using a black absorbing layer to serve as a visor to block the sunlight in a wire containing fiber was first disclosed in U.S. patent application Ser. No. 11/236,904, entitled "Electrode Enhancements for Fiber-Based Displays", filed Sep. 28, 2005, incorporated herein by reference.

Figure 47A:
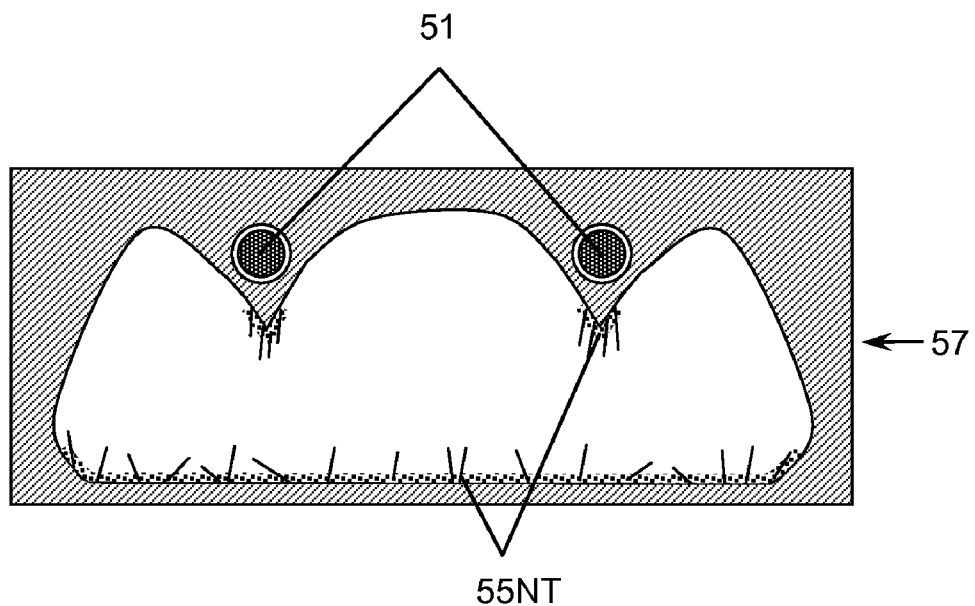
FIG. 47a schematically shows a cross-section of a plasma tube being coated with an electron emissive coating containing nanoemitters on one surface and on the tips of the glass around the address electrodes.
Figure 47B:
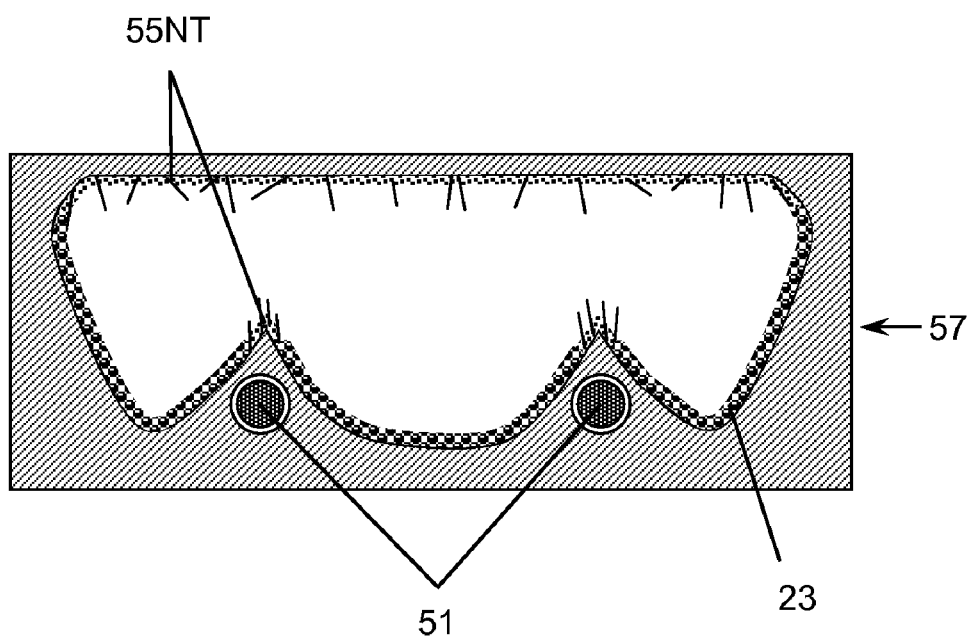
FIG. 47b schematically shows a cross-section of a plasma tube in FIG. 47b further being coated with a phosphor layer.

FIG. 47 shows a method of coating a plasma tube 57 with a hard emissive coating containing nanotubes 55NT then coating it with a phosphor coating 23. FIG. 47a is a cross-section of a plasma tube 57 filled with a MgO/nanotube solution. The solution is allowed to settle to form a coating 55NT. Coating a plasma tube 57 with structure around the wire address electrodes 51 places an MgO/nanotube coating 55NT on both the thin walled glass surface and on the tips around the address electrodes 51 after settling. If the plasma tube 57 is filled with phosphor 23 and allowed to settle toward the opposite surface then a phosphor coating may be settled onto the remaining surfaces, as shown in FIG. 47b.

Figure 48:
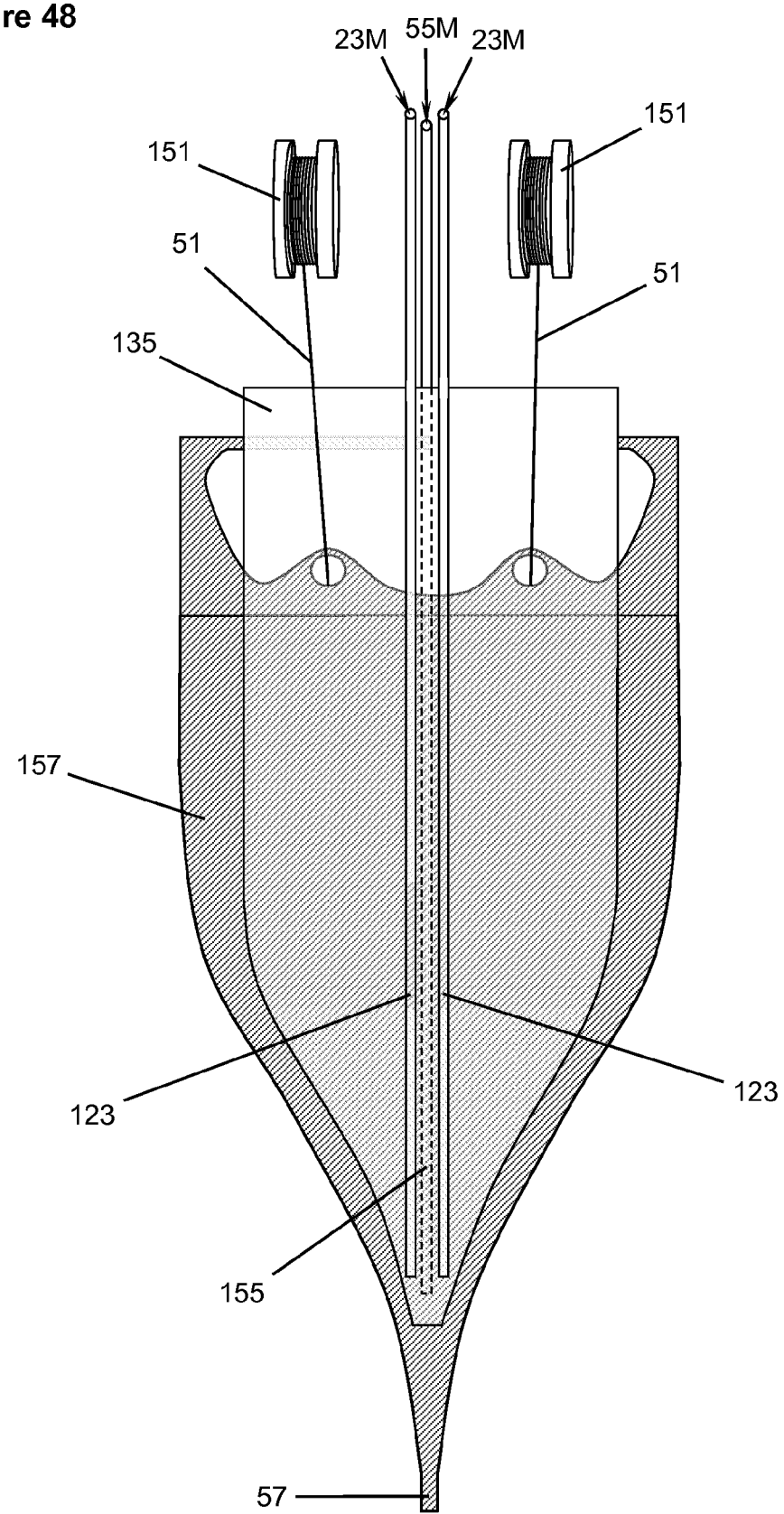
FIG. 48 schematically shows the root of the tube draw process where phosphor and a MgO layer may be coated inside the plasma tubes during the draw process by delivering the materials through small tubes into the root of the tube.

As explained above, there are many methods of coating the insides of the plasma tubes 57 with a hard emissive coating 55 and a phosphor layer 23. FIG. 48 shows a method of applying these coatings during the tube draw process. It is not possible to simply deposit the phosphor on the inner tube preform 157 wall and draw it into the tube 57, since most glass tube materials require a high temperature tube draw (~1,000° C.). If the phosphor material is at an elevated temperature for too long, its luminous efficiency degrades. Therefore, the only way to apply the phosphor coating during the tube draw process is to deliver the material deep down into the root of the draw. Small delivery tubes 123 may be placed into the tube preform during the tube draw to carry the phosphor material 23M into the root. A carrier gas, preferably oxygen, mixed with the phosphor material 23M is fed into the carrier tubes 123 and is delivered down into the root of the draw. A high flow rate down the delivery tubes 123 causes minimal heating of the phosphor material. Delivering the phosphor material 23 deep into the root of the draw means the phosphor material 23M will only be at the draw temperature until the tube is drawn out of the bottom of the furnace and cooled to room temperature. The carrier gas can escape out of the top of the tube preform and if composed of oxygen can help clean any carbon contamination. Likewise, the MgO material 55M may also be delivered into the root of the draw through a small tube 155 using a carrier gas. A separator plate 135 may be used to keep the phosphor and MgO depositions on their perspective sides. The delivery tubes 123 and 155 may be attached to the separation plate 135 and they have to be held at a fixed location relative to the furnace or the root of the draw. The separation plate 135 has to be tapered at the bottom to follow the contour of the root in order to extend down into the root and keep the phosphor and MgO coatings separate and on their perspective inner plasma tube walls. Wire electrodes 51 from wire spools 151 can be co-drawn in to the tubes during this on the draw coating process.

Figure 49:
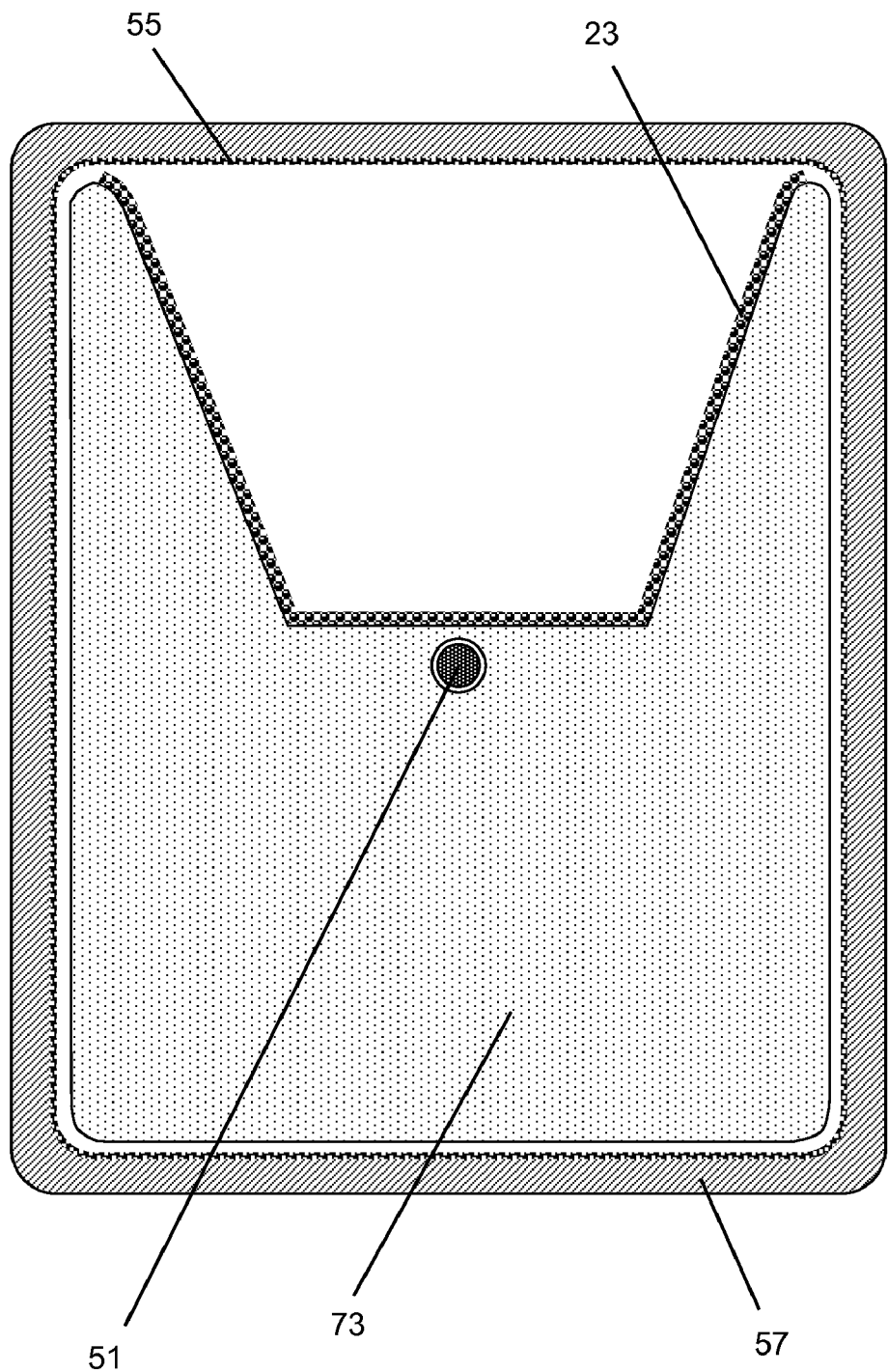
FIG. 49 schematically shows a phosphor coated fiber containing a wire electrode inserted into a tube.

FIG. 49 shows another embodiment of the present invention where a fiber 73 containing a wire electrode 51 and a phosphor coating 23 is drawn into a hollow tube 57 containing a hard emissive coating 55. The fiber 73 containing a wire address electrode 51 may be drawn in a fiber draw process on a drum and coated with phosphor 23 off-line then unwound and drawn into the plasma tube 57 in a subsequent tube draw process. The hard emissive coating 55 may be applied to the surface of the plasma tube preform 157 and then drawn into the small tube diameter 57 or may be fed into the plasma tube down a small delivery tube similar to that explained above in FIG. 48. If the hard emissive coating 55 is applied during the tube draw process then it is advantageous to feed the phosphor 23 coated fiber 73 down a guide tube into the root of the tube draw to keep the MgO 55 from depositing on the phosphor layer 23. The advantage of coating a wire electroded 51 fiber 73 with a phosphor coating 23 off-line is that a simple spraying process may be used to phosphor coat the fiber 73. A phosphor coating 23 deposited using a spraying process creates a very uniform phosphor coating 23 on the plasma channel in the fiber 73. In addition, when the fiber 73 is drawn into the tube 55, the fiber 73 will only see the elevated temperature for a very short period of time since it is moving through the root at the tube draw speed. This short elevated temperature has minimal degradation on the phosphor coating 23. Since it is not required that the fiber 73 and tube 55 are fused together during the tube draw process they may be composed of different glass compositions. The tube 55 may be composed of a colored glass that matches the color of the phosphor coating 23 and the fiber 73 could be composed of a white opal glass to reflect the light generated by the phosphor layer 23 trying to escape out of the bottom or sides of the fiber/tube.

Figure 50:
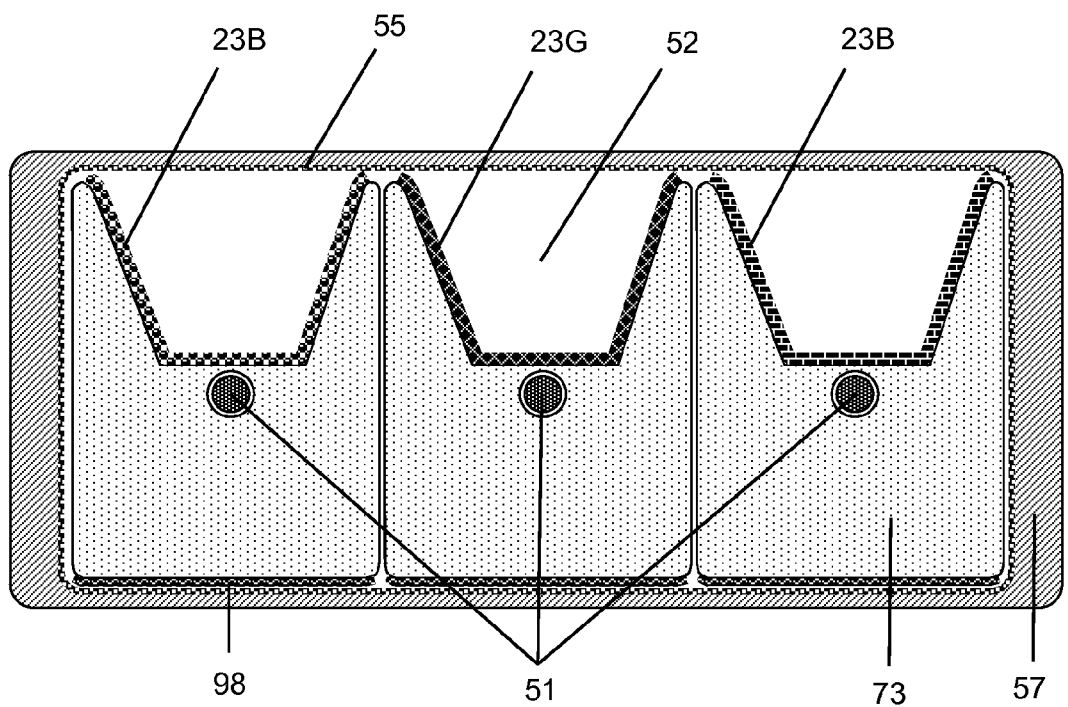
FIG. 50 schematically shows three (red/green/blue) phosphor coated fibers containing wire electrodes inserted into a tube.

FIG. 50 shows three fibers 73 drawn into a single plasma tube 57. Each of the three fibers 73 may be coated with red 23R, green 23G and blue 23B phosphor layers. To help control the contamination inside the tubes the bottom of the fibers 73 is preferably coated with a getter 98. The getter 98 is not in the plasma generation area 52 and minimizes the contamination in the plasma tubes, hence keeping a low plasma firing voltage over the life of the display. The plasma gas gettering material 98 may also be coated on the bottom of the plasma tube 57. Coating the getter material 98 in a form that can be compacted helps keep the fibers 73 tight against the top of the tube 57 surface. The fibers 73 have to be relatively tight against the tube 57 at the top surface to keep electrons and ions from leaking over the top side of the fiber plasma channels 52 forming barrier walls to eliminate any cross-talk and misaddressing, if more than one fiber 73 is added per tube 57.

Figure 51:
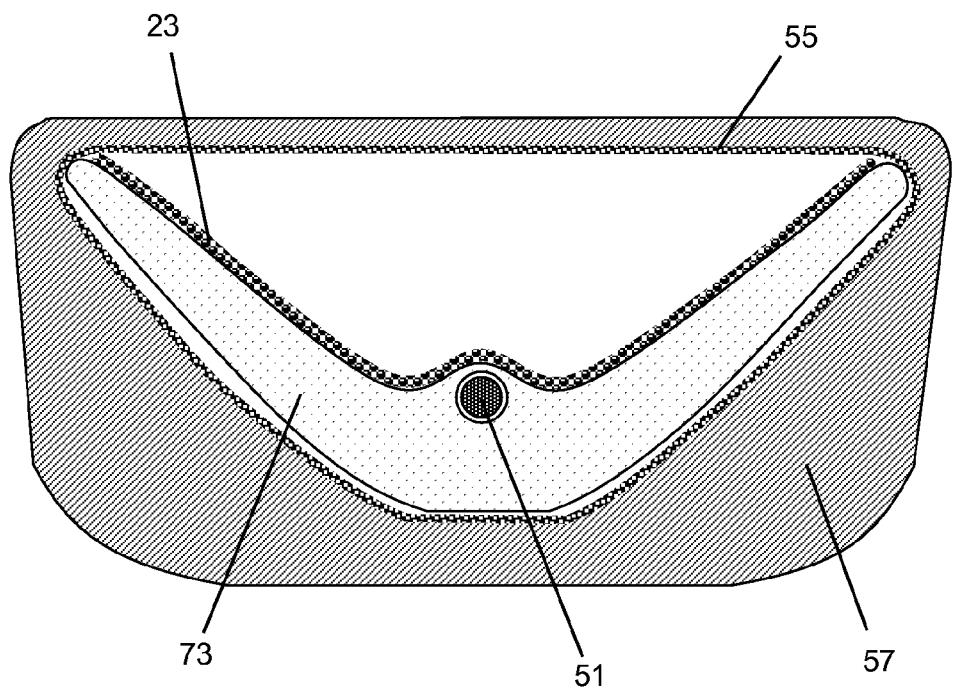
FIG. 51 schematically shows a wing shaped phosphor coated fiber containing a wire electrode inserted into a tube.

FIG. 51 shows a winged-shaped fiber 73 containing a wire address electrode 51 and a phosphor coating 23 with a much smaller amount of glass in the base. The phosphor 23 coated fiber 73 is drawn into a plasma tube 57 with a rounded bottom and thicker side walls to increase the strength of the tube 57. Other different shaped phosphor 23 coated fibers 73 with wire electrodes 51 may alternatively be drawn into the plasma tubes 57 to form a tubular plasma display.

Figure 52:
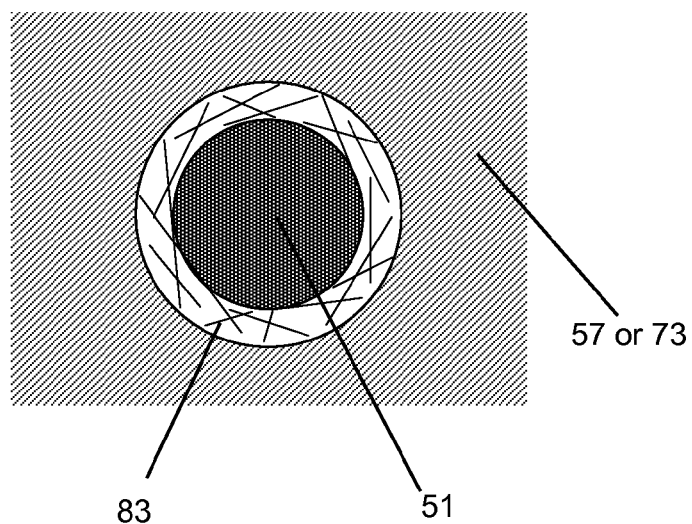
FIG. 52 schematically shows a cross-section of a wire electrode in a glass fiber or tube with a conductive media around the wire to remove the capacitive drop between the wire electrode and the inner surface of the glass fiber or tube.

FIG. 52 shows a method of removing any voltage drop between the wire electrode 51 and the glass fiber 73 or tube 57 by coating the wire before or during the draw with a conductive coating 83. The wire electrode 51 is usually drawn taut into the fiber 73 or tube 57, therefore the electrode 51 tends to wander from one surface to the next within the glass tunnel in the fiber 73 or tube 57. This slight air gap will have an effect on the firing or addressing of the plasma along the length of the tube 57 or from tube to tube. To eliminate this air gap, the wire 51 may be coated with carbon nanotubes 83 to keep the wire 51 electrically tight to the glass walls, thus eliminating the capacitive air gap. The conductive coating or filler 83 may be composed of nanotubes, nanorods or other conductive particles. If the conductive filler 83 is composed of metal particles, they may be a lower melting point metal that melts during the draw process to remove any air gaps between the wire 51 and the glass tunnel walls.

Figure 53:
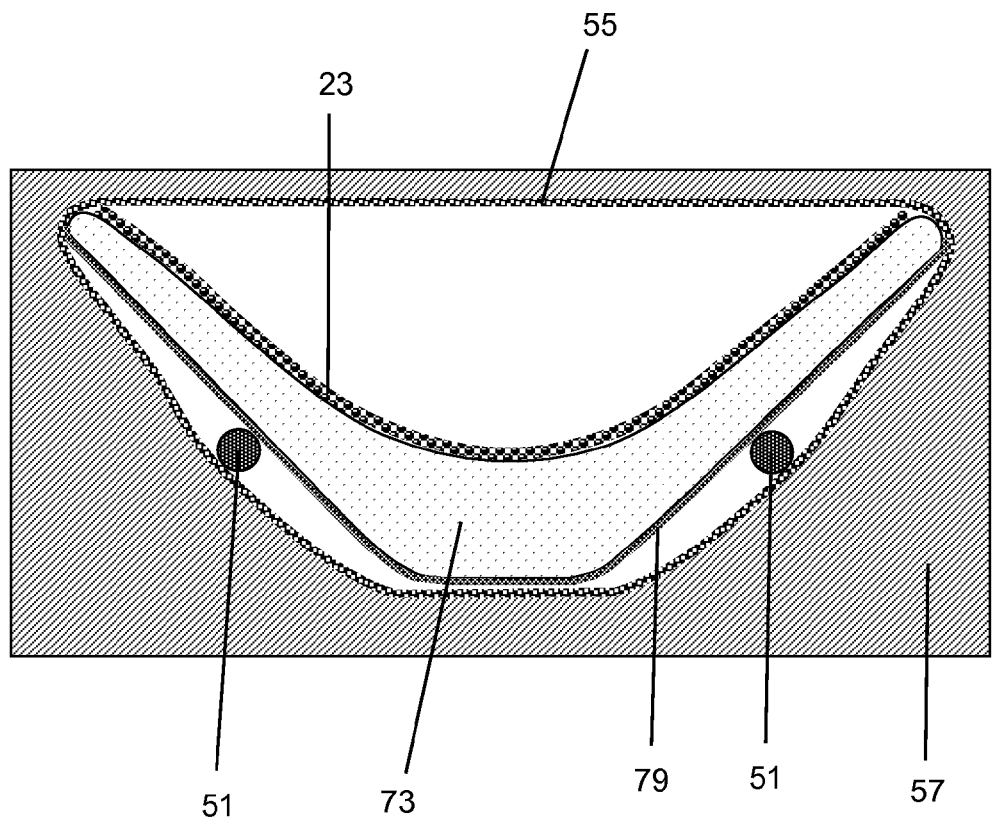
FIG. 53 schematically shows a phosphor coated fiber containing a conductive coating on the bottom surface and a wire electrode inserted into a tube where the wire electrode makes electrical contact with the conductive coating.

FIG. 53 shows another example of using a phosphor 23 coated fiber 73 inside a plasma tube 57. In this example, the phosphor 23 coated fiber 73 has a conductive coating 79 on the back side of the fiber 73. A wire electrode 51 is drawn into the plasma tube 57 and makes contact with the metal coating 79. Therefore, the wire is used to carry the bulk of the current along the length of the tube and the conductive coating 79 is used to spread the voltage around the bottom of the phosphor 23 coated fiber 73. Applying a metal coating 79 to the bottom of the fiber 73 allows for a uniform addressing voltage to be applied along the entire length of the plasma tube 57. If the metal coating 79 is reflective, then it will reflect the phosphor 23 generated light escaping out of the bottom of the tube back toward the viewer. If the conductive coating 79 has a relatively high electrical conductivity then the wire electrode 51 will not have to be in constant contact with the coating 79 along the entire length of the fiber 73.

Figure 54:
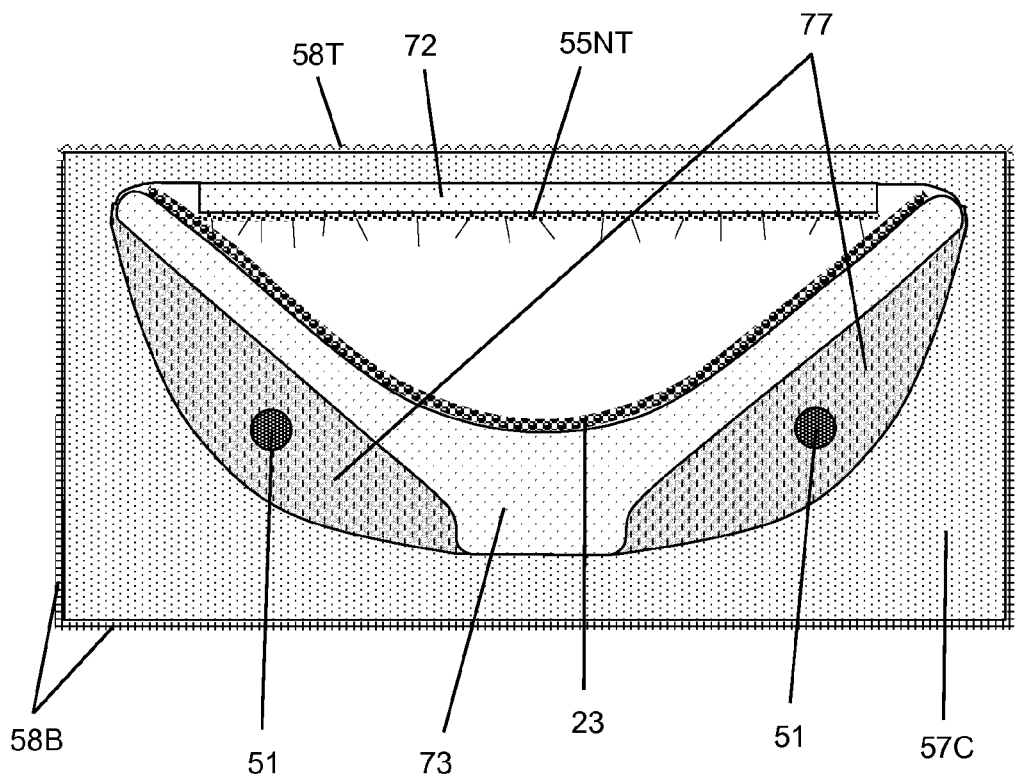
FIG. 54 schematically shows a phosphor coated fiber and wire electrodes inserted into a tube where the wire electrodes are surrounded by a sea of conductive particles which make electrical connection to the wire electrodes and remove the capacitive void between the wire electrode and the bottom of the phosphor coated fiber.

FIG. 54 shows another method of using a phosphor 23 coated fiber 73 inside a plasma tube 57. In this example, wire electrodes 51 are surrounded by a sea of conductive particles 77 and placed between the bottom of the phosphor 23 coated fiber 73 and the plasma tube 57C. The sea of conductive particles 77 makes electrical contact with the wire electrode 51 and spreads the potential from the wire 51 to the bottom surface of the fiber 73. The sea of conductive particles 77 may also have or be composed of a getter material to help keep the plasma gas clean during the lifetime of the display. A second fiber 72 may also be drawn into the tube that houses the hard emissive coating 55NT. In one embodiment, this hard emissive coating 55NT is a MgO coating with nanotubes. FIG. 54 also shows the plasma tube 57C composed of a color glass and containing color filter films 58 as discussed above.

Figure 55:
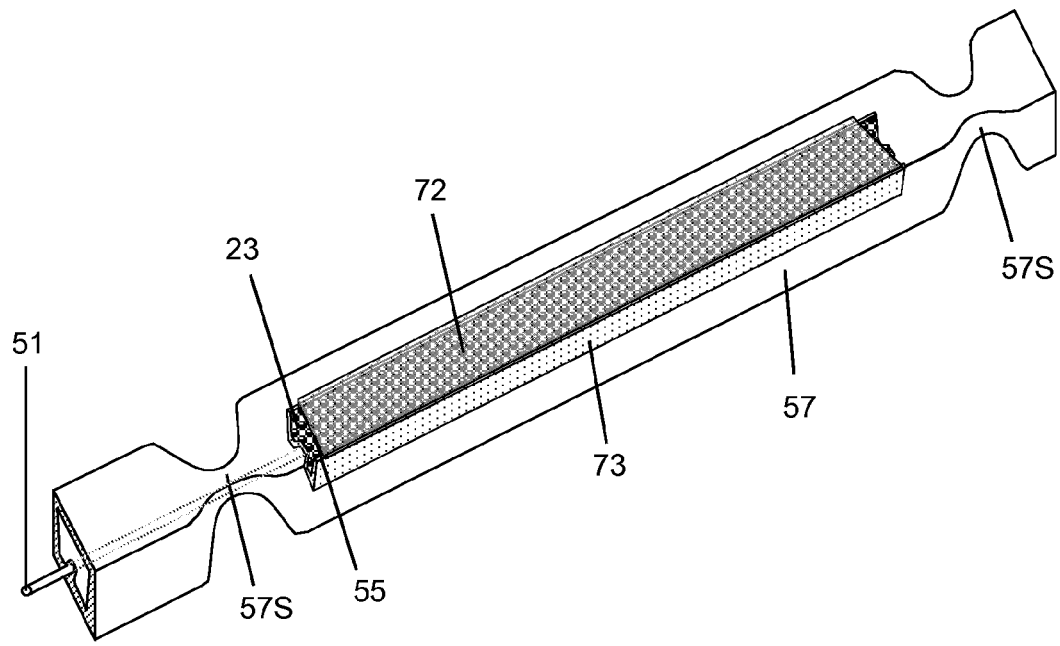
FIG. 55 schematically shows a phosphor coated fiber and a MgO coated fiber placed inside a tube such that the fibers are located within the seals.

FIG. 55 shows an example where both the phosphor 23 coated fiber 73 and the MgO 55 coated fiber 72 may be placed inside the plasma tube 57 between the vacuum tight seals 57S. Placing all the coatings and additional fibers inside the tube seals 57S provides for a much higher yield when gas processing and sealing 57S the tubes. If the wire electrode 51 is contained in the tube 57, and not the fiber 73, then the vacuum seal 57S is preferably a simple glass seal.

Figure 56:
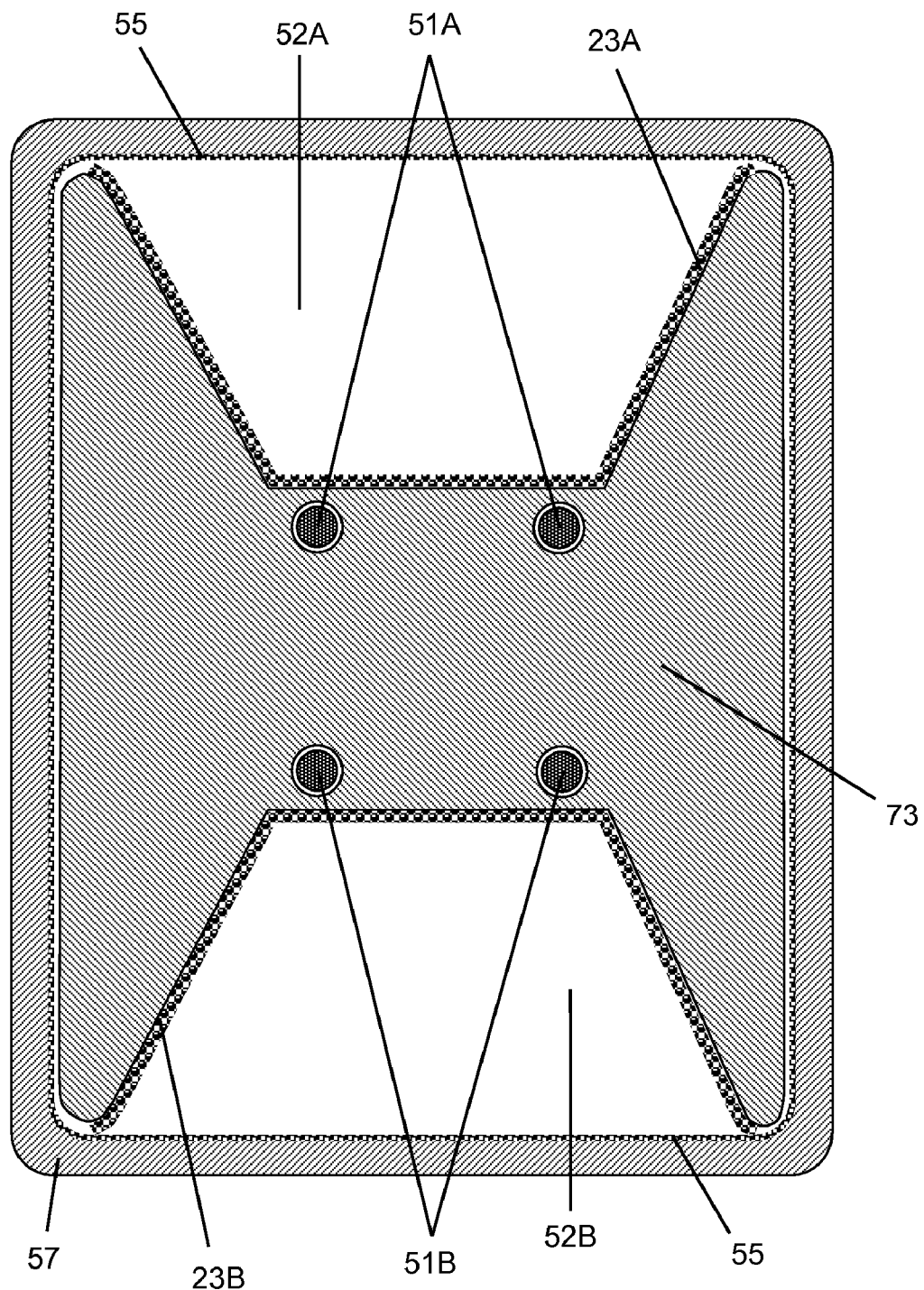
FIG. 56 schematically shows a fiber containing two plasma channels with phosphor coatings and wire address electrodes located at the bottom of the plasma channels inserted into a tube to create a double-sided tubular plasma display.
Figure 57:
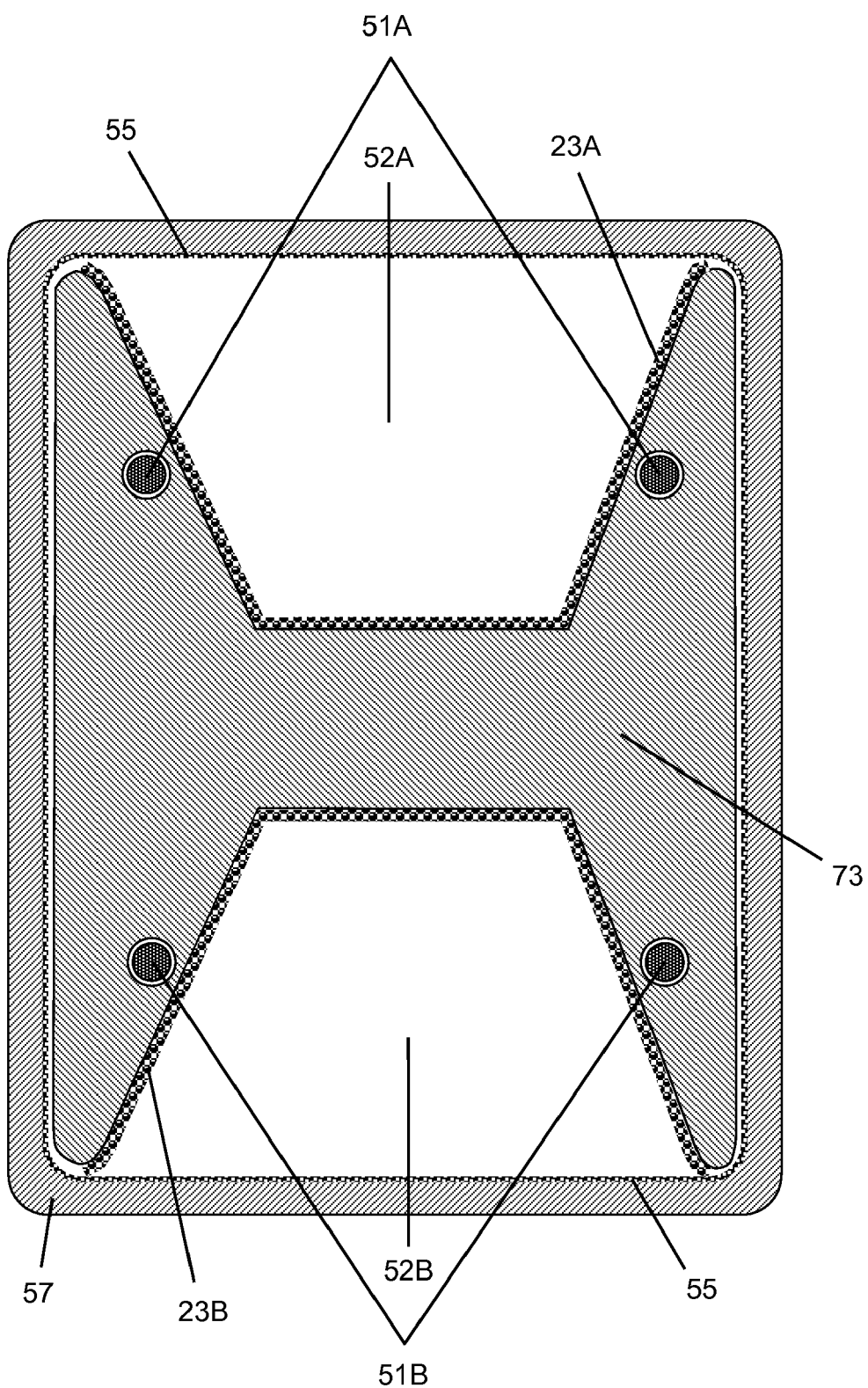
FIG. 57 schematically shows a fiber containing two plasma channels with phosphor coatings and wire address electrodes in the walls of the fiber inserted into a tube to create a double-sided display.

FIG. 56 shows an example of adding a fiber 73 inside a tube 57, where the fiber 73 has plasma channels 52 on opposite sides. This fiber 73 in tube 57 structure may be used to create a double-sided tubular plasma display by placing electroded sheets on both sides of the tube array 57. A plasma may be addressed and sustained in the plasma cell region 52A using the wire address electrodes 51A, and a second plasma may be addressed and sustained in the plasma cell region 52B using wire address electrodes 51B. The fiber 73 has to be absorbing or reflecting in order to keep the light generated from the phosphor coating 23A on one side from interfering with the image on the other side of the plasma tube 57 and vice versa. To lower the address voltage, the wire address electrodes 51 may be placed up in the legs of the fiber 73 to be closer to the addressing surface, as shown in FIG. 57, assuming that the tubes 57 are used in a surface discharge type plasma display. Many different structures and displays can be formed using tubes, fibers, and electroded sheets and several of these examples are explained in U.S. patent application Ser. No. 11/365,157 "Double-Sided Fiber-Based Displays", filed Mar. 1, 2006 and herein incorporated by reference.

Figure 58A:
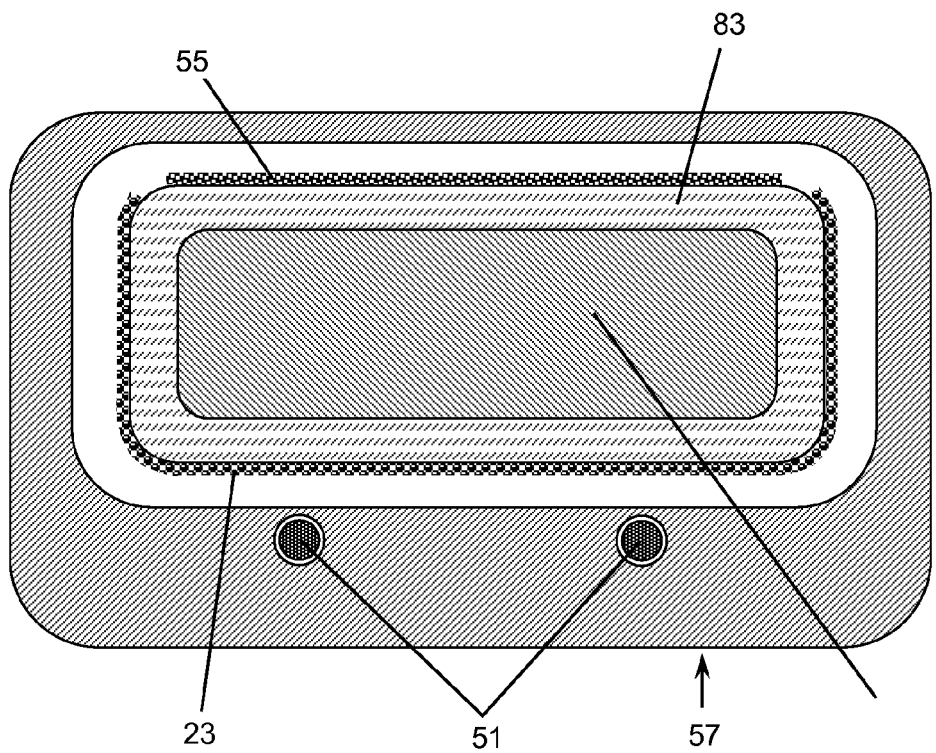
FIG. 58*a* schematically represents inserting a phosphor and an MgO coated setter with release coating inside a wire containing plasma tube.
Figure 58B:
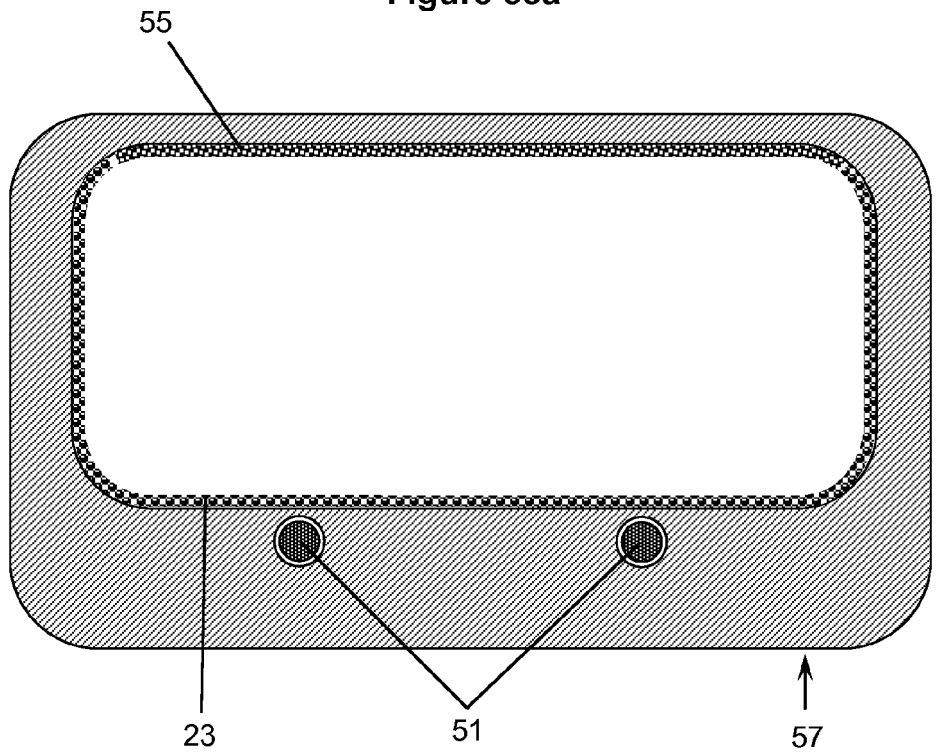
FIG. 58*b* shows the resulting MgO and phosphor coatings on the inner tube wall surfaces after the coating are released and the setter is removed from FIG. 58*a*.
Figure 59A:
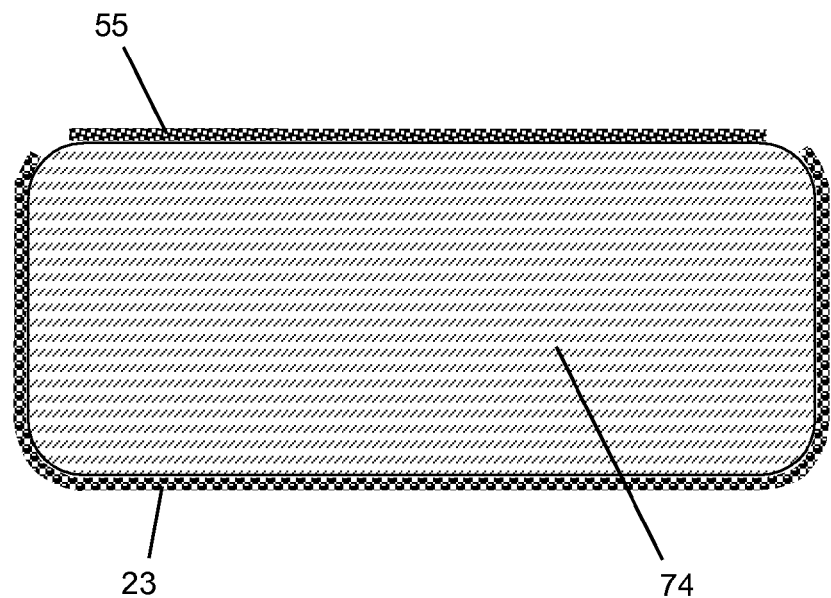
FIG. 59*a* schematically shows a cross-section of a polymer fiber coated with an emissive coating and a phosphor layer.
Figure 59B:
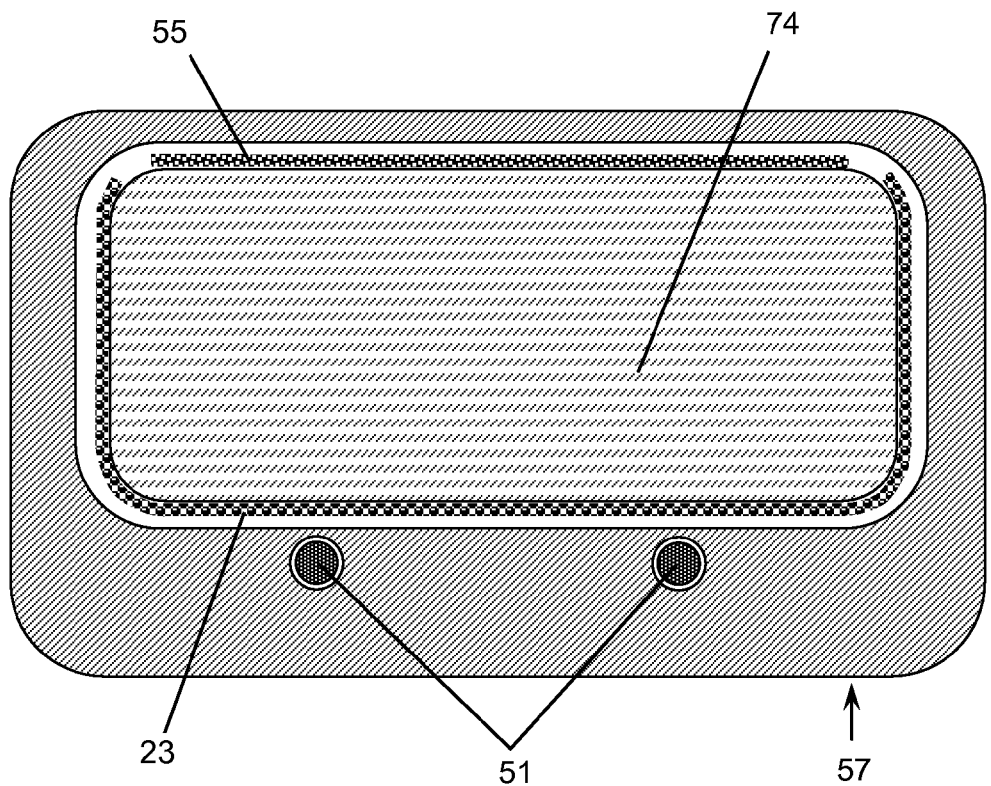
FIG. 59*b* schematically shows a cross-section of the coated polymer fiber in FIG. 59*a* inserted into a plasma tube such that the coatings can be transferred.

FIG. 58 shows a phosphor 23 and a hard emissive 55 coated fiber 71 used as delivery setters to coat the inside surface of the plasma tube 57 walls. FIG. 58a shows a fiber 71 coated with a release layer 83 that is coated on one side with a MgO layer 55 and a phosphor layer 23 on the other three sides inserted into a plasma tube 57 containing wire electrodes 51. If the release layer 83 is thermally activated then by simply increasing the temperature the release layer 83 transfers the MgO 55 and phosphor layer 23 to the tube 57 walls, as shown in FIG. 58b. After the transfer of the coating, the fiber setter 71 may be pulled out of the plasma tube 57. A similarly coated tube 57 is achieved where the fiber setter 74 is completely composed of release material, as shown in FIG. 59a. Drawing or inserting this coated release fiber 74 into the plasma tube 57, FIG. 59b, and increasing the temperature creates a coated tube 57 similar to that shown in FIG. 58a without having to manually remove a hard fiber core.

One important part of the tube 57 structure is the flatness and uniformity of the surface of the tube that is fused against the electroded sheet. Firing and addressing the plasma on a flat surface provides a much more uniform voltage along the length of the tube and across the panel. A flat tube 57 surface creates a uniform distance between the wire sustain electrodes in the electroded sheet and the plasma generation region inside the tubes 57. A flat tube surface also provides a better contact area between the tube and the electroded sheet. If the plasma tubes are used in a plasma-addressed electrooptic display, like a plasma-addressed liquid crystal display, then it is imperative to control the flatness of the tube surface. The figures discussed below explain a method of adding additional material to the sides of the plasma tubes to pull the thin surface of the plasma tube flat during the tube draw process.

Figure 61A:
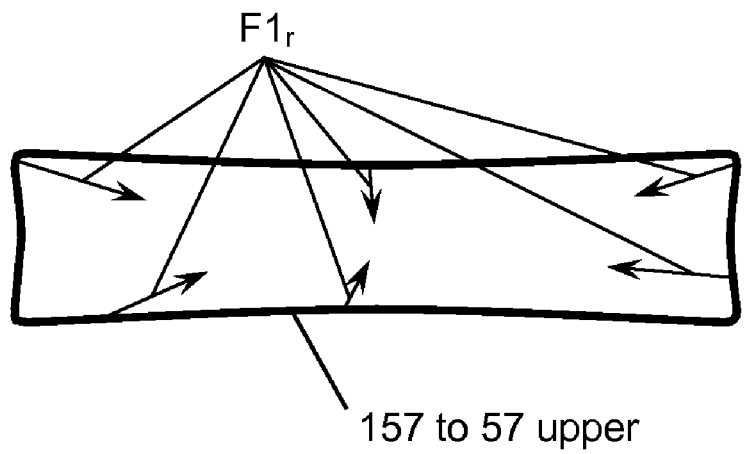
FIG. 61*a* schematically shows the shape and forces exerted on a rectangular tube preform as it is being drawn down while in a location above the point of inflection as shown in FIG. 57.
Figure 61B:
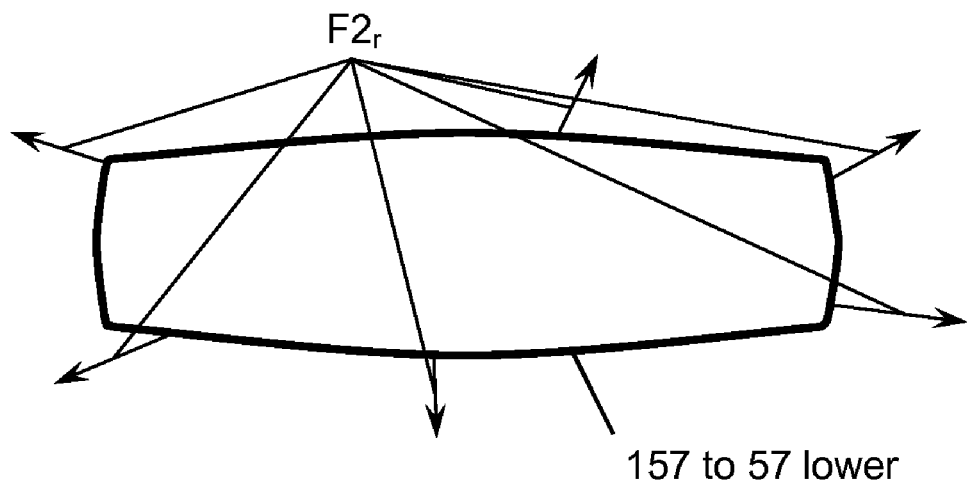
FIG. 61*b* schematically shows the shape and forces exerted on a rectangular tube preform as it is being drawn down while in a location below the point of inflection as shown in FIG. 60.

FIG. 60 represents the root of a tube draw or the area that is heated or the area where the preform 157 gets reduced in size or necked down to the size of the tube 57. A relatively constant force is applied to the tube 57 during the tube draw process to continually pull tube 57 from the preform 157. This draw force creates different forces F1 and F2 throughout the root of the tube draw. Above the point of inflection, POI, (the point where the tubes curvature goes from concave to convex) (157 to 57 upper) the downward tube draw force F1 has a component of the draw force toward the centerline of the root. Below the POI (157 to 57 lower) the downward tube draw force F2 has a component of the draw force away from the centerline of the root. The radial effects of these forces F1 and F2 is depicted in FIGS. 61*a* and 61*b* for the drawing of a standard thin walled rectangular tube preform. FIG. 61*a* is a cross-section of the rectangular tube at a point above the POI (157 to 57 upper) showing that a radial component F$1_r$ exists on the tube forcing the walls of the tube inward or toward the center of mass of the tube. Moving down the root past the POI (157 to 57 lower), the draw force F2 exerts an outward radial component F$2_r$ on the tube away from the center of mass of the tube, as shown in FIG. 61*b*. This outward force tends to bow the tube out leading to a more circular shape in the drawn tube 57. A small negative pressure may be added to the center of the tube during the tube draw process to hold the rectangular shape of the tube; however it is virtually impossible to keep tight control of the flatness of the tube walls using a vacuum.

Figure 62A:
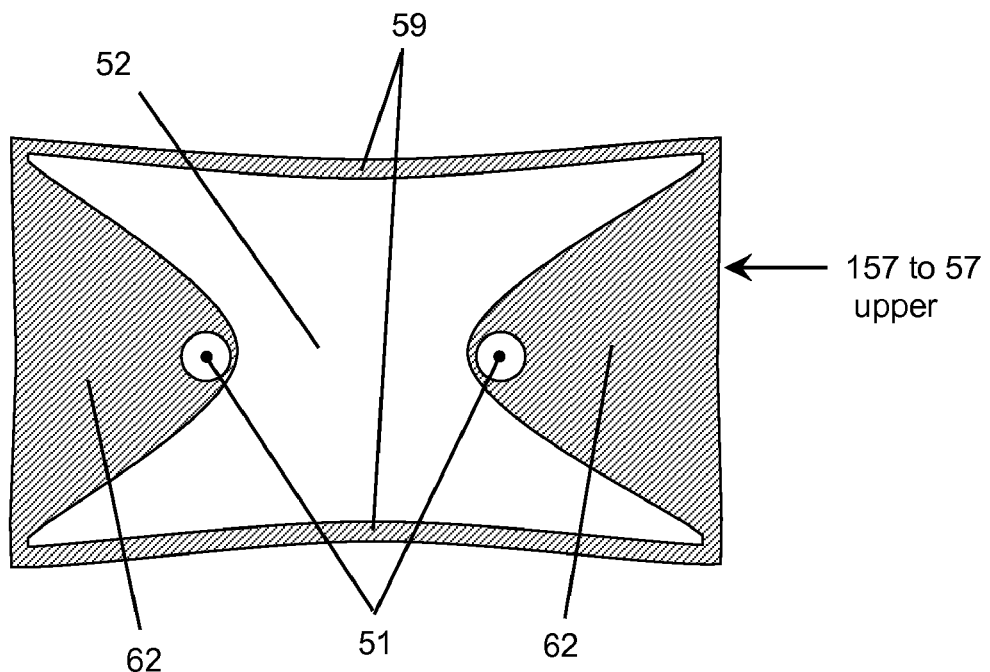
FIG. 62*a* schematically shows the shape of a rectangular tube preform with extra glass on the sides of the tube as it is being drawn down while in a location above the point of inflection as shown in FIG. 60.
Figure 62B:
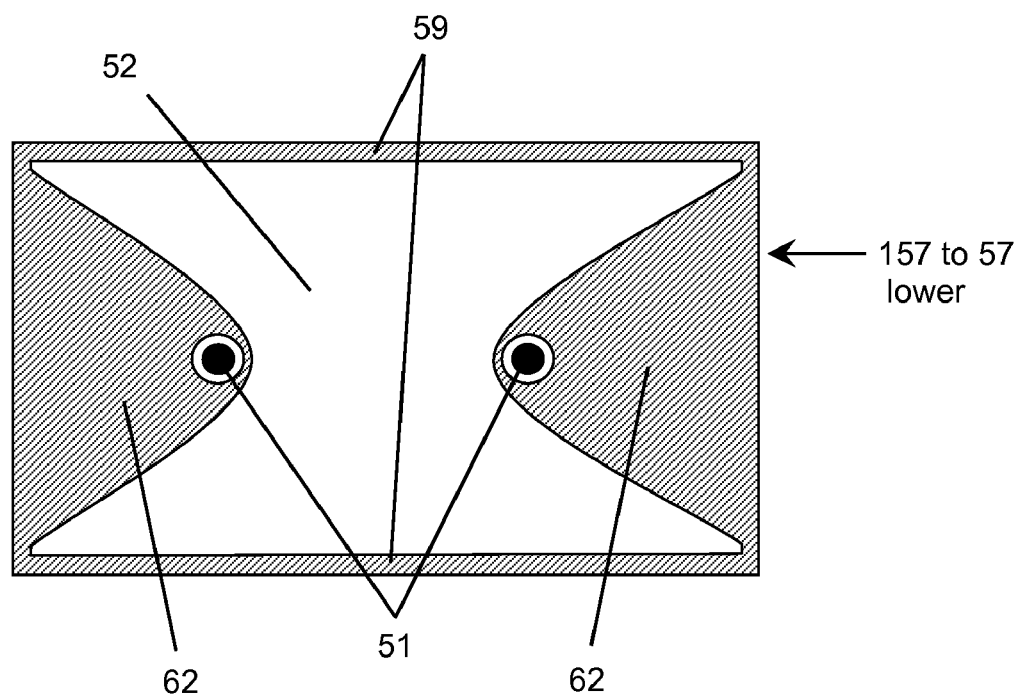
FIG. 62*b* schematically shows the shape of a rectangular tube preform where the extra glass on the sides of the tube is pulling the adjacent faces very flat as it is being drawn down while in a location below the point of inflection as shown in FIG. 60.

FIG. 62 shows a method of adding a larger volume of glass to the sides 62 of the tube 57 than the top and bottom 59 walls to pull the surface of the top and bottom 59 walls flat during the fiber/tube draw process. These large volume sides 62 may also be a stiffer glass or one with a lower viscosity than the thin glass tube walls 59. FIG. 62*a* shows the top and bottom 59 walls getting pulled in above the POI (157 to 57 upper) where the thicker sides 62 do not change much in shape. The larger glass volume 62 creates a stiffer tube section because of both the larger amount of glass that has to be deformed by the small radial draw force F1 and the fact that the root is being fed into the hot zone and the thicker sections 62 take longer to come up to temperature, therefore, will be at a higher viscosity and will be stiffer. Drawing tube 57 in the tube draw process at the lower temperature range results in a higher draw force because the glass is stiffer or at a higher viscosity. The thicker sides 62 are stiffer than the thin top and bottom 59 walls and below the POI (157 to 57 lower) a larger amount of the draw force F2 is placed on the stiffer thicker sides 62. These stiffer sides 62 will exert an outward force on the thin top and bottom sections 59 and pull them flat. To achieve flat top and bottom walls 59, the draw forces should preferably stay above about approximately one quarter pound for a 1 mm wide tube.

Figure 63A:
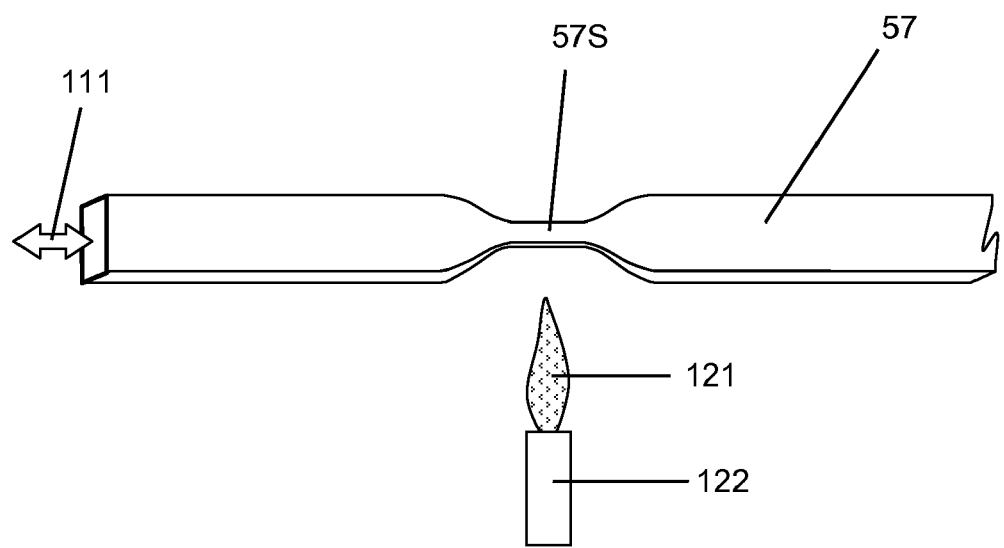
FIG. 63*a* shows a plasma tube being sealed closed using a gas flame.
Figure 63B:
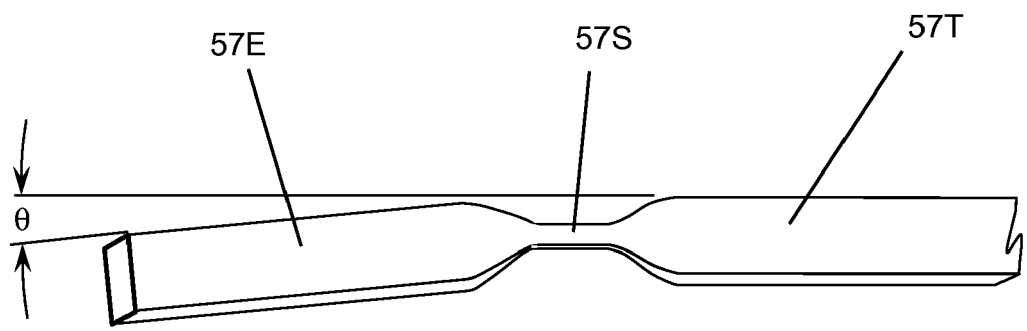
FIG. 63*b* shows a plasma tube that has been sealed where there is a bend in the seal area.
Figure 64:
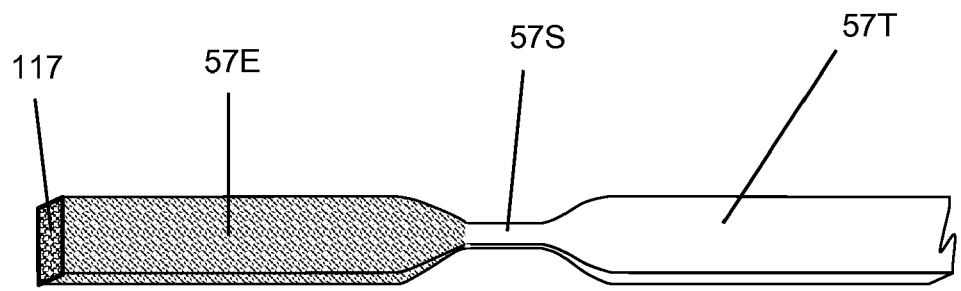
FIG. 64 shows a plasma tube where the end to the tube is back filled with a polymer or silicone solution to strengthen the end of the tube.

In order to create a rollable tubular plasma display, each tube has to be individually sealed. The gas processing step is shown in FIG. 63*a* where the tube 57 is evacuated and back-filled 111 with the plasma gas mixture. The tube 57 is then sealed 57S closed using a flame 121 from a torch 122. Other heat sources that could be used to seal the tubes closed 57S include, but are not limited to, a hot bar or hot rod. One very important part of the tube sealing process step is to create a very straight tube seal 57S. Angles θ as small as 3 degrees between the tube 57T and the end 57E (FIG. 63*b*) may cause some tube seals 57S to crack and break during the assembly process step and rolling the tubular plasma display. Therefore, it is important to create very straight tube seals 57S with minimal twist. FIG. 64 shows that the ends of the tubes 57E may be filled with a polymer material 117 to strengthen the ends. Filling the tube ends 57E also minimizes the number of particulates when the tubes 57 are cut or broken. The area around the tube seal may also be coated with a layer to strengthen the seal after the seal is formed. This tube seal strengthening material is applied to the seal area after the seal is formed. It is desired that the strengthening material is placed under tension so the seal glass area is under compression, since glass is strongest under compression. The tube strengthening material can be a hard polymer material, like epoxy, or a silicone material that sets up to form a compression seal.

Figure 65:
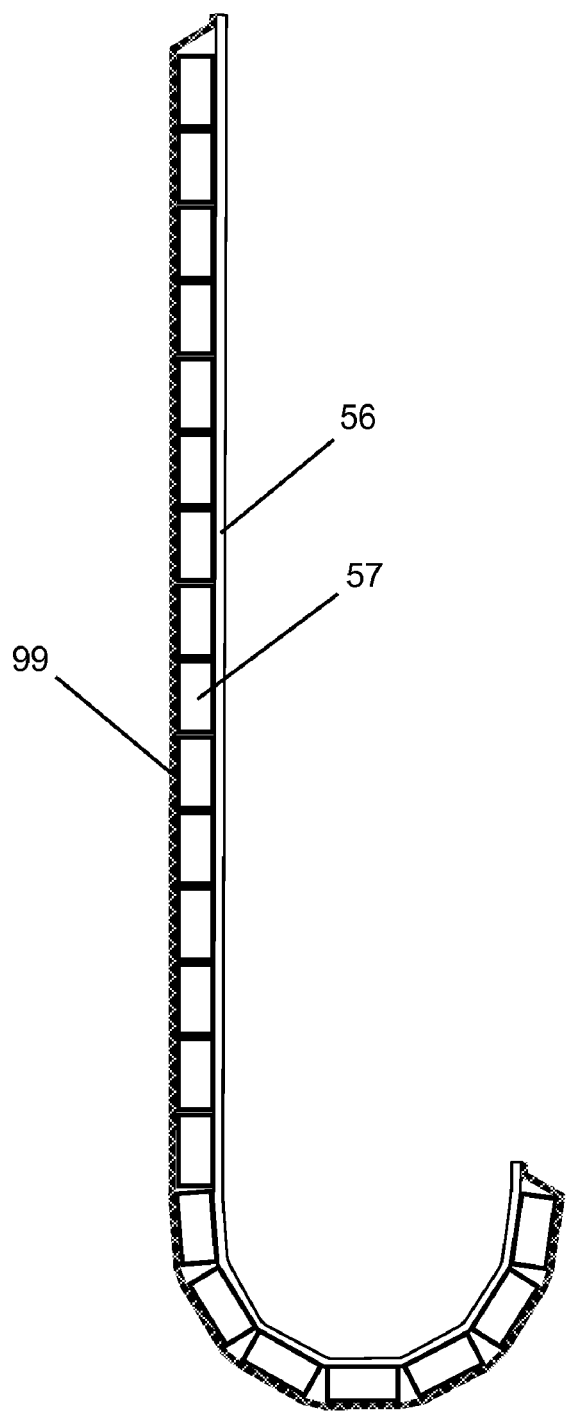
FIG. 65 shows a tube array connected to an electroded sheet with a film on the back side of the tube array to help protect the tubes.

FIG. 65 shows a second, stretchy rubbery sheet 99 that may added to the back of the tube array 57 that is attached to the electroded sheet 56. The second, stretchy rubbery sheet 99 protects the tubes 57 from any particles getting between the tubes causing them 57 to break when rolling and unrolling. The stretchy sheet 99 helps unroll the tubular plasma display because the sheet 99 gets stretched when it is rolled up and wants to unroll the tubular plasma display. The stretchy rubbery sheet 99 may be formed from an organic polymer material or an inorganic silicone material. The area around the tubes may be filled with a liquid to help: a) remove any reflection if view from the tube side, b) remove any heat from the tubes, or c) lower the frictional forces when rolling and unrolling. The liquid may be a clear, colored or dark fluid and may be water-based with an antifreeze solution to keep it from freezing or can be a polymer-based fluid or silicone oil.

The back side of the tubes may also be coated with a film 57B to reduce the adhesion of particles to the tube surface. The film 57B may be a surface modification film made from a carbon-based solution or a silicone film. The surface modification film also forms a slippery surface that prevents scratching the surface of the tube that form weak sections and cause the tube to crack and also allows the tubes to be rolled and unrolled against each other without scratching them. The surface modification film may also be spongy to cushion the back-side of the tubes.

Figure 66:
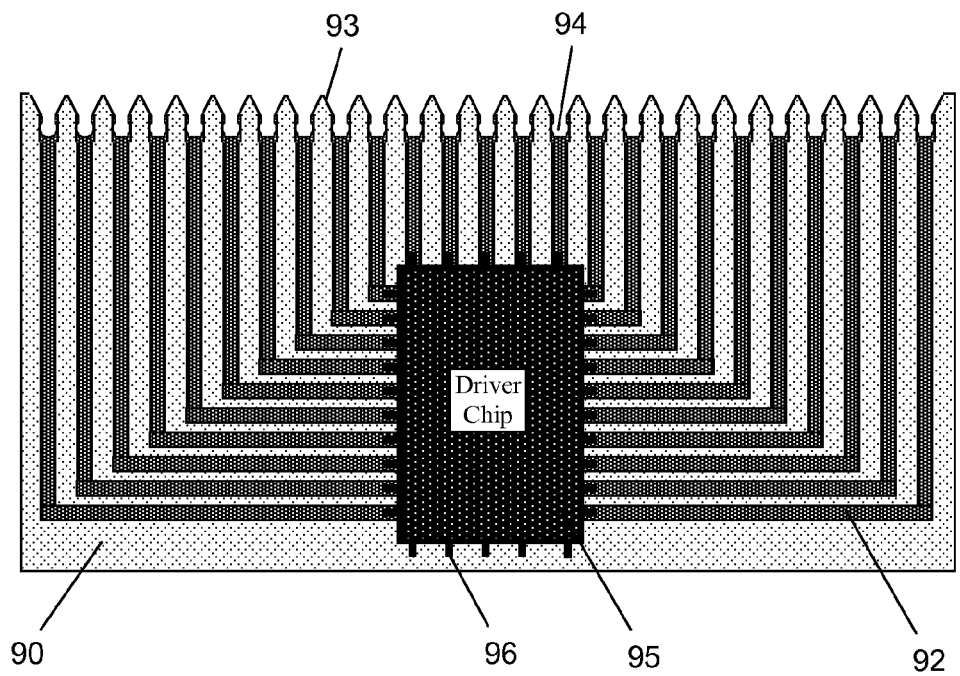
FIG. 66 shows a printed circuit board with driver chips and an edge connector where each output of the driver chip is electrically connected to a recessed plated slot on the side of the circuit board.
Figure 67:
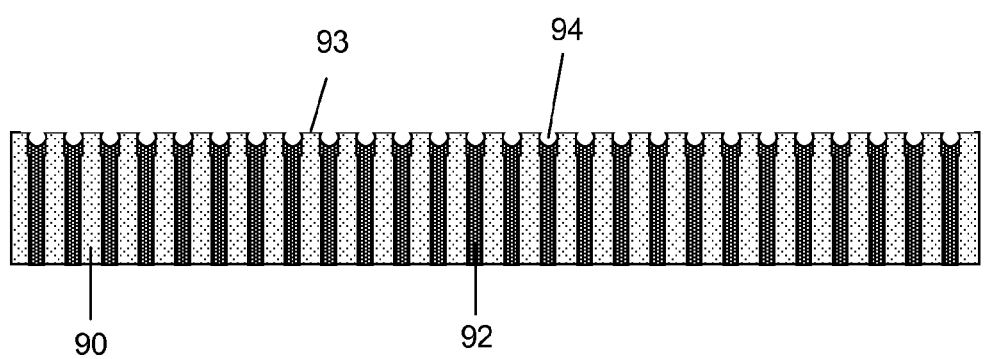
FIG. 67 shows an edge connector formed by an array of plated through holes that have been cut open during the board separation process.

FIG. 66 shows a printed circuit board 90 containing a driver chip 95 where the output leads are attached to traces 92 in the copper layer that extend to plated out slots 94 in the circuit board 90. After the circuit board is fabricated a laser or water-jet is used to cut in and out of the plated through holes 94 to expose them to the edge of the circuit board 90. Opening up the plated through holes 94 to the outside edge provides an easy port to connect and solder the wire electrodes coming from the display. Cutting in and out of the holes creates pointed ends 93 or a comb-like structure to help guide the wire electrodes into the plated slots 94. To lower the cutting cost of creating the edge connector the printed circuit board 90 may be simply cut straight across the top of the plated through holes 94, as shown in FIG. 67.

Figure 68A:
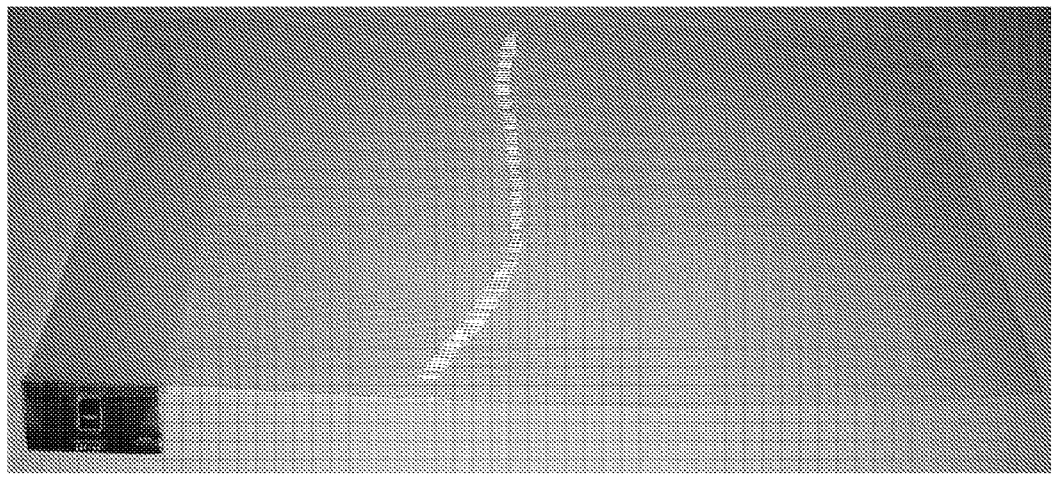
FIG. 68*a* is a photograph of an electroded sheet with the wire electrodes coming out orthogonal to the imbedded wires in the main body of the panel.
Figure 68B:
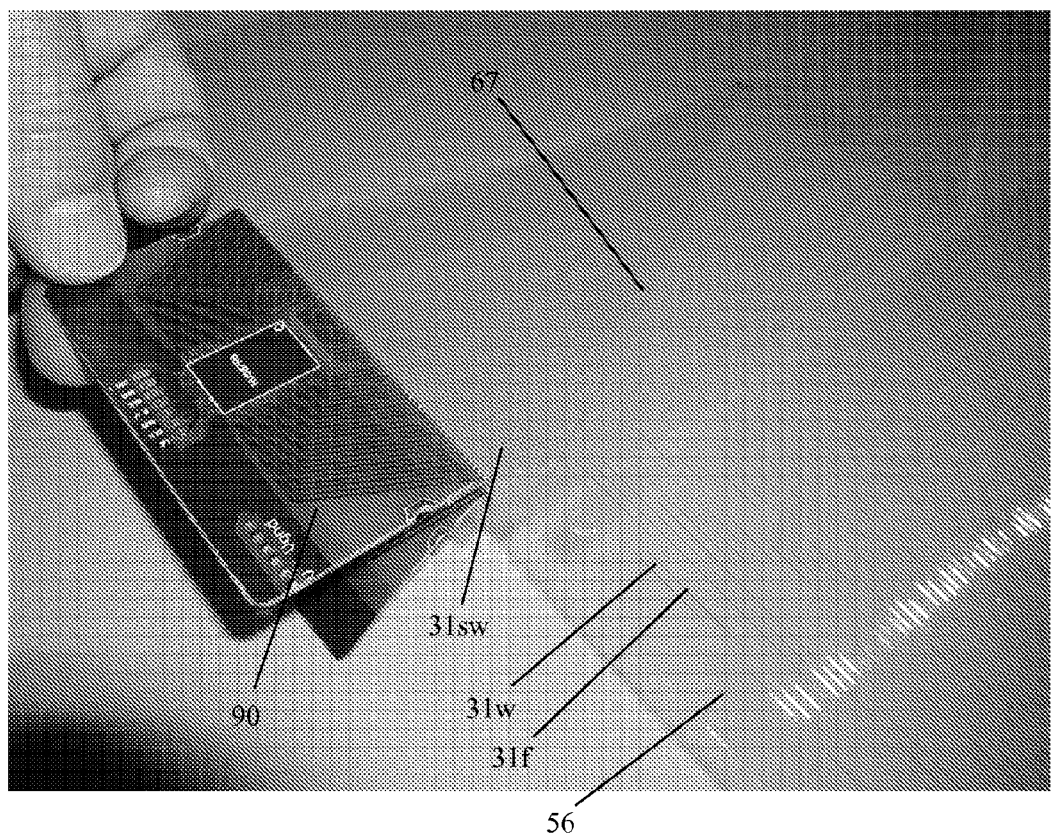
FIG. 68*b* is a close-up image of FIG. 68*a*.

FIG. 68 shows a method of bringing the wire electrodes 31*w* out of the electroded sheet 56 orthogonal to the direction of the imbedded wires 31*w* in the main body of the panel. A locking film 67 is sealed across the imbedded wire electrodes 31*w* at an angle on the edge of the electroded sheet 56. Note that the TCE coating 31*f*, patterned onto the imbedded wire electrodes 31*w*, is preferably masked during deposition such that the end of the electroded sheet 56 is not coated where the locking film 67 is sealed. The imbedded wire electrodes 31*w* are then stripped out of the surface of the polymer film 38 back to the locking film 67 and bent 90 degrees and soldered into a printed circuit board 90 on the edge of the electroded sheet 56. Assuming that the driver chip on the printed circuit board 90 has 64 outputs (like most standard chips), once 64 wire electrodes 31*sw* are stripped, bent and soldered a second locking film 67 is placed over the stripped wires 31*sw* to electrically isolate them from the surface. A third locking film 67 is placed at an angle across the $2^{nd}$ bank of 64 wire electrodes 31*w* and they are stripped back to the locking film 67, bent 90 degrees and soldered into a $2^{nd}$ circuit board 90 stacked on top of the first circuit board 90. The wires 31*w* in the electroded sheet 56 may be stripped, bent and connected to the circuit board 90 in banks of 64 until all the wires 31*w* are brought out of the electroded sheet and connected to circuit boards. Note that the first bank of 64 wire electrodes 31*sw* are covered with n−1 layers of stripped wires 31*sw*, where n is the number of banks of wires 31*w*. To minimize the stiffness of the edge connector, very thin polymer coated 38 PET 30 may be used as the locking layers 67. Also alternating banks of 64 wires 31*w* out both sides of the electroded sheet minimizes the bending force when the display is rolled. The wire electrodes 31*sw* may alternatively be brought out all four corners of the electroded sheet 56, which allows for a solid edge connector on both orthogonal sides to the imbedded wire electrodes 31*w*. Using two electroded sheets 56 with standard edge connected circuit boards 90 sandwiched around the orthogonal wire 31*sw* electroded sheet creates a double sided panel.

Figure 69A:
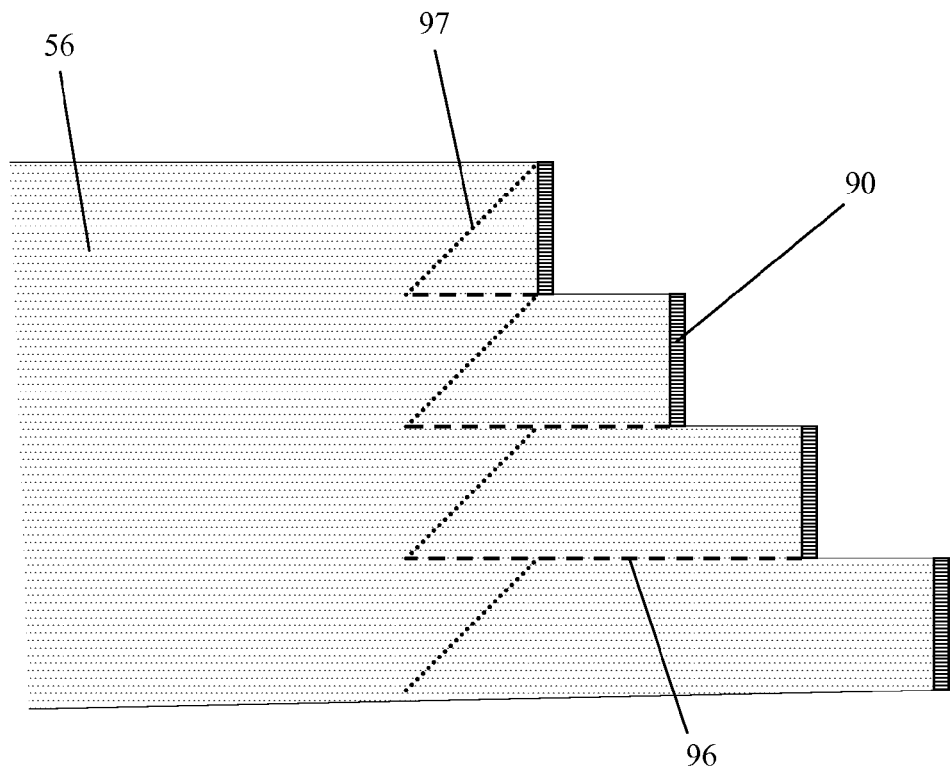
FIG. 69*a* schematically shows an end of an electroded panel with slices and fold lines.
Figure 69B:
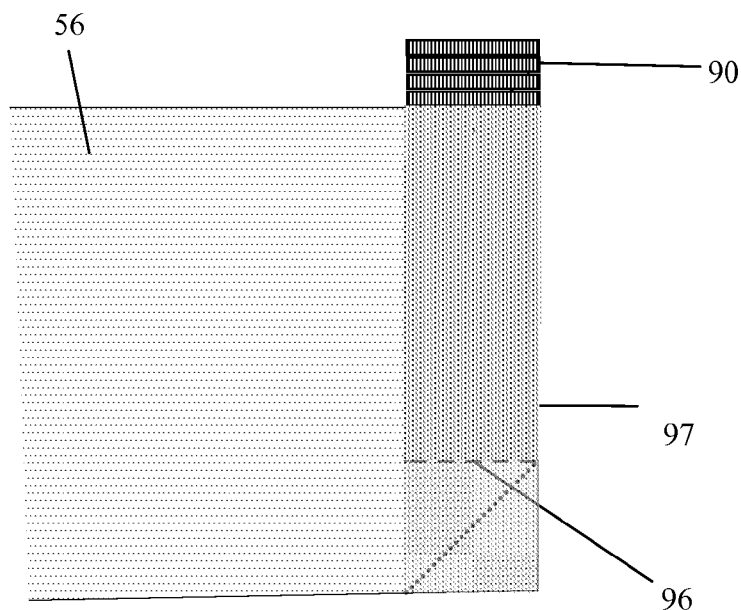
FIG. 69*b* schematically shows the electroded panel in FIG. 69*a* with the end folded such that the wire electrodes are coming out orthogonal to the wires in the main body of the panel.

FIGS. 69*a* and 69*b* show another method of bringing the wire electrodes 31*w* out of the electroded sheet 56 orthogonal to the direction of the imbedded wires 31*w* in the main body of the panel. FIG. 69*a* shows the edge of the electroded sheet 56 with a staggered end in banks with the wire electrodes 31*w* connected to circuit boards 90. The staggered end is coated with a locking film 67 to electrically isolate the wires from the surface and sliced 96 back between the banks to the edge of the locking film 67. Folding each bank at their fold line 97 routes that bank 90 degrees such that the circuit boards 90 are all stacked on one corner of the electroded sheet 56 as shown in FIG. 69*b*.

Figure 70:
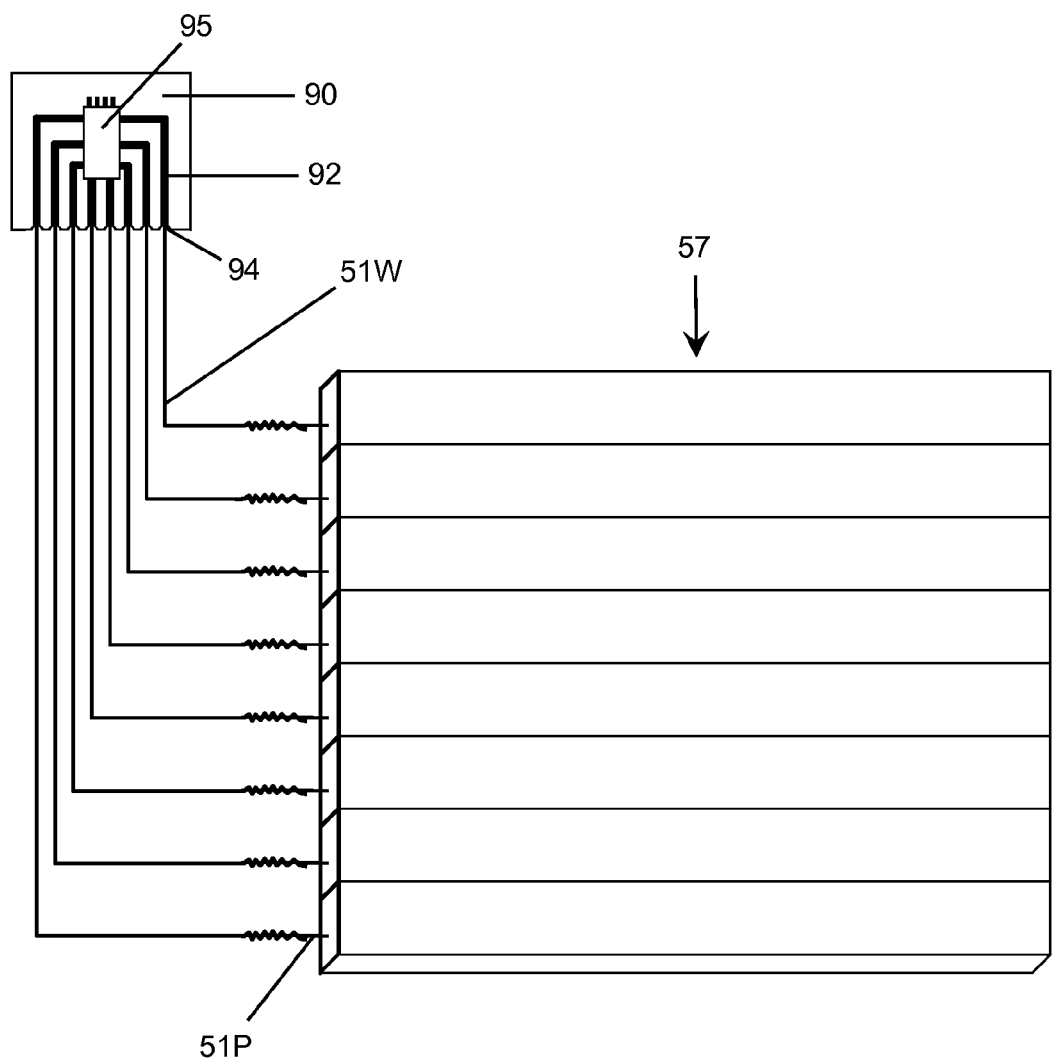
FIG. 70 shows an array of plasma tubes where the wire electrodes are extended out of the array and connected to the electronics at a 90 degree angle to the tube array.

FIG. 70 shows the method of connecting the wire electrodes 51 from the plasma tubes 57 to the circuit board 90 such that the tube array 57 may be rolled. The wire electrodes 51 extend out of the plasma tubes 57 and are bent to a 90 degree angle. The wire electrodes 51 extend up past the top edge of the first plasma tube and are electrically connected to the drive electronics. To keep the wire electrodes 51 separated they may be embedded or sandwiched in a polymer or silicone film. The wire electrodes 51 may also be embedded or attached to the side(s) of the electroded sheet that attaches to the surface of the tube array (not shown). The gas processed plasma tubes 57 may have short wires 51P extending out of the ends of the tube 57 and additional wires 51W may be attached to the wire electrodes 51P to cover the long distances from the ends of the plasma tubes 57 to the circuit board 90. This additional wire 51W may be wire wrapped, crimped, welded or soldered to the wire electrodes 51P in the plasma tubes. The additional wire 51W may have a larger diameter and be of a different material than the wire electrode 51P in the tube array. Therefore, a higher temperature material, such as tungsten, may be used as the wire electrode 51P in the plasma tube 57 and a larger more highly conductive copper wire 51W may be wire wrapped onto the tungsten wire 51P and easily soldered into the printed circuit board 94. The wire electrodes 51 may be alternatively taken out of both sides of the plasma tube array 57 and may also be attached to circuit boards 90 at the top or bottom of the tube array 57. The electroded sheet, which completes the tubular plasma display, is attached to the plasma tube array 57 with the electrodes arrayed orthogonal to the plasma tubes 57. Therefore, the printed circuit board attaching to the wire electrodes in the electroded sheet is at the top or bottom of the tube array 57, allowing for all the electronics to be on one edge, hence creating a rollable panel.

Figure 71:
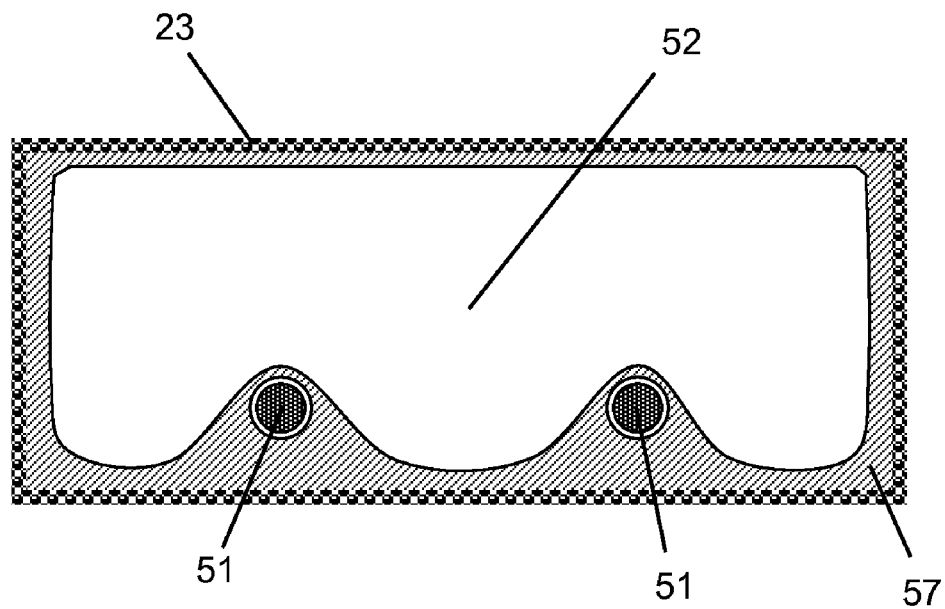
FIG. 71 schematically shows a plasma tube with the phosphor coating on the outside of the tube.

FIG. 71 shows a plasma tube 57 with the phosphor coating 23 on the outside of the plasma tube 57. The inside of the plasma tube 52 still houses the plasma gas and the ultraviolet light generated by the plasma has to transmit through the walls of the plasma tube to the phosphor coating. The advantage of this method is that is much easier to phosphor coat the outside of the tube than the inside. However, the walls of the plasma tube will have to be capable of transmitting the UV light. If xenon based gas is used for the UV generation, then the plasma tube has to be capable of transmitting 147 nm or 183 nm photons. Most low cost, low forming temperature glass compositions are not very transmissive at these high energies.

Figure 72:
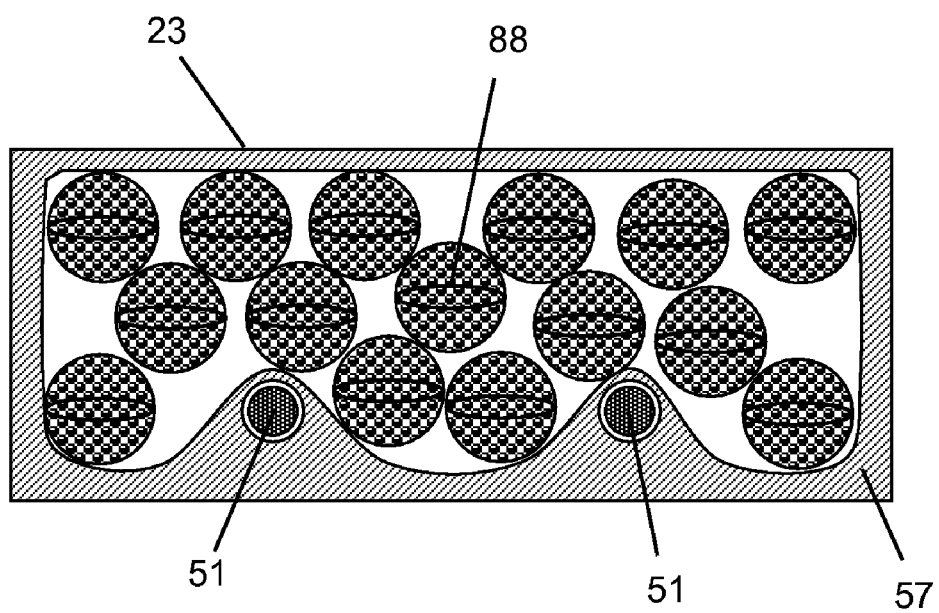
FIG. 72 schematically shows a plasma tube filled with phosphor coated glass plasma spheres.

FIG. 72 shows a tube 57 filled with plasma spheres 88. The plasma spheres 88 are coated with a phosphor layer and filled with a plasma gas. The plasma spheres 88 may be filled with a very pure plasma gas and then coated with a phosphor coating. The plasma spheres 88 may then be placed into the plasma tubes 57. Since the plasma spheres 88 are composed of glass, they are capable of containing their own plasma gas, therefore the plasma tubes 57 do not have to be sealed and they may even be composed of a polymer material. However, in order to get a high transmission of the UV through the walls of the plasma spheres 88 in some embodiments, they need to be composed of a high temperature glass, which traditionally has a high diffusion coefficient. Therefore, to increase the operating lifetime of the spheres 88, it is advantageous to fill the plasma tubes 57 with a similar plasma gas. In one embodiment, plasma tubes 57 with red, green and blue phosphor coated plasma spheres 88 are arrayed and connected to an electroded sheet to form a plasma display.

Figure 73:
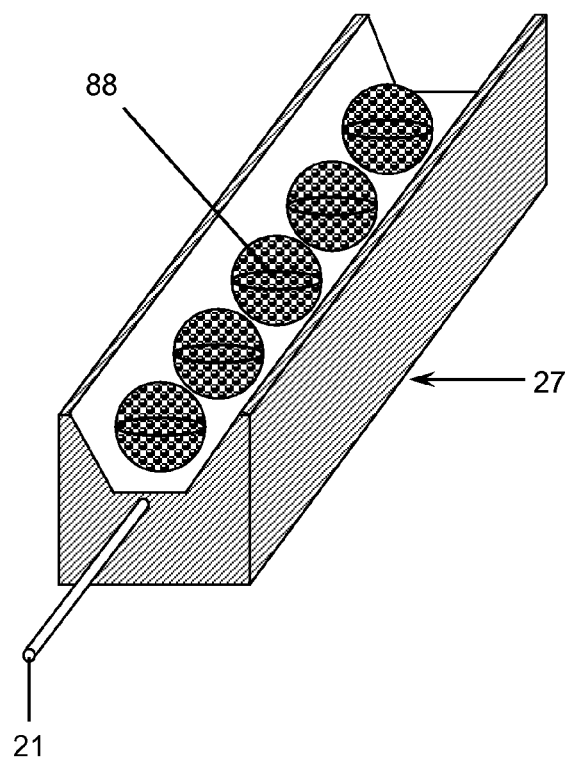
FIG. 73 schematically shows a fiber with phosphor coated glass plasma spheres.

FIG. 73 shows the phosphor coated plasma spheres 88 placed in the channel of a fiber 27. More than one layer of plasma spheres 88 may be placed in the fiber 27 channel if the plasma spheres 88 are much smaller than the fiber 27 channel depth. The fiber 27 containing a wire electrode 21 may be composed of a polymer material and may be sealed to an electroded sheet. The fibers 27 are preferably composed of a colored polymer or glass or have a color coating on the surface matching the color of the phosphor coating on the plasma spheres 88. Therefore, if the viewer is on the fiber 27 side of the panel, the color purity of the light generated from the phosphor coated plasma spheres 88 is enhanced and the bright room contrast is dramatically improved.

Figure 74:
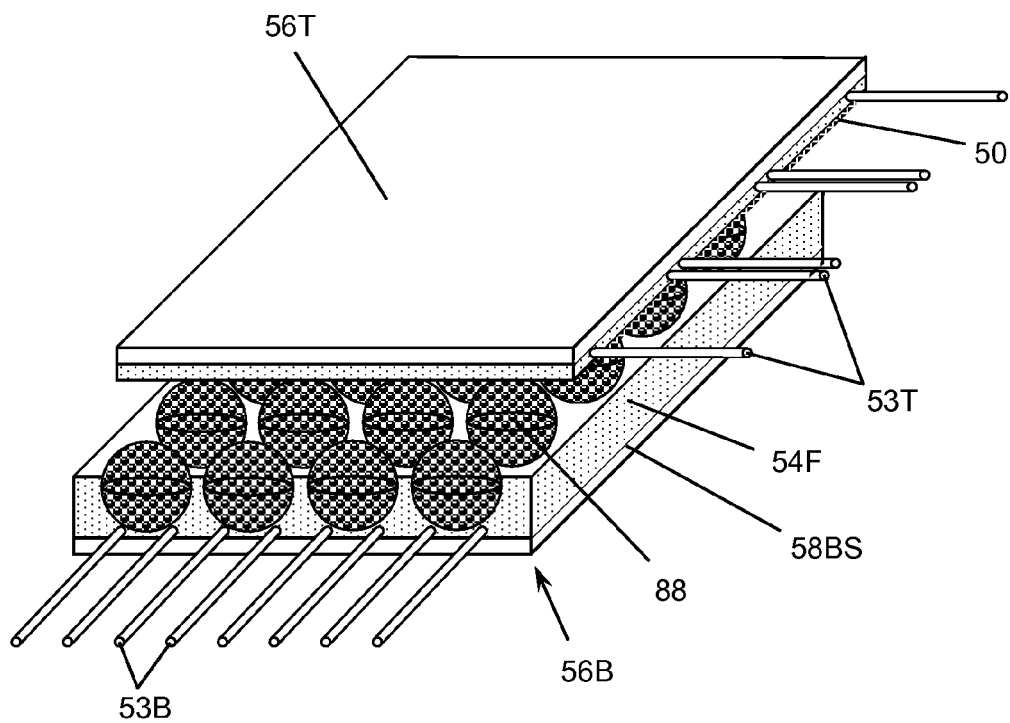
FIG. 74 schematically shows two orthogonal electroded sheets sandwiched around a plane of plasma spheres.

FIG. 74 shows the phosphor coated plasma spheres 88 sandwiched between two orthogonal electroded sheets 56. The top electroded sheet 56T contains wire electrodes 53T connected to a transparent conductive coating 50 to form electrode lines. The bottom electroded sheet 56B is composed of a substrate 54S containing wire electrodes 53B embedded in a thick polymer film 54F. Plasma spheres 88 are also embedded in the thick polymer film 54F. If the plasma spheres 88 have colored phosphor coatings, then they will be aligned to at least one set of wire electrodes 53 in the electroded sheets 56. The plasma spheres 88 may alternatively be mixed in a polymeric binder and placed between two orthogonal electroded sheets 56.

Figure 75:
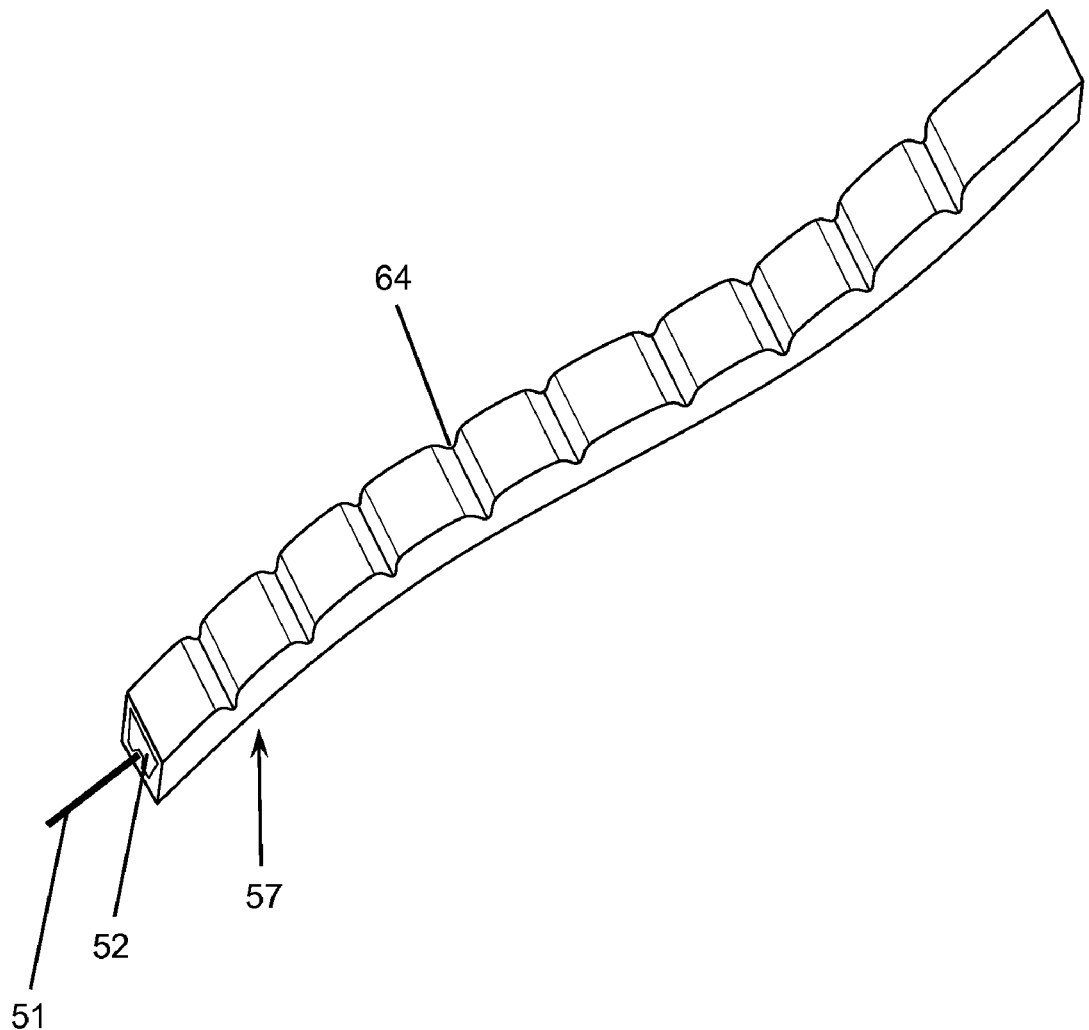
FIG. 75 schematically shows a plasma tube where grooves have been deformed into one of the surfaces.
Figure 76:
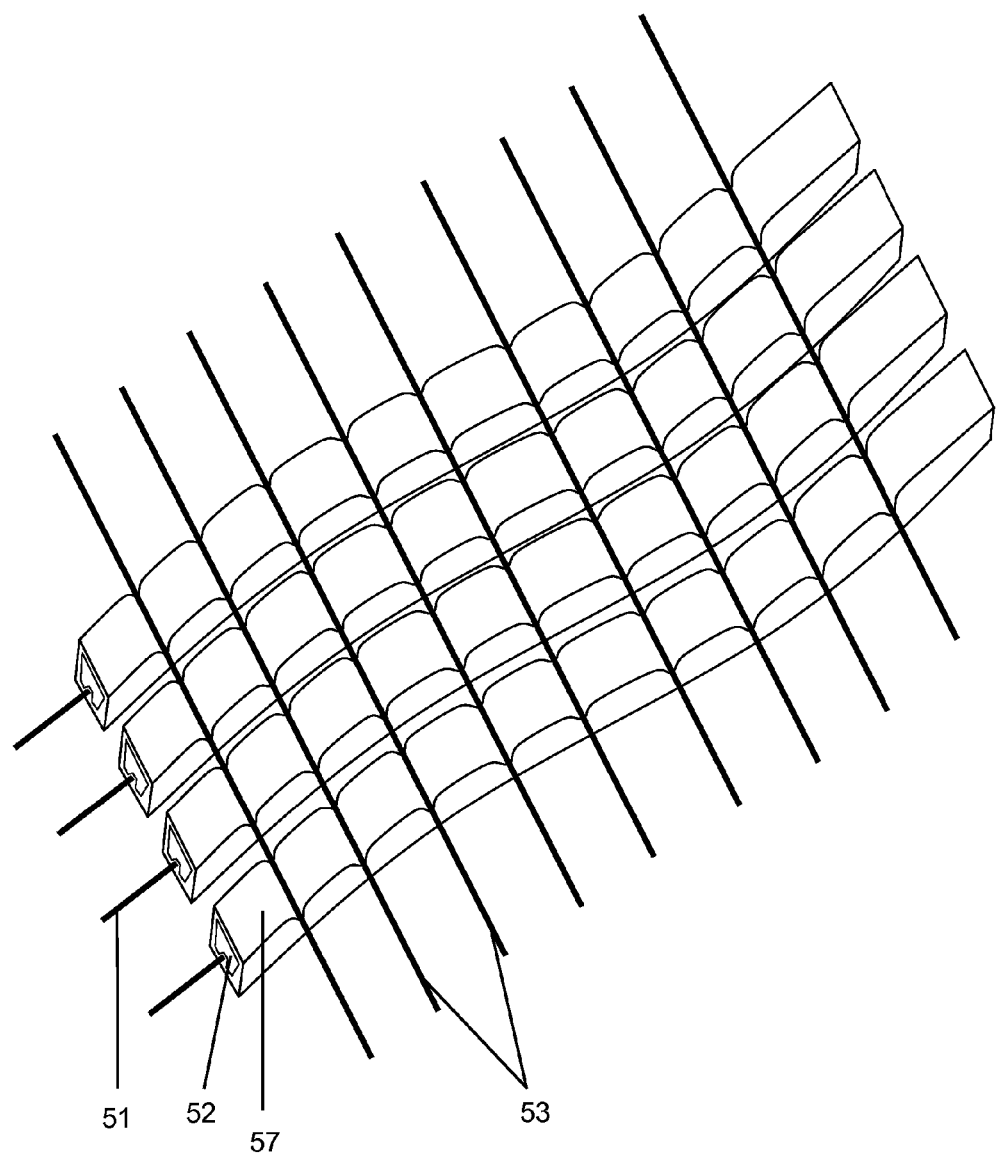
FIG. 76 schematically shows a tubular plasma display composed of an array of plasma tubes with an attached array of wire electrodes, where the wire electrodes are placed in v-grooves pressed into the surface of the plasma tubes.

FIG. 75 shows a plasma tube 57 with grooves 64 embossed into the surface of the tube 57. These grooves 64 can support wire electrodes 53 to form a tubular plasma display, as shown in FIG. 76. Attaching the wire electrodes 53 to the tubes 57 removes the substrate requirement and allows for the fabrication of extremely large plasma displays. The wire electrodes 53 may be coated with a silicone film to enhance there long-term adhesion to the tube surface. Carbon nanotubes may be added to the silicone to reduce the voltage drop between the wires 53 and the tube surface and to spread out the effect of the electric field. Applying a sustaining voltage between adjacent wires 53 in the wire array will create a plasma inside 52 the plasma tubes 57. The electric field generated by applying the voltage on these adjacent wire electrodes 53 will be predominately dropped across the gas, since the wires 53 are located in the grooves 64 below the surface of the tube 57. Dropping the majority of the voltage across the gas will create the lowest firing voltage for a surface discharge configuration. Pin-pointing the firing to a line or wire 53 across the tubes 57 will concentrate the damage to that location, thus limiting the amount of phosphor damage inside the tube. The protrusions inside the tube, as a result of the grooves 64 in the surface, will create barriers to flow and help collect or concentrate a hard emissive coating as it is flushed through the tube. This concentration of the hard emissive coating at the wire electrode 53 locations will help reduce the plasma damage and increase the secondary electron emission, in turn lowering the firing and sustaining voltages of the plasma display.

The grooves 64 can be formed in the tube 57 surface using a standard embossing tool. However, the tube 57 will get flattened during this process step. The tubes 57 could reside in small channels to prevent the tube 57 from being flattened when the grooves 64 are embossed. Grooves 64 could also be formed in the tube 57 surface by blow molding. In this pressurized molding process, the tubes 57 are placed in a mold with the opposite structure of the desired grooved 64 tube surface. The tubes 57 and the mold are then brought up above the softening point of the glass (preferably to the working point) and pressurized. The pressure will force the surface of the tube out into the mold and form the grooved surface 64.

Figure 77:
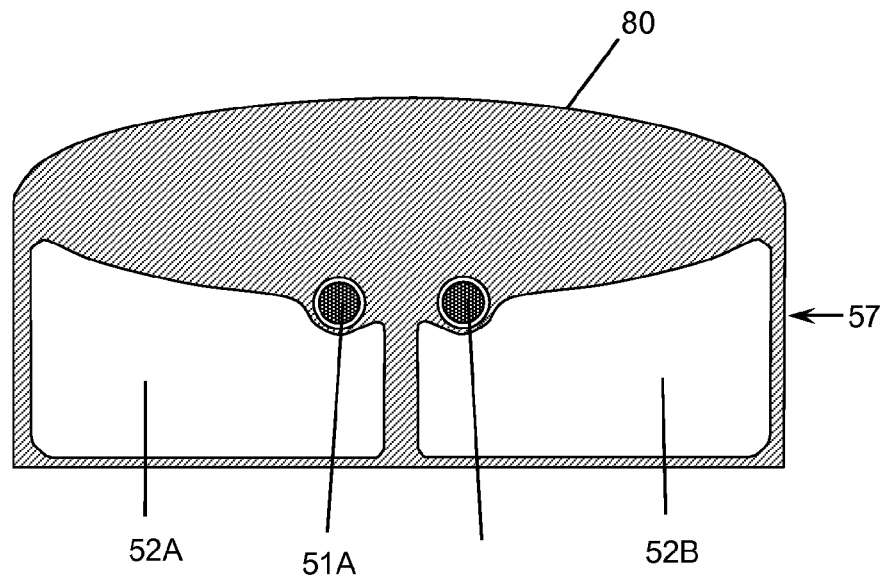
FIG. 77 schematically shows a cross-section of a plasma tube containing a lens on the surface of the tube and two individual plasma chambers inside the tube.

FIG. 77 shows a plasma tube 57 with two plasma chambers 52 and a curved surface to act as a lens 80. The two plasma chambers 52A and 52B are preferably individually addressed using the two wire address electrodes 51A and 51B, respectively. Light coming from the two plasma chambers 52 through the lens 80 creates two separate views. Addressing a suitable image in the left (A) and right (B) plasma cells 52A and 52B creates a three-dimensional image when the viewer is positioned in the center of the display. Note that the viewer has to be positioned on the lens 80 side of the plasma tubes 57. Since the plasma generated light is transmitted out of the tube array 57 on the opposite side of the tube 57 from where the electroded sheet is attached, the electroded sheet does not have to be transparent. In fact, if the electroded sheet is reflective it reflects the plasma generated light escaping out of the back side of the display. Color filters may also be added to the plasma tubes 57 to enhance the color purity and bright room contrast of the display.

Figure 78:
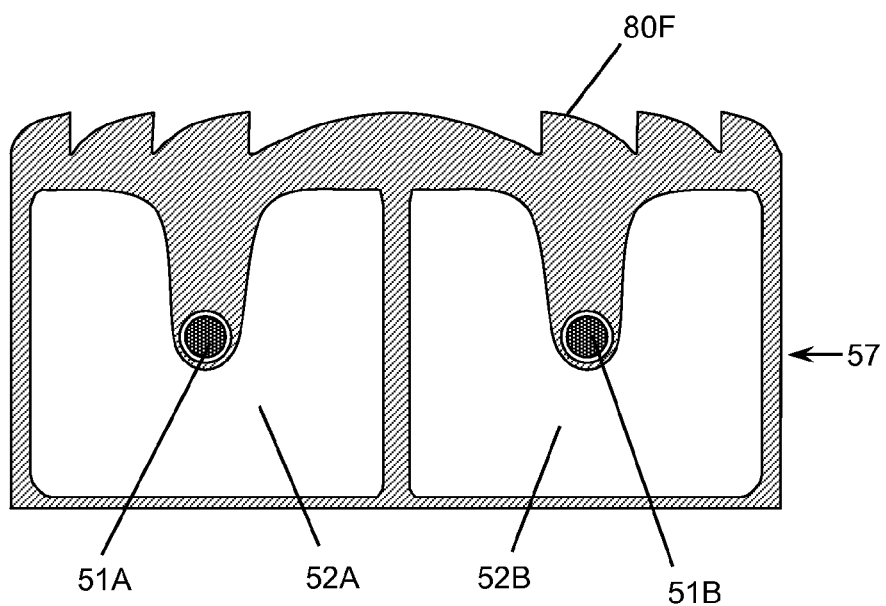
FIG. 78 schematically shows a cross-section of a plasma tube containing a Fresnel-based lens on the surface of the tube and two individual plasma chambers inside the tube.
Figure 79:
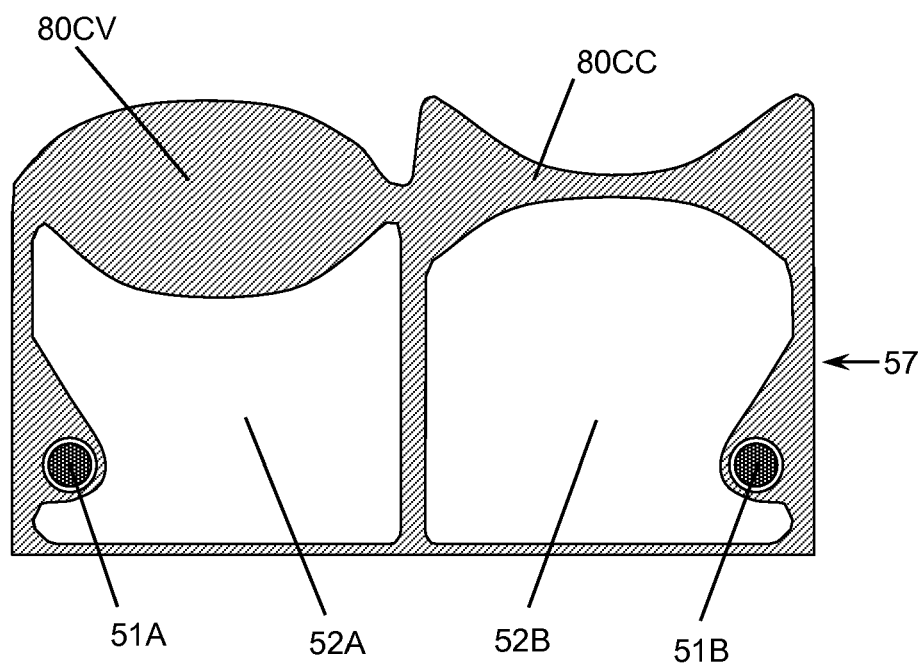
FIG. 79 schematically shows a cross-section of a plasma tube containing two different lenses on the surface of the tube which are aligned to two individual plasma chambers inside the tube.

FIG. 78 shows the lens 80 on the tube as a Fresnel-based lens 80F, where the lenticular lens 80 in FIG. 77 is collapsed down onto a plane to form a lens 80F that produces the same lens function. The wire electrodes 51A and 51B are preferably moved to the center of the plasma cells 52 to enhance the addressability of the plasma in each cell 52. The wire electrodes 51 may also be placed in the walls of the plasma tubes 57 to bring them closer to the addressing surface, as shown in FIG. 79. Bringing the wire address electrodes 51 closer to the addressing surface lowers the addressing voltage, increases the addressing speed, and enhances the addressability of the plasma cell 52. Placing the wire electrodes 51 in the walls of the plasma tubes 57 also has two major optical advantages. First, the wire electrodes 51 are not located in the main light transmission region of the plasma tube 57, therefore the wire electrodes block minimal light. Second, the wire electrodes 51 are not located in the lens 80 formed regions, thus the wire electrodes do not affect the lens function of the panel. FIG. 79 also shows that the lens may be any shape from concave 80CC to convex 80CV. Using two different lens curvatures creates a 3-D image, where the two images get focused at different depths in the panel. More than two plasma cells with corresponding lens may be formed in each plasma tube yielding more than two possible images. Single plasma tubes with a lens function, light blocking layers, different index of reflection glasses and a multitude of lens configurations may be used in a tubular plasma display similar to that disclosed in U.S. Pat. No. 7,082,236, incorporated herein by reference.

Figure 80:
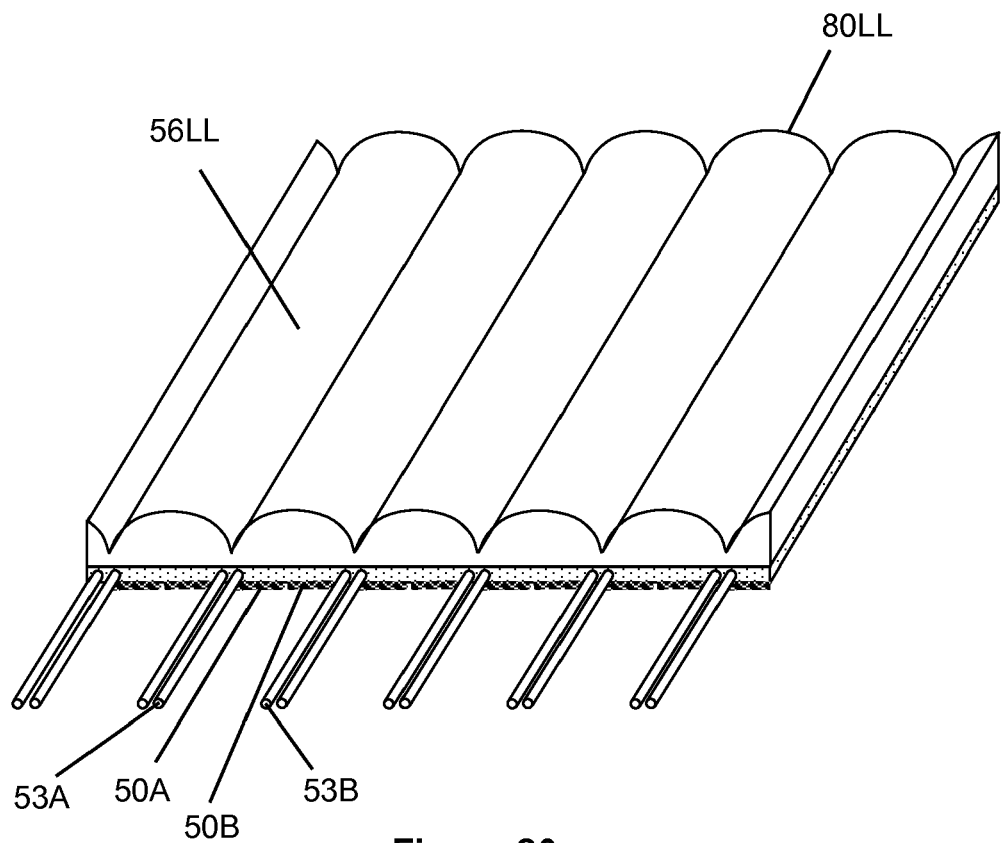
FIG. 80 schematically shows an electroded sheet with a lenticular lens embossed in the surface.
Figure 81:
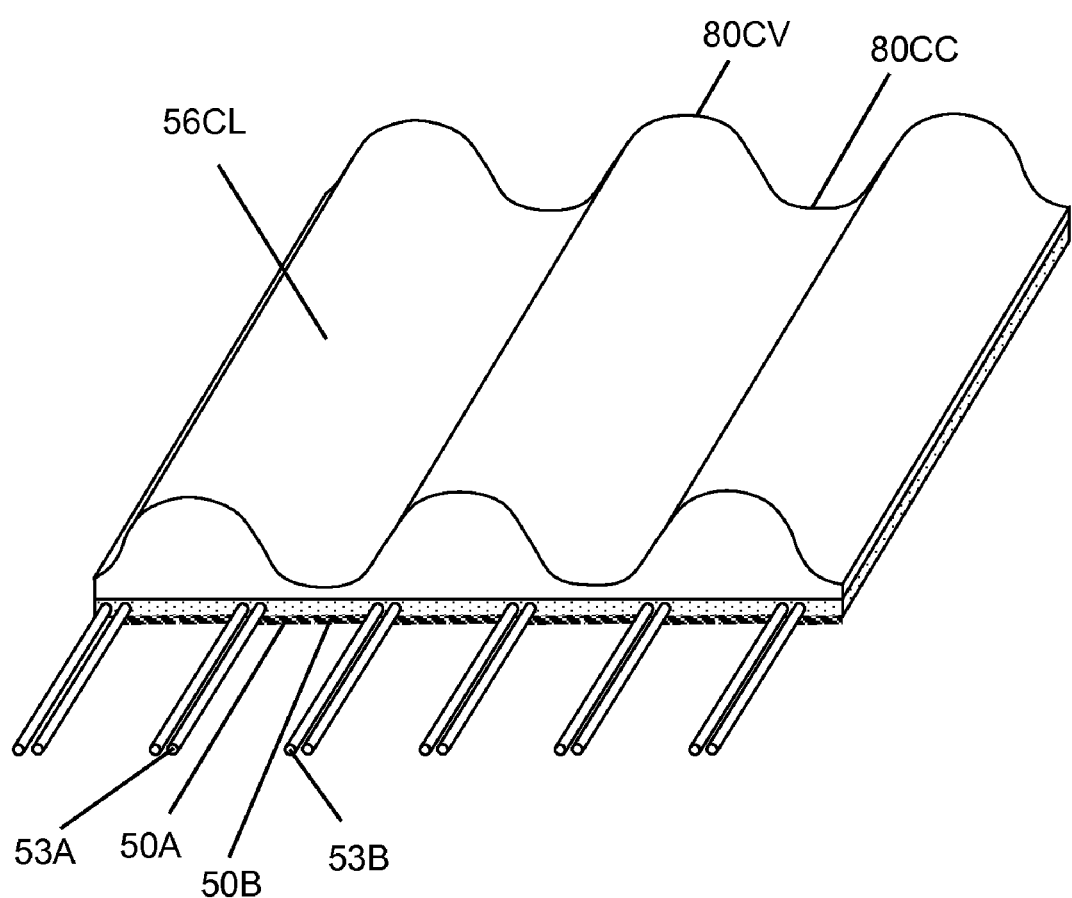
FIG. 81 schematically shows an electroded sheet with alternating convex and concave lenses embossed into the surface.

FIG. 80 shows the lens function to create multiple images or a 3-D image included in the electroded sheet 56. In this example, a lenticular lens 80LL is embossed into the electroded sheet 56LL. The lenses 80LL are aligned to the electrodes 53/50 in the electroded sheet 56LL. The lenses 80LL may be embossed into the surface of the electroded sheet 56LL or they 80LL may be formed in a separate polymer sheet and bonded to an electroded sheet. Several different lens functions including concave 80CC and convex 80CV may be formed in the surface of an electroded sheet 56CL, as shown in FIG. 81. Fresnel-based lenses both in lenticular and circular form may be formed in the electroded sheets, however if a circular or rectangular Fresnel-based lens is used it also has to be aligned to the plasma tube array.

One issue for some of the electroded sheets discussed above is the flatness of the final surface. In some display applications, like a tubular plasma display, the requirements on the final surface flatness is not very stringent (less than about 25 µm) and most of the surface roughness may be compensated for in an adhesive layer used to attach the electroded sheet to the plasma tube array. However, other electronics displays, especially those including liquid crystals, require that the surface roughness is below 1 µm to achieve proper addressing and uniformity across the panel. Therefore, a post surface flattening process has to be performed for most if not all of the electroded sheets manufactured. The final flattening step needs to be performed under a vacuum in order to remove any air in the electroded sheet/flattening plate interface. The pressure should preferably stay below about 200 mTorr to keep any bubbles from forming in the interface. The grooves along side the wire electrodes provide vacuum ports to remove any trapped air in the center of the electroded sheet. These vacuum ports may raise the required minimum vacuum to a couple of Torr.

One potential issue with creating any patterned electrode structure is shorts between the TCE lines. These shorts are easily found by applying an interlaced voltage to the wire electrodes, that is by applying a voltage to all the even electrodes while keeping the odd electrodes at ground potential. If there is a short, current flows between the interlaced connected electrodes. If the voltage and current is high enough and the short is small enough then it may be "burned" open. If the current is regulated, the short area will sink all the current and heat-up. A thermal camera may then be used to spot the location of the short (the area of short will get hot from the current flow) and the short could be repaired or scraped/ scratched open or burned open with a laser.

Figure 82:
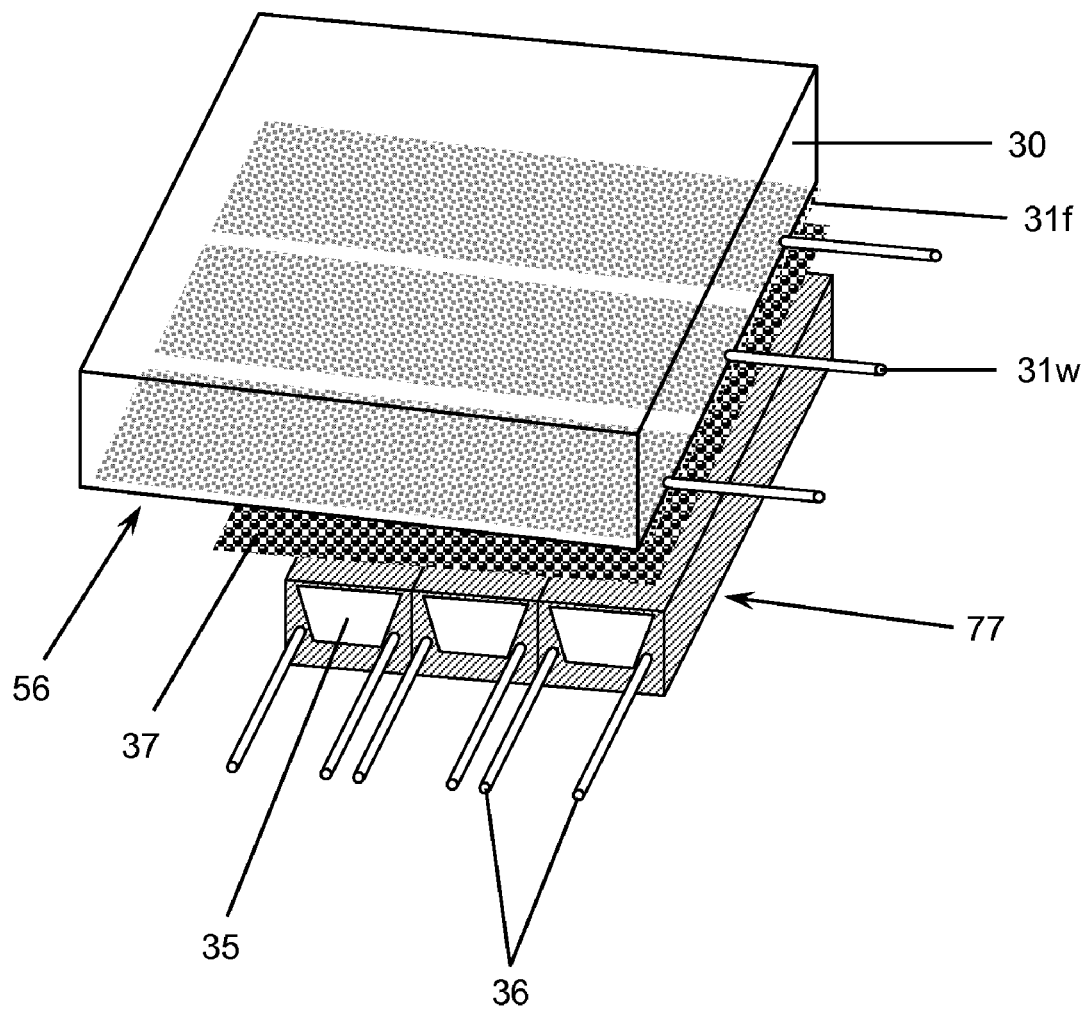
FIG. 82 shows an active matrix liquid crystal display (AM-LCD) where plasma tubes are used for the active switch.

Many different types of panels can be fabricated using electroded sheets and plasma tubes or fibers all containing wire electrodes. FIG. 82 represents an active matrix liquid crystal display (AMLCD) where plasma tubes 77 are used for the active switch. This type of display is also referred to as a plasma addressed liquid crystal (PALC) display. FIG. 82 shows that the top column address electrodes 31 can be formed in an electroded sheet 56. The wire electrodes 31$w$ are imbedded in a polymer substrate 30 and the wires 31$w$ are electrically connected to transparent conductive electrodes 31$f$. The display is formed by sandwiching a liquid crystal material 37 between the electroded sheet 56 and the plasma tube array 77. Color can be added to the display by adding a color filter material to the electroded sheet 56 or to the plasma tubes 77. A video rate display can be formed since the charge can be set inside all the plasma tubes to address each pixel at video rates and some liquid crystal materials can be modulated at video speeds. FIG. 82 may also represent a plasma addressed electrooptic display where the electrooptic material 37 is a reflective bistable material. There are several electrooptic materials 37 that are reflective and bistable and displays fabricated with these materials are traditionally referred to as electronic paper displays. Several different liquid crystal materials are reflective and bistable as well as electrophoretic materials, Gyricon or twisting ball or twisting cylinder paper and suspended particle devices. Most of these electrooptic materials 37 do not have a voltage threshold, and therefore have to be addressed using an active device, such as a plasma. Therefore, placing one of these reflective bistable materials 37 between an array of plasma tubes 77 and an electroded sheet 56 forms an electronic sign.

Figure 83:
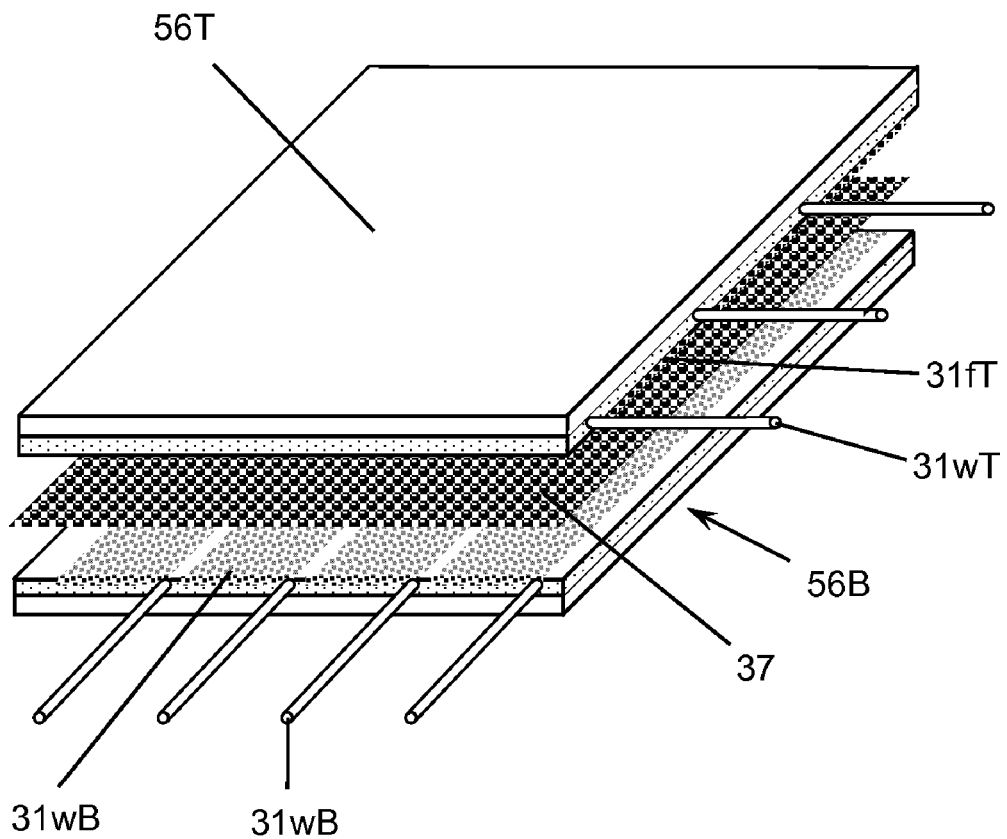
FIG. 83 shows the electrooptic material placed between two electroded sheets to form a display.

If the electrooptic material 37 has a voltage threshold then it 37 may be placed between two electroded sheets 56T and 56B to form a display, as shown in FIG. 83. This type of display is referred to as a passive addressed display, where no active device, such as a transistor or plasma, is used to set the charge in the panel used to modulate the electrooptic material 37. This passively addressed display is written one line at a time. Addressing the display one line at a time limits the speed of updating the image to the number of lines in the display times the time required to modulate the electrooptic material 37. Most electrooptic materials that have a voltage threshold are liquid crystals. If the electrooptic material 37 is reflective, then it has better viewing characteristics in bright light and if the electrooptic material is bistable then it forms an energy efficient display. If the electrooptic material 37 is a standard liquid crystal, then it requires other components, like rubbing layers, polarizers and a backlight to function as a display.

In cases where the electroded sheet has a very thin substrate 30, the electroded layer may serve as a double-sided addressing layer. However, in this case, the electro-optic material on the substrate 30 side would have a voltage drop through the substrate whereas an electro-optic material on the electrode side would be in direct contact with the electrodes. A true double-sided electroded sheet may be produced by adding an additional polymer layer 38 with imbedded wire electrodes 31$w$ connected to TCEs 31$f$ on the non-electroded side of the substrate 30. The second electroded layer may be parallel to the first or orthogonal to the electrodes on the other side of the substrate 30. These thin double-sided electroded sheets allow for the fabrication of very large color displays.

Figure 84:
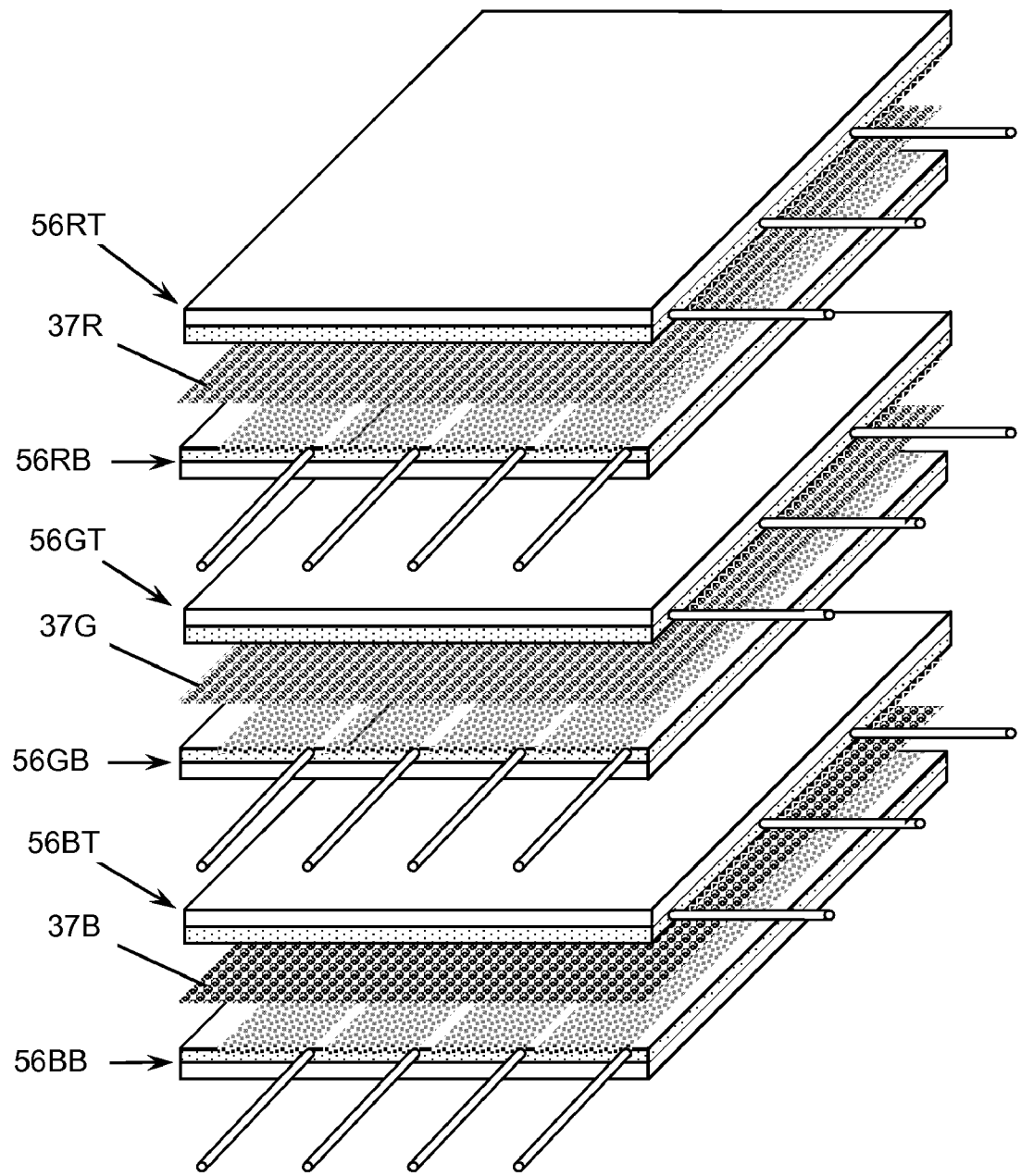
FIG. 84 shows a method of stacking the red, green and blue pixels on top of each other.

One family of color displays are reflective bistable or multistable electronic signs. Bistability means that when an electro-optic material is modulated to a different state it holds that state until it is forced back to its original state, where multistable means the electro-optic material has many stable states. These reflective color displays may replace standard color prints in some applications. There are two methods of creating a reflective color display or electronic sign. One method places the red, green and blue (RGB) pixels side-by-side like is presently done in all color video displays. A second method stacks the red, green and blue pixels on top of each other, as shown in FIG. 84. This stacking method requires that the electro-optic materials may be modulated from a transparent state to a reflective red 37R, green 37G or blue 37B state. This stacking method also allows for the usage of the entire pixel to reflect the entire visible spectrum. In contrast, when the RGB colors are placed side-by-side, ⅔ of the light is wasted because the red pixel does not reflect green or blue, and a similar phenomenon occurs for the green and blue pixels. Therefore, a RGB stack three layer panel is required to create a high quality reflective color display. There are two known materials that may be modulated from a transparent to a reflective R/G/B state, a cholesteric liquid crystal (developed by Kent Displays) and a smectic-A liquid crystal (developed by PolyDisplay/TechnoDisplay). Both of these liquid crystals have thresholds and can be passively addressed. Therefore, reflective color electronic sign may be fabricated by using three separate panels including two orthogonal electroded sheets 56(R,G,B)T and 56(R,G,B)B sandwiched between each of the three color liquid crystal material 37(R,G,B). A reflective color electronic sign may also be formed using two single-sided electroded sheets sandwiching two double-sided electroded sheets with the three primary color liquid crystals layers between each electroded sheet. Note that if the display is reflective then it would be advantageous to use cyan, magenta and yellow instead of red, green and blue for the colored liquid crystal materials.

Some layers in flat panel displays require RGB color filters. In these cases, the color filter may be added to the electrode sheet. The RGB colors may be added to the TCE coating such that when they are deposited in a pattern, the color filter is deposited at the same time. In this case the RGB color filter is inherently aligned with the electrodes. The color filter may also be applied on top of the electroded sheet.

An electroded sheet may be used in many different types of displays. It may be used as the two electroded substrates sandwiched around a passively addressable electro-optic material like a liquid crystal (LC), as shown in FIG. 83. It may alternatively be used in a three-layer stacked RGB liquid crystal display, as shown in FIG. 84. An electroded sheet may alternatively be used as the column addressing plane in a plasma-addressed electro-optic display (PA-EO), as shown in FIG. 82. In this case, the electroded sheet serves to set the charge in the plasma channels and act as a ground plane for modulation of the electro-optic material. The plated out charge in the plasma channels creates an electric field, which may be used to address several different electro-optic materials: liquid crystals, twisting balls or twisting cylinders (like those being developed by Gyricon), electrophoretic materials (like those being developed by E-Ink or SiPix), or suspended particle devices (such as those being developed by Research Frontiers Incorporated).

If an electroded sheet is designed such that the electrodes are exposed to the surface, then they may be used to address electro-optic materials that require current such as, electrochromic displays and passive addressed organic light emitting diode (OLED) displays. The electroded sheet may also be used to address other electroluminescent materials, such as quantum dots (as being developed by QD Vision, MIT's QD-OLED, Evident Technologies). An electroded sheet may alternatively be used as a sustainer plane in plasma tube display or column address electrode plane in a plasma tube display. An electroded sheet could also be used for many other types of displays like microelectromechanical (MEMS) displays and 3-D and multi-view displays. The 3-D and multi-view displays may require that a lenticular or other lens shape be embossed into the electroded sheet while it is being formed.

Figure 85:
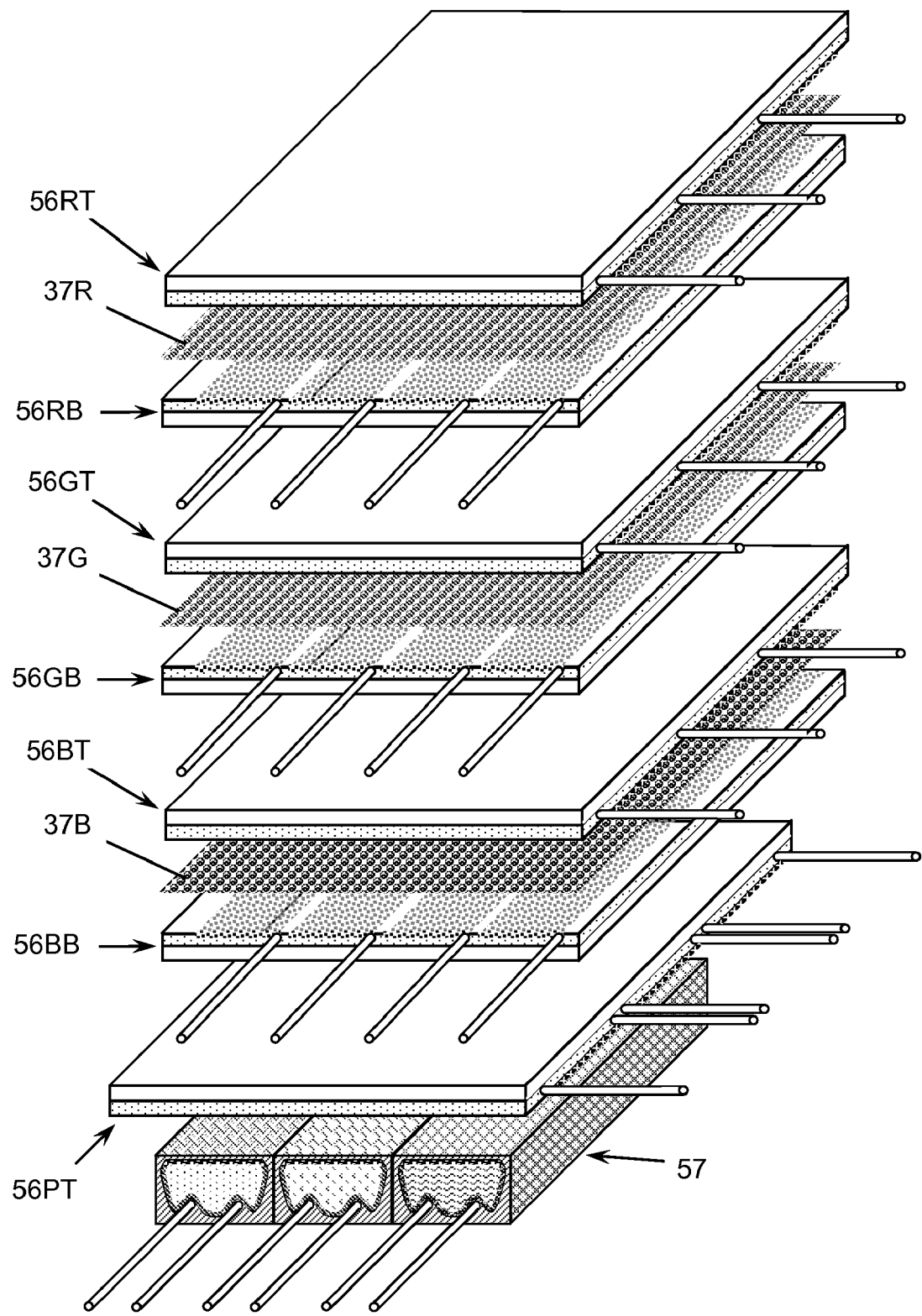
FIG. 85 shows a three layer color stacked liquid crystal display formed using three pairs of electroded sheets attached to a tubular plasma display formed using an array of plasma tubes attached to an electroded sheet.

The electroded sheets may be used to form a display, like a reflective color electronic sign, as shown in FIG. 84, and the electronic sign may be used in combination with another display, like a color video display. Combining more than one display will serve multiple purposes, such as, a reflective electronic sign, color video, three-dimensional display, multiple view display and a double-sided display. Combining a reflective bistable color liquid crystal electronic sign with a color video display creates a display that will optimally display static images using the liquid crystal electronic sign section with out phosphor burn-in and large energy consumption and will also be capable of creating full motion video. FIG. 85 shows a three layer color stacked liquid crystal display formed using three pairs of electroded sheets [56(R,G,B)T and 56(R,G,B)B] attached to a tubular plasma display formed using an array of plasma tubes 57 attached to an electroded sheet 56PT. Very high quality static images can be presented on this display using the color electronic sign part of the panel and video images can be created using the tubular plasma display section and the whole display can be rolled up creating the ultimate high quality mobile display.

Most of the articles and processes discussed above pertaining to the electroded sheet and tubular plasma display are explained in more detail in U.S. provisional patent application 60/749,446, entitled "Electrode Addressing Plane in an Electronic Display", filed Dec. 12, 2005, 60/759,704, entitled "Electrode Addressing Plane in an Electronic Display and Process", filed Jan. 18, 2006, 60/827,152, entitled "Electroded Sheet", filed Sep. 27, 2006, 60/827,146, entitled "Tubular Plasma Display", filed Sep. 27, 2006, and 60/827,170, entitled "Wire-Base Flat Panel Displays, filed Sep. 27, 2006, and which are all included herein by reference.

All of the patents, patent publications, and nonpatent references discussed herein are hereby incorporated by reference in their entireties.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electronic display combining at least two types of displays, comprising at least one electroded sheet, wherein the electroded sheet comprises:
   a) a polymer substrate, where a length and a width of the polymer substrate covers substantially a length and a width of the electronic display; and
   b) an array of wire electrodes embedded in a surface of the polymer substrate;
   wherein each wire electrode is a highly conductive thread-like or fiber-like material; and
   wherein the wire electrodes are formed using a standard wire forming process as free standing entities, are not evaporated or deposited on the substrate and are capable of being extended away from the substrate and connected directly to a printed circuit board.

2. The electronic display of claim 1, wherein at least one of the displays is a reflective display comprising at least one electroded sheet substrate.

3. The electronic display of claim 1, wherein at least one of the displays is a tubular plasma display comprising an electroded sheet and an array of plasma tubes.

4. The electronic display of claim 1, wherein a first display is a reflective display and a second display is a video display.

5. The electronic display of claim 1, wherein a first display is a three layered stacked reflected LCD comprising at least one electroded sheet sandwiched around liquid crystal materials and a second display is a color video display.

6. The electronic display of claim 5, wherein the color video display is a tubular plasma display.

7. The electronic display of claim 1, wherein at least one of the displays comprises at least one lens to form multiple views.

8. The electronic display of claim 1, wherein the electronic display is flexible.

9. The electronic display of claim 1, wherein the electronic display is rollable.

10. The electronic display of claim 1, wherein the electroded sheet is used in creating a plane selected from the group consisting of:
   a) at least one plane in a passive addressed electro-optic display;
   b) at least one plane in a cholesteric liquid crystal display;
   c) at least one plane in a smectic liquid crystal display;
   d) a column electrode plane in a plasma-addressed display;
   e) at least one addressing plane in a plasma tube display;
   f) at least one electrode plane in an electrochromic display;
   g) at least one electrode plane in an electroluminescent display;
   h) at least one electrode plane in a quantum dot display;
   i) at least one electrode plane in an OLED display;
   j) at least one electrode plane in a passive addressed LC display;
   k) at least one electrode plane in a MEMS display;
   l) at least one plane in a 3-D display;
   m) at least one plane in a multiple view display;
   n) at least one plane in a flexible display;
   o) at least one plane in a rollable display;
   p) at least one plane in a curved display, and q) any combination of a) through p).

11. The electronic display of claim 1, wherein the electroded sheet further comprises an array of transparent conductive electrode strips electrically connected to the wire electrodes.

12. A tubular plasma display comprising:
   a) an array of plasma tubes, where each plasma tube contains at least one wire electrode and a plasma gas; and
   b) an electroded sheet comprising a polymer substrate and an array of wire electrodes embedded in a surface of the polymer substrate, wherein a length and a width of the polymer substrate covers substantially a length and a width of the electronic display;
   wherein each wire electrode is a highly conductive thread-like or fiber-like material; and
   wherein the wire electrodes are formed using a standard wire forming process as free standing entities, are not evaporated or deposited on the substrate and are capable of being extended away from the substrate and connected directly to a printed circuit board.

13. The tubular plasma display of claim 12, wherein the array of plasma tubes is mechanically connected to the electroded sheet.

14. The tubular plasma display of claim 13, wherein the plasma tubes contain phosphor.

15. The tubular plasma display of claim 13, wherein the plasma tubes comprises a hard emissive coating.

16. The tubular plasma display of claim 13, wherein at least one plasma tube in the plasma tube array comprises a colored section selected from the group consisting of a color coating or a colored glass, wherein the colored section serves as a color filter in the tubular plasma display.

17. The tubular plasma display of claim 13, wherein at least part of at least one side of at least one plasma tube in the array of plasma tubes comprises a black section selected from the group consisting of a black coating; a black glass; and a black absorbing material, wherein the black section serves a black matrix function in the tubular plasma display or as a visor to block sunlight from entering the tube.

18. An electroded sheet liquid crystal display comprising:
 a) two orthogonal electroded sheets, wherein each electroded sheet comprises a polymer substrate, an array of wire electrodes embedded in a surface of the polymer substrate, and transparent conductive electrode strips connected to the wire electrodes, wherein the electroded sheet surfaces containing the wire electrodes are facing each other and wherein a length and a width of the polymer substrate covers substantially a length and a width of the electronic display; and
 b) a liquid crystal material sandwiched between the two electroded sheets;
 wherein each wire electrode is a highly conductive thread-like or fiber-like material; and
 wherein the wire electrodes are formed using a standard wire forming process as free standing entities, are not evaporated or deposited on the substrate and are capable of being extended away from the substrate and connected directly to a printed circuit board.

19. The electroded sheet liquid crystal display of claim 18, further comprising two more pairs of orthogonal electroded sheets sandwiching liquid crystal materials, wherein the three different pairs of orthogonal electroded sheets are filled with three primary colored cholesteric liquid crystal materials to form a full color reflective display.

20. The electroded sheet liquid crystal display of claim 18, further comprising two double-sided electroded sheets located between the orthogonal electroded sheets and two additional liquid crystal materials between the electroded sheets where the three liquid crystal materials are primary colored cholesteric liquid crystal materials to form a full color reflective display.

\* \* \* \* \*

UNITED STATES PATENT AND TRADEMARK OFFICE
CERTIFICATE OF CORRECTION

PATENT NO. : 8,106,853 B2  Page 1 of 1
APPLICATION NO. : 11/609220
DATED : January 31, 2012
INVENTOR(S) : Moore et al.

It is certified that error appears in the above-identified patent and that said Letters Patent is hereby corrected as shown below:

Claim 14 (Column 48, line 61): replace "claim 13" with "claim 12"

Claim 15 (Column 48, line 63): replace "claim 13" with "claim 12"

Claim 15 (Column 48, line 64): replace "plasma tubes comprises" with "plasma tubes comprise"

Claim 16 (Column 48, line 65): replace "claim 13" with "claim 12"

Claim 17 (Column 49, line 3): replace "claim 13" with "claim 12"

Signed and Sealed this
Thirteenth Day of March, 2012

David J. Kappos
*Director of the United States Patent and Trademark Office*